(12) United States Patent
Kiyama et al.

(10) Patent No.: US 12,243,180 B2
(45) Date of Patent: Mar. 4, 2025

(54) INFORMATION PROCESSING DEVICE AND METHOD

(71) Applicant: Sony Group Corporation, Tokyo (JP)

(72) Inventors: Yuka Kiyama, Tokyo (JP); Mitsuhiro Hirabayashi, Tokyo (JP); Ryohei Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 183 days.

(21) Appl. No.: 18/024,976

(22) PCT Filed: Oct. 6, 2021

(86) PCT No.: PCT/JP2021/036905
§ 371 (c)(1),
(2) Date: Mar. 7, 2023

(87) PCT Pub. No.: WO2022/075342
PCT Pub. Date: Apr. 14, 2022

(65) Prior Publication Data
US 2023/0334804 A1    Oct. 19, 2023

Related U.S. Application Data

(60) Provisional application No. 63/134,238, filed on Jan. 6, 2021, provisional application No. 63/088,671, filed on Oct. 7, 2020.

(51) Int. Cl.
*G06T 19/20* (2011.01)

(52) U.S. Cl.
CPC ...... *G06T 19/20* (2013.01); *G06T 2219/2004* (2013.01)

(58) Field of Classification Search
CPC ............. G06T 2219/2004; G06T 19/20; G06T 2210/61; G06T 19/00; H04N 21/44012;
(Continued)

(56) References Cited

U.S. PATENT DOCUMENTS

| 6,079,566 A * | 6/2000 | Eleftheriadis ........... G06F 16/40 |
| 6,751,623 B1 * | 6/2004 | Basso .................. G11B 27/329 |
| | | 382/233 |
| 2001/0050924 A1 * | 12/2001 | Herrmann ............ H04N 21/435 |
| | | 375/E7.022 |

FOREIGN PATENT DOCUMENTS

| WO | 2020/137877 A1 | 7/2020 |
| WO | 2020/189038 A1 | 9/2020 |
| WO | 2021/065277 A1 | 4/2021 |

OTHER PUBLICATIONS

Emmanuel Thomas(TNO) et al: "[SD] On scene description update model", 131. MPEG Meeting; Jun. 29, 2020-Jul. 3, 2020; Online; (Motion Picture Expert Group or ISO/IEC JTC1/SC29/WG11), No. m54287, Jun. 19, 2020, XP030288580.

(Continued)

*Primary Examiner* — Phi Hoang
(74) *Attorney, Agent, or Firm* — XSENSUS LLP

(57) ABSTRACT

The present disclosure relates to an information processing device and method capable of suppressing an increase in processing load when randomly accessing scene descriptions.
As update information for updating spatial arrangement information for arranging at least one 3D object in a 3D space, initial value reference difference information that is difference information which uses an initial value of the spatial arrangement information as a reference, or post-update information in which an update to the initial value reference difference information is reflected in the initial value of the spatial arrangement information, is generated. Then, an update file which stores the update information is generated, and the initial value reference difference information or the post-update information is stored in the update file as a random access point. The present disclosure can be (Continued)

applied in, for example, an information processing device, an information processing method, or the like.

20 Claims, 39 Drawing Sheets

(58) Field of Classification Search
CPC .............. H04N 19/25; H04N 21/4431; H04N 21/8146; H04N 21/816; H04N 21/85406; H04N 21/84; H04N 21/8543
See application file for complete search history.

(56) References Cited

OTHER PUBLICATIONS

Lukasz Kondrad et al: "[39.1] Comments on scene update mechanism for MPEG scene description", 132. MPEG Meeting; Oct. 12, 2020-Oct. 16, 2020; Online; (Motion Picture Expert Group or ISO/IEC JTC1/SC29/WG11), No. m54965 Oct. 6, 2020, XP030292463.
Lukasz Kondrad: "[39.1] Draft Technologies under Considerations on Scene Description for MPEG Media", 132. MPEG Meeting; Oct. 12, 2020-Oct. 16, 2020; Online; (Motion Picture Expert Group or ISO/IEC JTC1/SC29/WG11), No. m54968 Sep. 28, 2020, XP030292466.
International Search Report and Written Opinion mailed on Dec. 7, 2021, received for PCT Application PCT/JP2021/036905, filed on Oct. 6, 2021, 9 pages including English Translation.
"Information technology—Coding of audio-visual objects—Part 12:ISO base media file format", ISO/IEC 14496-12, Dec. 15, 2015, 388 pages.
"Information technology—MPEG Systems Technologies—Part 15: Carriage of Web Resources in ISOBMFF", ISO/IEC JTC 1/SC 29/WG 11 N18639, ISO/IEC 23001-15, Dec. 2019, pp. 1-19.
Kondard et al., "Technologies under Considerations on Scene Description for MPEG Media", ISO/IEC JTC1/SC29/WG11 MPEG2020/N19446, Jun./Jul. 2020, 28 pages.
Oyman et al., "Further Support for Dynamic Scene Updates", ISO/IEC JTC1/SC29/WG11 MPEG2020/M54841, Oct. 2020, 7 pages.
Bryan et al., "JavaScript Object Notation (JSON) Patch", Internet Engineering Task Force (IETF), RFC:6902, Available Online At: https://datatracker.ietf.org/doc/html/rfc6902, Apr. 2013, pp. 1-18.
Bhatia et al., "Khronos gITF2.0", Available Online At: https://github.com/KhronosGroup/gITF/tree/master/specification/2.0, Jun. 9, 2017, 111 pages.

\* cited by examiner

Fig. 3

```
{
 "scenes":[{"name":"Scene 1","nodes":[0,1]},
           {"name":"Scene2","nodes":[2]}],
 "nodes":[{"name":"Node1", "mesh":0, "camera":0, "skin":0},
          {"name":"Node2", "mesh":1, "camera":1, "skin":1},
          {"name":"Node3"}],
 "meshs":[{"primitives": [{
           "attributes": {"NORMAL": 23,"POSITION": 22,"TANGENT": 24,"TEXCOORD_0": 25},
           "indices": 21,"material": 3,"mode": 4}]
          :
         ]
 "cameras":[...],
 "skins" :[...],
 "materials" :[...],
 "textures" :[...],
  :
  :
 "scene": 0
}
```

Fig. 5

```
{
  "meshes": [
    {
      "primitives": [
        {
          "attributes": {
            "NORMAL": 23,
            "POSITION": 22,
            "TANGENT": 24,
            "TEXCOORD_0": 25
          },
          "indices": 21,
          "material": 3,
          "mode": 4
        }
      ]
    }
  ]
}
``` accessor TO ATTRIBUTES OF EACH VERTEX SPECIFIED

Fig. 7

A
```
{
 "buffers":[
  {
   "byteLength":102040,
   "uri":"duck.bin"
  }
 ]
}
```

B
```
{
 "bufferViews":[
  {
   "buffer":0,
   "byteLength":25272,
   "byteOffset":0,
   "target":34963  //ELEMENT_ARRAY_BUFFER
                    (OpenGL MACRO CONSTANT)
  },
  {
   "buffer":0,
   "byteLength":76768,
   "byteOffset":25272,
   "byteStride":32,  //VERTEX ATTRIBUTE DATA
   "target":34962   // ARRAY_BUFFER
                    (OpenGL MACRO CONSTANT)
  }
 ]
}
```

C
```
{
 "accessors":[
  {
   "bufferView":0,
   "byteOffset":0,
   "componentType":5126, //FLOAT TYPE(OpenGL MACRO CONSTANT)
   "count":2106,         //2106 PIECES OF DATA
   "type":"VEC3"         //THREE-DIMENSIONAL VECTOR(data type)
  }
 ]
}
```

Fig. 10

```
The original JSON document
{
  "baz": "qux",
  "foo": "bar"
}
```
~71

```
The patch
[
  { "op": "replace", "path": "/baz", "value": "boo" },
  { "op": "add", "path": "/hello", "value": ["world"] },
  { "op": "remove", "path": "/foo" }
]
```
~72

```
The result JSON document
{
  "baz": "boo",
  "hello": ["world"]
}
```
~73

Fig. 13

| 1 | INITIAL VALUE REFERENCE DIFFERENCE INFORMATION STORED IN FILE AS RANDOM ACCESS POINT |
|---|---|
| 1-1 | INITIAL VALUE REFERENCE DIFFERENCE INFORMATION STORED IN DIFFERENT TRACK FROM PREVIOUS VALUE REFERENCE DIFFERENCE INFORMATION |
| 1-1-1 | LINK INFORMATION TO TRACK STORING INITIAL VALUE REFERENCE DIFFERENCE INFORMATION STORED IN SD INITIAL VALUES AS LINK INFORMATION FOR RANDOM ACCESS |
| 1-2 | INITIAL VALUE REFERENCE DIFFERENCE INFORMATION STORED IN SAME SAMPLE OF SAME TRACK AS PREVIOUS VALUE REFERENCE DIFFERENCE INFORMATION |
| 1-2-1 | PREVIOUS VALUE REFERENCE DIFFERENCE INFORMATION AND INITIAL VALUE REFERENCE DIFFERENCE INFORMATION STORED AS LIST WITH THOSE PIECES OF INFORMATION AS ELEMENTS |
| 1-2-2 | PREVIOUS VALUE REFERENCE DIFFERENCE INFORMATION AND INITIAL VALUE REFERENCE DIFFERENCE INFORMATION EACH MANAGED AS SUB-SAMPLE IN MANAGEMENT REGION OF FILE |
| 1-2-2-1 | IDENTIFICATION INFORMATION IDENTIFYING SUB-SAMPLE STORING PREVIOUS VALUE REFERENCE DIFFERENCE INFORMATION AND SUB-SAMPLE STORING INITIAL VALUE REFERENCE DIFFERENCE INFORMATION STORED IN MANAGEMENT REGION OF FILE |
| 1-2-3 | SAMPLE STORING INITIAL VALUE REFERENCE DIFFERENCE INFORMATION MANAGED, IN MANAGEMENT REGION OF FILE, AS SAMPLE WHICH CAN BE RANDOMLY ACCESSED |
| 1-3 | INITIAL VALUE REFERENCE DIFFERENCE INFORMATION STORED IN DIFFERENT SAMPLE OF SAME TRACK AS PREVIOUS VALUE REFERENCE DIFFERENCE INFORMATION |
| 1-3-1 | UPDATE APPLICATION TIME INFORMATION SAME AS IN SAMPLE STORING PREVIOUS VALUE REFERENCE DIFFERENCE INFORMATION STORED IN SAMPLE STORING INITIAL VALUE REFERENCE DIFFERENCE INFORMATION |
| 1-3-2 | SAMPLE STORING INITIAL VALUE REFERENCE DIFFERENCE INFORMATION MANAGED, IN MANAGEMENT REGION OF FILE, AS SAMPLE NOT USED DURING NORMAL PLAYBACK |
| 1-3-2-1 | IDENTIFICATION INFORMATION INDICATING WHETHER SAMPLE USED DURING NORMAL PLAYBACK STORED IN MANAGEMENT REGION OF FILE |
| 1-3-3 | SAMPLE STORING INITIAL VALUE REFERENCE DIFFERENCE INFORMATION MANAGED, IN MANAGEMENT REGION OF FILE, AS SAMPLE WHICH CAN BE RANDOMLY ACCESSED |
| 1-4 | INITIAL VALUE REFERENCE DIFFERENCE INFORMATION REPLACES PREVIOUS VALUE REFERENCE DIFFERENCE INFORMATION |
| 1-4-1 | SAMPLE STORING INITIAL VALUE REFERENCE DIFFERENCE INFORMATION MANAGED, IN MANAGEMENT REGION OF FILE, AS SAMPLE WHICH CAN BE RANDOMLY ACCESSED |

Fig. 15

```
Scene.gltf
{
  "extensions":[
  {
    "MPEG_dynamic_scene":[
      "mimeType":application/json-patch+json,
      "uri":scen_updata.json-patch,
      "uri_for_randomaccess":scene_updata_type2.json-patch}
    ]
  }
  ]
}
```

Fig. 17

```
{
    "JSON_patch_list_for_2type_update" : [
    [{"op": "remove", "path": "", "value": ""}],
    [ {"op": "remove", "path": "", "value": ""},
      {"op": "remove", "path": "", "value": ""},
      {"op": "add", "path": "", "value": ""},
      {"op": "add", "path": "", "value": ""}]
    ]
}
```

Fig. 18

```
aligned(8) class SyncSampleBox
  extends FullBox('stss',version = 0, 0) {
  int i;
  for (i=0; i < entry_count; i++) {
    unsigned int(32) sample_number ;
  }
}
```

Fig. 19

SubSampleInformationBox defined in ISO/IEC 14496-12 is used to allow the client to retrieve individually two types of data in the same sample.
The codec_specific_parameters field of the sub-sample entry in the SubSampleInformationBox is used to identify the update information included in the sub-sample.

The semantics for codec_specific_parameters is as follows:
option1) The target version of each update information shall be copied to the codec_specific_parameters field.
option2) When the update information contained in the sub-sample is for the current scene description, the codec_specific_parameters field is set to 0. When the update information is for the original scene description, the codec_specific_parameters field is set to 1.

Fig. 21

```
aligned(8) class SampleDependencyTypeBox
 extends FullBox('sdtp', version = 0, 0) {
  for (i=0; i < sample_count; i++){
   unsigned int(2) is_leading;
   unsigned int(2) sample_depends_on;
   unsigned int(2) sample_is_depended_on;
   unsigned int(2) sample_has_redundancy;
  }
}
```

Fig. 23

| 2 | INITIAL VALUE REFERENCE DIFFERENCE INFORMATION OR POST-UPDATE INFORMATION STORED IN FILE AS RANDOM ACCESS POINT |
|---|---|
| 2-1 | INITIAL VALUE REFERENCE DIFFERENCE INFORMATION OR POST-UPDATE INFORMATION STORED IN DIFFERENT TRACK FROM PREVIOUS VALUE REFERENCE DIFFERENCE INFORMATION |
| 2-1-1 | LINK INFORMATION TO TRACK STORING INITIAL VALUE REFERENCE DIFFERENCE INFORMATION OR POST-UPDATE INFORMATION STORED IN SD INITIAL VALUES AS LINK INFORMATION FOR RANDOM ACCESS |
| 2-2 | INITIAL VALUE REFERENCE DIFFERENCE INFORMATION OR POST-UPDATE INFORMATION STORED IN SAME SAMPLE OF SAME TRACK AS PREVIOUS VALUE REFERENCE DIFFERENCE INFORMATION |
| 2-2-1 | PREVIOUS VALUE REFERENCE DIFFERENCE INFORMATION, AS WELL AS INITIAL VALUE REFERENCE DIFFERENCE INFORMATION OR POST-UPDATE INFORMATION, STORED AS LIST WITH THOSE PIECES OF INFORMATION AS ELEMENTS |
| 2-2-2 | PREVIOUS VALUE REFERENCE DIFFERENCE INFORMATION, AS WELL AS INITIAL VALUE REFERENCE DIFFERENCE INFORMATION OR POST-UPDATE INFORMATION, EACH MANAGED AS SUB-SAMPLE IN MANAGEMENT REGION OF FILE |
| 2-2-2-1 | IDENTIFICATION INFORMATION IDENTIFYING SUB-SAMPLE STORING PREVIOUS VALUE REFERENCE DIFFERENCE INFORMATION AND SUB-SAMPLE STORING INITIAL VALUE REFERENCE DIFFERENCE INFORMATION OR POST-UPDATE INFORMATION STORED IN MANAGEMENT REGION OF FILE |
| 2-2-3 | SAMPLE STORING INITIAL VALUE REFERENCE DIFFERENCE INFORMATION OR POST-UPDATE INFORMATION MANAGED, IN MANAGEMENT REGION OF FILE, AS SAMPLE WHICH CAN BE RANDOMLY ACCESSED |
| 2-3 | INITIAL VALUE REFERENCE DIFFERENCE INFORMATION OR POST-UPDATE INFORMATION STORED IN DIFFERENT SAMPLE OF SAME TRACK AS PREVIOUS VALUE REFERENCE DIFFERENCE INFORMATION |
| 2-3-1 | UPDATE APPLICATION TIME INFORMATION SAME AS IN SAMPLE STORING PREVIOUS VALUE REFERENCE DIFFERENCE INFORMATION STORED IN SAMPLE STORING INITIAL VALUE REFERENCE DIFFERENCE INFORMATION OR POST-UPDATE INFORMATION |
| 2-3-2 | SAMPLE STORING INITIAL VALUE REFERENCE DIFFERENCE INFORMATION OR POST-UPDATE INFORMATION MANAGED, IN MANAGEMENT REGION OF FILE, AS SAMPLE NOT USED DURING NORMAL PLAYBACK |
| 2-3-2-1 | IDENTIFICATION INFORMATION INDICATING WHETHER SAMPLE USED DURING NORMAL PLAYBACK STORED IN MANAGEMENT REGION OF FILE |
| 2-3-3 | SAMPLE STORING INITIAL VALUE REFERENCE DIFFERENCE INFORMATION OR POST-UPDATE INFORMATION MANAGED, IN MANAGEMENT REGION OF FILE, AS SAMPLE WHICH CAN BE RANDOMLY ACCESSED |
| 2-4 | INITIAL VALUE REFERENCE DIFFERENCE INFORMATION OR POST-UPDATE INFORMATION REPLACES PREVIOUS VALUE REFERENCE DIFFERENCE INFORMATION |
| 2-4-1 | SAMPLE STORING INITIAL VALUE REFERENCE DIFFERENCE INFORMATION OR POST-UPDATE INFORMATION MANAGED, IN MANAGEMENT REGION OF FILE, AS SAMPLE WHICH CAN BE RANDOMLY ACCESSED |

Fig. 25

```
[
    "extensions": [{
        "MPEG_dynamic_scene": [
            "mimeType": application/json-patch+json,
            "uri": scen_update.json-patch,
            "uri_for_random_access": random_access.json,
        ]
    }]
]
```

INFORMATION PROCESSING DEVICE AND METHOD

CROSS-REFERENCE TO RELATED APPLICATIONS

This application is based on PCT filing PCT/JP2021/036905, filed Oct. 6, 2021, which claims priority to U.S. Provisional Patent Application Nos. 63/088,671, filed Oct. 7, 2020, and 63/134,238, filed Jan. 6, 2021, the entire contents of each are incorporated herein by reference in its entirety.

TECHNICAL FIELD

The present disclosure relates to an information processing device and method, and particularly relates to an information processing device and method capable of suppressing an increase in processing load when randomly accessing scene descriptions.

BACKGROUND ART

There has thus far been glTF (The GL Transmission Format) (registered trademark) 2.0, which is a format for placing three-dimensional (3D) objects in three-dimensional space (see, for example, NPL 1).

Recently, in the Moving Picture Experts Group (MPEG)-I Scene Description, extending glTF 2.0 and delivering difference information from a previous state as a JSON patch to update a scene description has been considered (see, for example, NPL 2 to NPL 4).

In the MPEG-I Scene Description, storing JSON patches, which are scene description update information, in the International Organization for Standardization Base Media File Format (ISOBMFF) has been considered, and investigations have been made into using an extension based on the Web Resource in ISOBMFF standard as a method for doing so (see, for example, NPL 3, NPL 5, and NPL 6).

Furthermore, delivering updated scene descriptions is being investigated, and using those scene descriptions for random access has been considered (see, for example, NPL 2 and NPL 3).

CITATION LIST

Non Patent Literature

[NPL 1]
Saurabh Bhatia, Patrick Cozzi, Alexey Knyazev, Tony Parisi, "Khronos glTF2.0", https://github.com/Khronos-Group/glTF/tree/master/specification/2.0, Jun. 9, 2017
[NPL 2]
Lukasz Kondrad, Imed Bouazizi, "Technologies under Considerations on Scene Description for MPEG Media", ISO/IEC JTC1/SC29/WG11 MPEG2020/N19446, Jul. 3, 2020
[NPL 3]
Ozgur Oyman, Robert Watts, "Further Support for Dynamic Scene Updates", ISO/IEC JTC1/SC29/WG11 MPEG2020/M54841, October 2020, Virtual Meeting
[NPL 4]
P. Bryan, M. Nottingham, "JavaScript (registered trademark) Object Notation (JSON) Patch", Internet Engineering Task Force (IETF), RFC6902, https://datatracker.ietf.org/doc/html/rfc6902, April 2013
[NPL 5]
"Information technology—Coding of audio-visual objects—Part 12: ISO base media file format", ISO/IEC 14496-12, 2015-02-20
[NPL 6]
"Information technology—MPEG Systems Technologies—Part 15: Carriage of Web Resources in ISOBMFF", ISO/IEC JTC 1/SC 29/WG 11 N18639, ISO/IEC 23001-15, Aug. 12, 2019

SUMMARY

Technical Problem

However, with past methods, there has been a risk of increasing the processing load on client devices that randomly access scene descriptions.

Having been achieved in view of such circumstances, the present disclosure makes it possible to suppress an increase in processing loads when randomly accessing scene descriptions.

Solution to Problem

An information processing device according to one aspect of the present technique is an information processing device including: an update information generation unit that generates, as update information for updating spatial arrangement information for arranging at least one 3D object in a 3D space, initial value reference difference information that is difference information which uses an initial value of the spatial arrangement information as a reference, or post-update information in which an update to the initial value reference difference information is reflected in the initial value of the spatial arrangement information; and a file generation unit that generates an update file which stores the update information, and stores the initial value reference difference information or the post-update information in the update file as a random access point.

An information processing method according to one aspect of the present technique is an information processing method including: generating, as update information for updating spatial arrangement information for arranging at least one 3D object in a 3D space, initial value reference difference information that is difference information which uses an initial value of the spatial arrangement information as a reference, or post-update information in which an update to the initial value reference difference information is reflected in the initial value of the spatial arrangement information; and generating an update file which stores the update information, and storing the initial value reference difference information or the post-update information in the update file as a random access point.

An information processing device according to another aspect of the present technique is an information processing device including: an update information obtainment unit that obtains initial value reference difference information or post-update information, which is stored as a random access point in an update file storing update information for updating spatial arrangement information for arranging at least one 3D object in a 3D space, as the update information, the initial value reference difference information being difference information that uses an initial value of the spatial arrangement information as a reference and the post-update information being information in which an update to the initial value reference difference information is reflected in the initial value of the spatial arrangement information; and a spatial arrangement information generation unit that generates the spatial arrangement information at an update application time of the initial value reference difference information by reflecting the update to the initial value reference difference information in the initial value of the spatial arrangement information or by applying the post-update information.

An information processing method according to another aspect of the present technique is an information processing method including: obtaining initial value reference difference information or post-update information, which is stored as a random access point in an update file storing update information for updating spatial arrangement information for arranging at least one 3D object in a 3D space, as the update information, the initial value reference difference information being difference information that uses an initial value of the spatial arrangement information as a reference and the post-update information being information in which an update to the initial value reference difference information is reflected in the initial value of the spatial arrangement information; and generating the spatial arrangement information at an update application time of the initial value reference difference information by reflecting the update to the initial value reference difference information in the initial value of the spatial arrangement information or by applying the post-update information.

In an information processing device and method according to one aspect of the present technique, as update information for updating spatial arrangement information for arranging at least one 3D object in a 3D space, initial value reference difference information that is difference information which uses an initial value of the spatial arrangement information as a reference, or post-update information in which an update to the initial value reference difference information is reflected in the initial value of the spatial arrangement information, is generated; and an update file which stores the update information is generated, and the initial value reference difference information or the post-update information is stored in the update file as a random access point.

In an information processing device and method according to another aspect of the present technique, initial value reference difference information or post-update information, which is stored as a random access point in an update file storing update information for updating spatial arrangement information for arranging at least one 3D object in a 3D space, is obtained as the update information, the initial value reference difference information being difference information that uses an initial value of the spatial arrangement information as a reference and the post-update information being information in which an update to the initial value reference difference information is reflected in the initial value of the spatial arrangement information; and the spatial arrangement information at an update application time of the initial value reference difference information is generated by the update to the initial value reference difference information being reflected in the initial value of the spatial arrangement information or by the post-update information being applied.

BRIEF DESCRIPTION OF DRAWINGS

FIG. 3 is a diagram illustrating an example of the content of a file in the JSON format.

FIG. 5 is a diagram illustrating an example of the content of a file in the JSON format.

FIG. 7 is a diagram illustrating an example of the content of a buffer object, a buffer view object, and an accessor object.

FIG. 10 is a diagram illustrating a JSON patch.

FIG. 13 is a diagram illustrating update information of a random access point.

FIG. 15 is a diagram illustrating an example of link information.

FIG. 17 is a diagram illustrating an example of the storage of update information.

FIG. 18 is a diagram illustrating an example of a SyncSampleBox.

FIG. 19 is a diagram illustrating an example of the semantics of codec_specific_parameters.

FIG. 21 is a diagram illustrating an example of a SampleDependencyTypeBox.

FIG. 23 is a diagram illustrating update information of a random access point.

FIG. 25 is a diagram illustrating an example of link information.

DESCRIPTION OF EMBODIMENTS

Hereinafter, modes for carrying out the present disclosure (hereinafter referred to as "embodiments") will be described. The descriptions will be given in the following order.

1. MPEG-I Scene Description
2. Transmission of Initial Value Reference Difference Information
3. Transmission of Initial Value Reference Difference Information or Post-Update Information
4. First Embodiment (File Generation Device)
5. Second Embodiment (Client Device)
6. Supplementary Notes

1. MPEG-I Scene Description

<Documents Supporting Technical Content and Terms>

The scope disclosed in the present technique is not limited to the content described in the embodiments, and also includes the content described in the following Non-Patent Literature and the like that were publicly known at the time of filing, the content of other literature referred to in the Non-Patent Literature, and the like.

[NPL 1] (see above)
[NPL 2] (see above)
[NPL 3] (see above)
[NPL 4] (see above)
[NPL 5] (see above)
[NPL 6] (see above)

In other words, the content described in the aforementioned Non-Patent Literature and content of other literature referred to in the Non-Patent Literature also form the basis for determining the support requirements. For example, even if syntax or terms such as glTF 2.0 or its extensions described in NPL 1 to NPL 3 are not directly defined in the present disclosure, those items fall within the scope of the present disclosure, and the support requirements for the claims are considered to be satisfied. Similarly, even if technical terms such as "parsing", "syntax", "semantics", and the like, for example, are not directly defined in the present disclosure, those items fall within the scope of the present disclosure, and the support requirements for the claims are considered to be satisfied.

<glTF 2.0>

Figure 1:
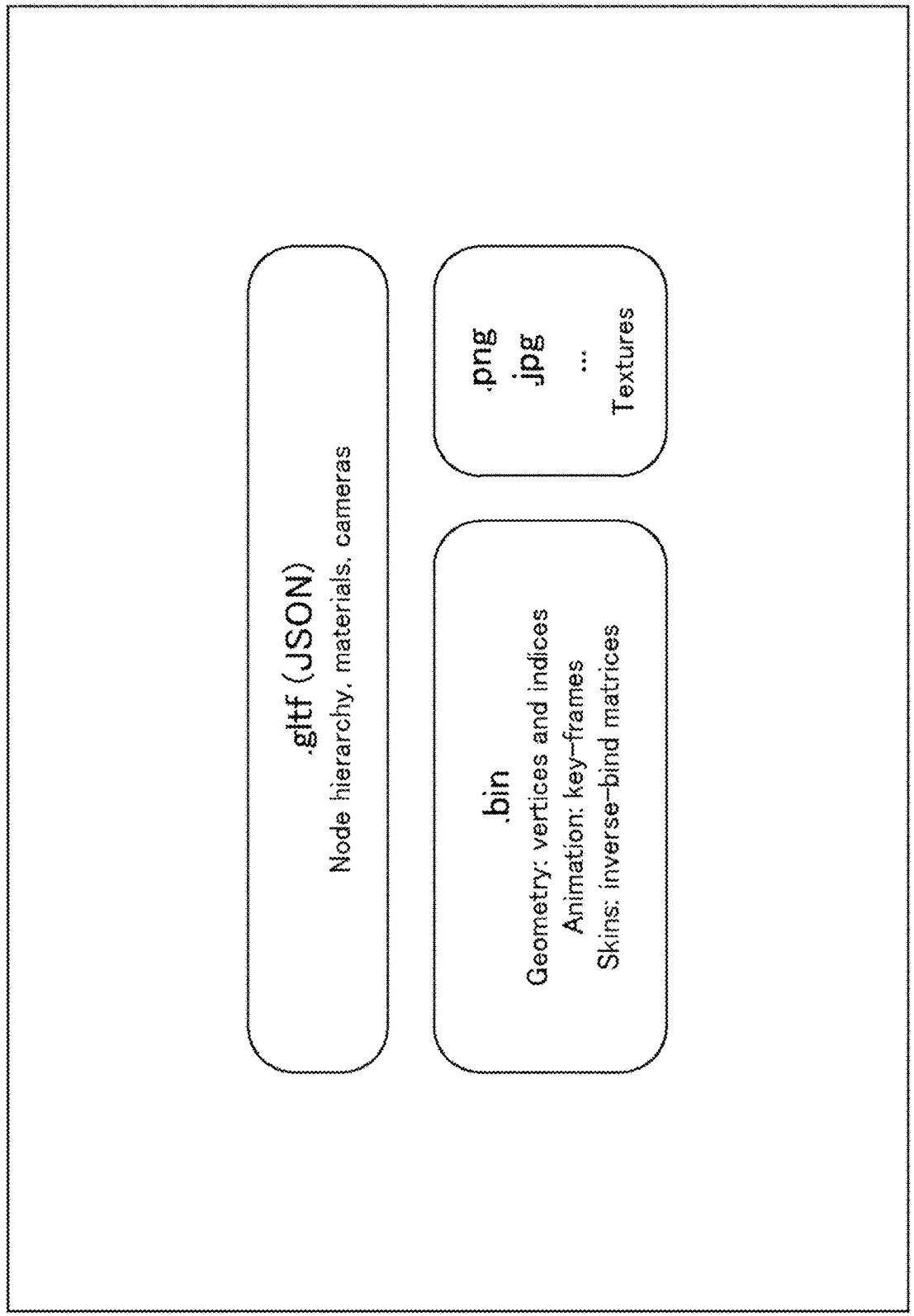
FIG. 1 is a diagram illustrating an example of the main configuration of glTF 2.0.

There has thus far been glTF (The GL Transmission Format) (registered trademark) 2.0, which is a format for placing three-dimensional (3D) objects in three-dimensional space, as described in NPL 1, for example. In glTF 2.0, a file is constituted by a JSON format file (.glTF), a binary file (.bin), and an image file (.png, .jpg, or the like), as illustrated in FIG. 1, for example. The binary file stores binary data such as geometry and animations. The image file stores data such as textures and the like.

The JSON format file is a scene description file written in JSON (JavaScript (registered trademark) Object Notation). A "scene description" is metadata in which (a description of) a scene of 3D content is written. The scene description defines what kind of scene the scene is. A scene description file is a file storing such a scene description. In the present disclosure, the scene description file may also be called a "scene detail file".

The content of a JSON format file is constituted by a sequence of key and value pairs. The following is an example of this format.

"KEY":"VALUE"

The "key" is constituted by a character string. The "value" is constituted by numbers, strings, Boolean values, arrays, objects, null, or the like.

Multiple key/value pairs ("KEY":"VALUE") can also be combined using {and}(curly brackets). The content within such curly brackets is also called a JSON object. The following is an example of this format.

"user":{"id":1, "name":"tanaka" }

In this example, a JSON object is defined as a pair of "id":1 and "name":"tanaka" as the value corresponding to the key (user).

Zero or more values can also be arrayed using [and] (square brackets). This array is also called a "JSON array". For example, a JSON object can be applied as an element of this JSON array. The following is an example of this format.

test": ["hoge", "fuga", "bar" ]
"users": [{"id": 1, "name":"tanaka" },{"id": 2, "name": "yamada" },{"id": 3, "name sato" }]

Figure 2:
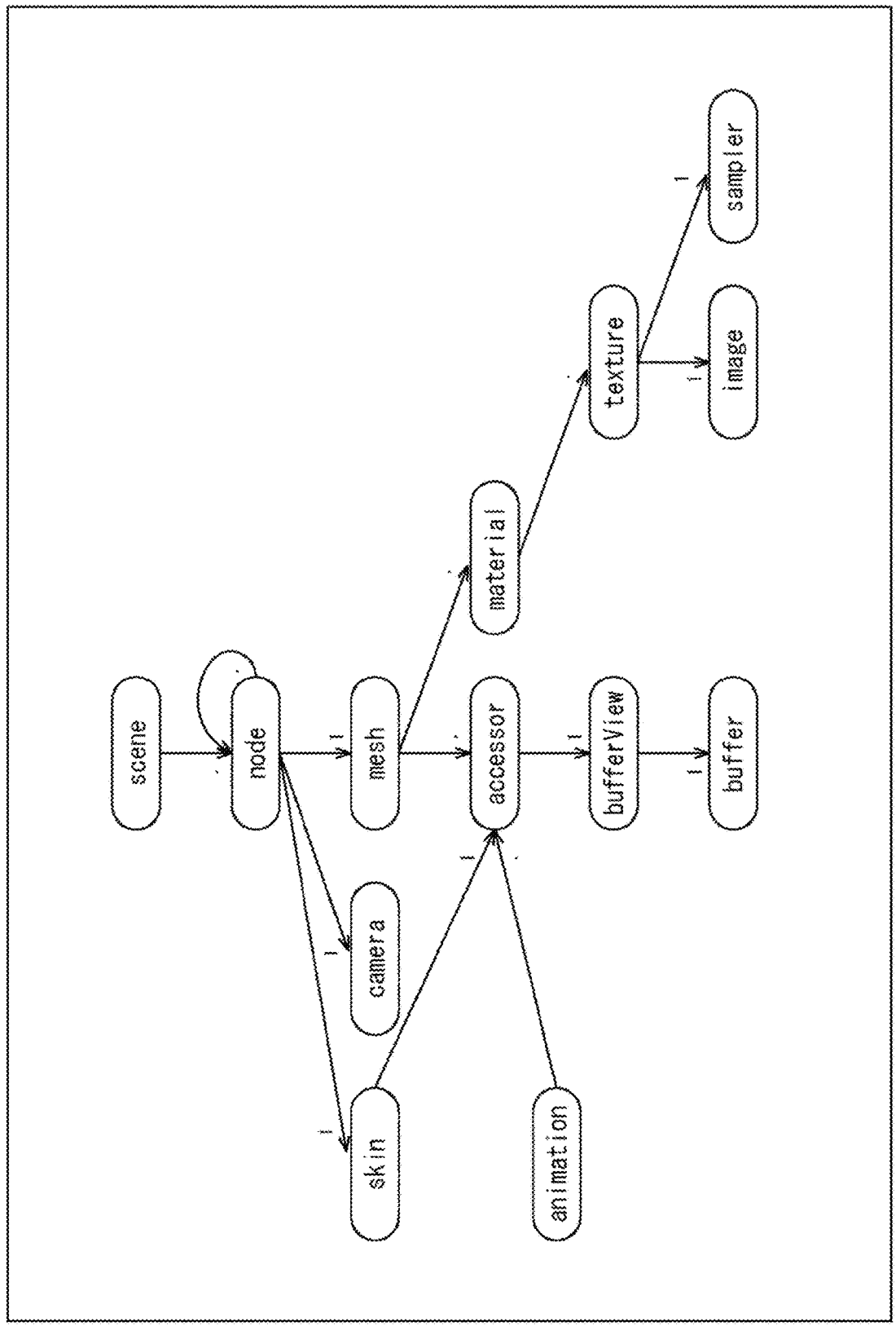
FIG. 2 is a diagram illustrating an example of a glTF object and a reference relationship.

The glTF objects that can be written at the top level of a JSON format file, and the reference relationships thereof, are illustrated in FIG. 2. The ovals in the tree structure illustrated in FIG. 2 indicate the objects, and the arrows between the objects indicate the reference relationships. As illustrated in FIG. 2, objects such as "scene", "node", "mesh", "camera", "skin", "material", and "texture" are described at the top level of the JSON format file.

An example of the content of such a JSON format file (scene description) is illustrated in FIG. 3. A JSON format file 20 in FIG. 3 illustrates an example of part of the description of the highest level. In this JSON format file 20, all of top-level objects 21 used are written at the top level. These top-level objects 21 are the glTF objects illustrated in FIG. 2. Additionally, in the JSON format file 20, reference relationships between the objects are indicated by an arrow 22. More specifically, the reference relationship is indicated by specifying an index of the elements of the array of the referenced object in the properties of the object at the higher level.

Figure 4:
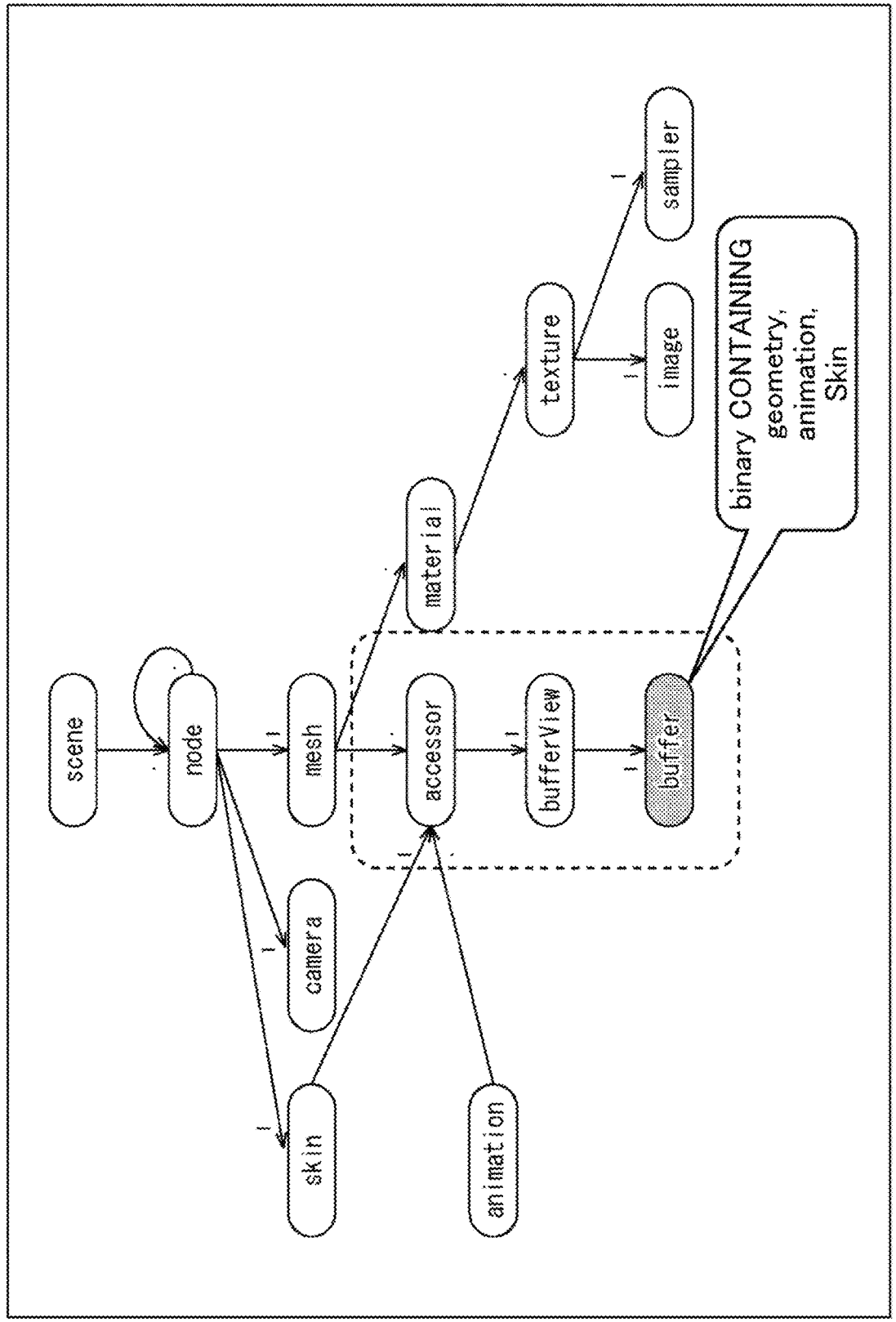
FIG. 4 is a diagram illustrating a method for accessing binary data.

FIG. 4 is a diagram illustrating a method for accessing binary data. As illustrated in FIG. 4, binary data is stored in a buffer object. In other words, information for accessing binary data in the buffer object (e.g., a Uniform Resource Identifier (URI) or the like) is indicated. In a JSON format file, objects such as mesh, camera, skin, or the like can access a buffer object via an accessor object and a bufferView object thereof, as illustrated in FIG. 4.

In other words, in objects such as mesh, camera, skin, and the like, the accessor object to be referenced is specified. An example of the content of a mesh object (mesh) in a JSON format file is illustrated in FIG. 5. For example, as illustrated in FIG. 5, in a mesh object, vertex attributes such as NORMAL, POSITION, TANGENT, TEXCORD_0, and the like are defined as keys, and for each of these attributes, the accessor object to be referenced is specified as a value.

Figure 6:
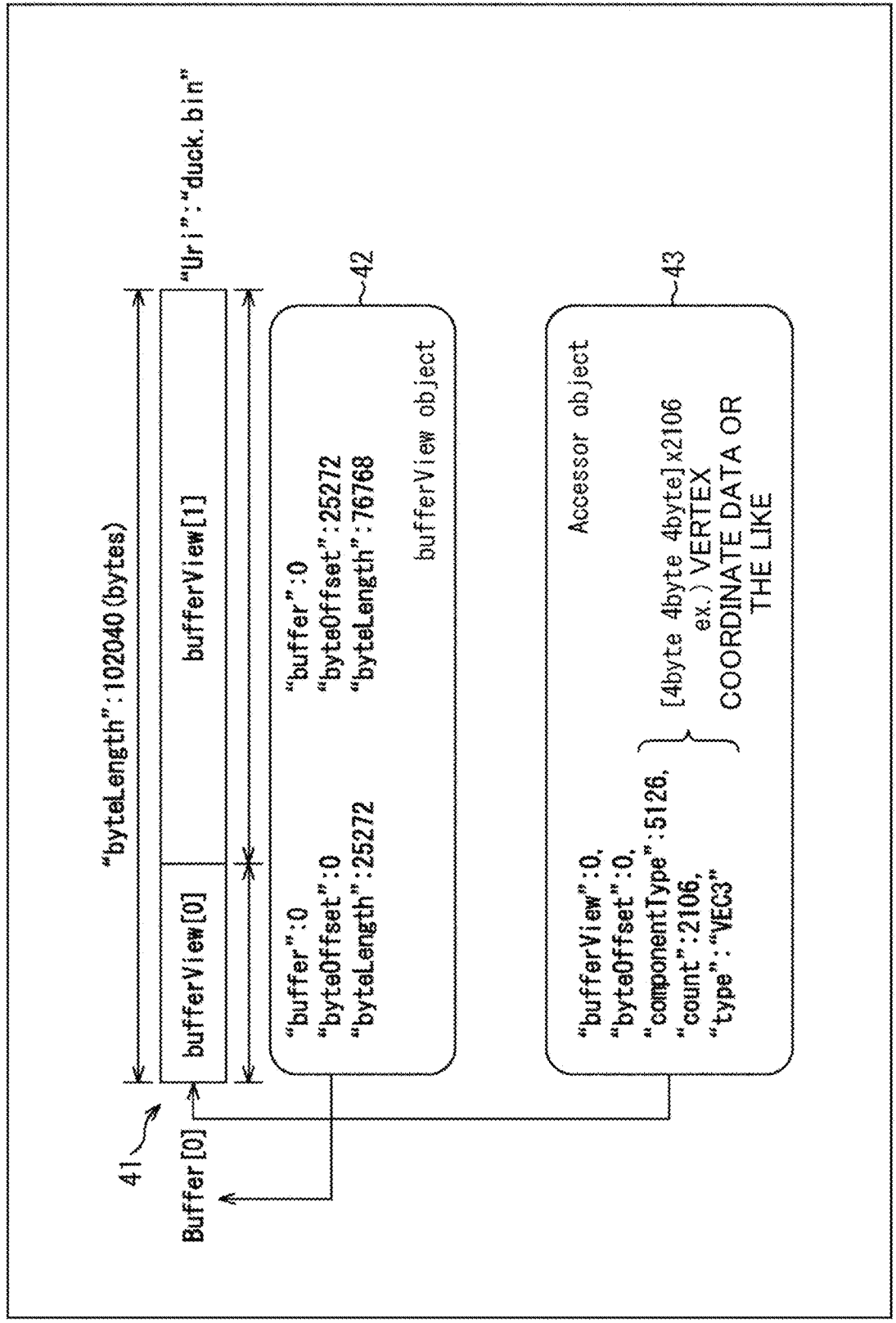
FIG. 6 is a diagram illustrating a relationship between a buffer object, a buffer view object, and an accessor object.

A relationship between buffer objects, bufferView objects, and accessor objects is illustrated in FIG. 6. Additionally, an example of the content of these objects in a JSON format file is illustrated in FIG. 7.

In FIG. 6, a buffer object 41 is an object that stores information for accessing binary data, which is real data (a URI or the like), and information indicating the data length (e.g., the byte length) of the binary data. A in FIG. 7 indicates an example of the content of the buffer object 41. The ""bytelength":102040" in A of FIG. 7 indicates that the byte length of the buffer object 41, as illustrated in FIG. 6, is 102040 bytes. Additionally, the ""uri":"duck.bin"" in A of FIG. 7 indicates that the URI of the buffer object 41, as illustrated in FIG. 6, is "duck.bin".

In FIG. 6, a bufferView object 42 is an object that stores information pertaining to a subset region of the binary data specified in the buffer object 41 (i.e., information pertaining to a part of the region of the buffer object 41). B in FIG. 7 indicates an example of the content of the bufferView object 42. As indicated in FIG. 6 and B of FIG. 7, the bufferView object 42 stores, for example, identification information of the buffer object 41 to which that bufferView object 42 belongs, an offset indicating the position of the bufferView object 42 within that buffer object 41 (e.g., a byte offset), a length (e.g., a byte length) indicating the data length (e.g., the byte length) of the bufferView object 42, and the like.

As indicated by B in FIG. 7, when a plurality of buffer-View objects are present, the information is written for each bufferView object (i.e., for each subset region). For example, information such as ""buffer":0", ""bytelength":25272", ""byteOffset":0", and the like indicated at the top in B of FIG. 7 is the information of the first bufferView object 42 (bufferView[0]) indicated within the buffer object 41 in FIG. 6. Additionally, information such as ""buffer":0", ""bytelength":76768", ""byteOffset":25272", and the like indicated at the bottom in B of FIG. 7 is the information of the second bufferView object 42 (bufferView[1]) indicated within the buffer object 41 in FIG. 6.

The ""buffer":0" of the first bufferView object 42 (buffer-View[0]), indicated in B of FIG. 7, indicates that the identification information of the buffer object 41 to which that bufferView object 42 (bufferView[0]) belongs is "0" (Buffer[0]), as indicated in FIG. 6. The ""bytelength":25272" indicates that the byte length of that bufferView object 42 (bufferView[0]) is 25272 bytes. Furthermore, the ""byteOffset":0" indicates that the byte offset of that bufferView object 42 (bufferView[0]) is 0 bytes.

The ""buffer":0" of the second bufferView object 42 (bufferView[1]), indicated in B of FIG. 7, indicates that the identification information of the buffer object 41 to which that bufferView object 42 (bufferView[0]) belongs is "0" (Buffer[0]), as illustrated in FIG. 6. The ""bytelength":76768" indicates that the byte length of that bufferView object 42 (bufferView[0]) is 76768 bytes. Furthermore, the ""byteOffset":25272" indicates that the byte offset of that bufferView object 42 (bufferView[0]) is 25272 bytes.

In FIG. 6, an accessor object 43 is an object storing information pertaining to a method for interpreting the data of the bufferView object 42. C in FIG. 7 indicates an example of the content of the accessor object 43. As indicated in FIG. 6 and C of FIG. 7, the accessor object 43 stores information such as, for example, identification information of the bufferView object 42 to which that accessor object 43 belongs, an offset indicating the position of the bufferView object 42 within that buffer object 41 (e.g., a byte offset), a component type of that bufferView object 42, the number of data stored in that bufferView object 42, the type of the data stored in that bufferView object 42, and the like. This information is written for each bufferView object.

Information such as ""bufferView":0", ""byteOffset":0", ""componentType":5126", ""count":2106", ""type":"VEC3"", and the like is indicated in the example indicated by C in FIG. 7. The ""bufferView":0" indicates that the identification information of the bufferView object 42 to which the accessor object 43 is "0" (bufferView[0]), as illustrated in FIG. 6. Additionally, the ""byteOffset":0" indicates that the byte offset of that bufferView object 42 (bufferView[0]) is 0 bytes. Furthermore, the ""componentType":5126" indicates that the component type is a FLOAT type (OpenGL macro constant). The ""count":2106" indicates that there are 2106 pieces of data stored in that bufferView object 42 (bufferView[0]). Furthermore, the ""type":"VEC3"" indicates that (the type of) the data stored in the bufferView object 42 (bufferView[0]) is a three-dimensional vector.

All access to data aside from the image is defined by referring to this accessor object 43 (by specifying an accessor index).

<Client Processing>

Processing by the client device in the MPEG-I Scene Description will be described next. The client device obtains the scene description, obtains the data of a 3D object based on that scene description, and then generates a display image using that scene description, the data of the 3D object, and the like.

Figure 8:
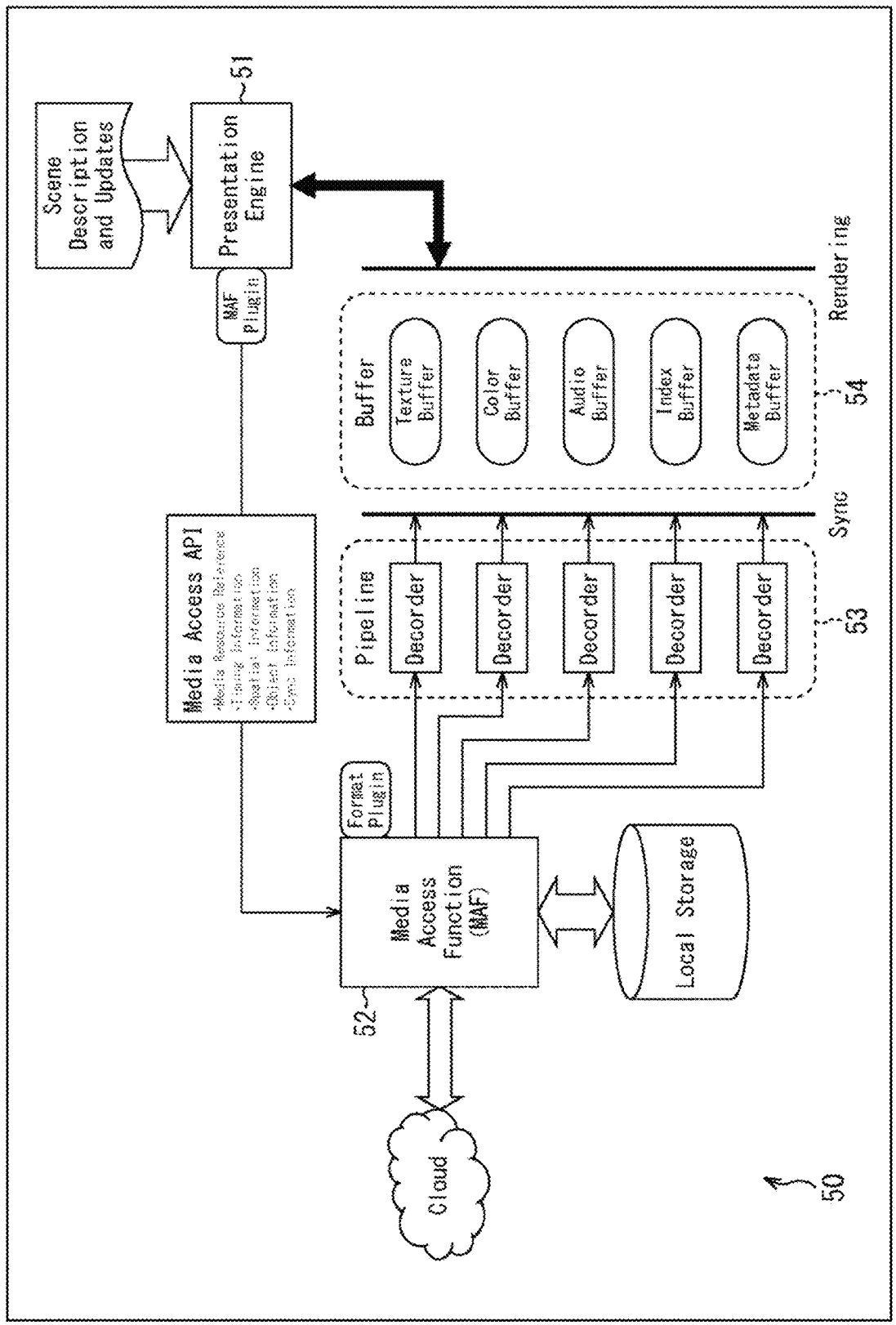
FIG. 8 is a diagram illustrating an example of client processing for an MPEG-I Scene Description.

As described in NPL 2, a Presentation Engine, a Media Access function, and the like perform the processing in the client device. For example, as illustrated in FIG. 8, a Presentation Engine 51 of a client device 50 obtains initial values of the scene description, information for updating that scene description (also called "update information" hereinafter), and the like, and then generates a scene description for a processing target time. The Presentation Engine 51 then analyzes the scene description and identifies the media to be played back (moving images, audio, and the like). Then, the Presentation Engine 51 makes a request to obtain that media to the Media Access function 52 via a Media Access API (Application Program Interface). The Presentation Engine 51 also makes settings for pipeline processing, specifies buffers, and the like.

The Media Access function 52 obtains various types of data in the media requested by the Presentation Engine 51 from the cloud, local storage, and the like. The Media Access function 52 supplies the various types of data in the obtained media (encoded data) to a pipeline 53.

The pipeline 53 decodes the various types of data (encoded data) in the supplied media through pipeline processing, and supplies the decoding result to a buffer 54. The buffer 54 holds the various types of data in the supplied media.

The Presentation Engine 51 performs rendering and the like using the various types of data in the media held in the buffer 54.

<Scene Description Update>

The scene description is spatial arrangement information for arranging at least one 3D object in a 3D space. The content of the scene description can be updated along the time axis. In other words, the arrangement of the 3D objects can be updated over time.

Figure 9:
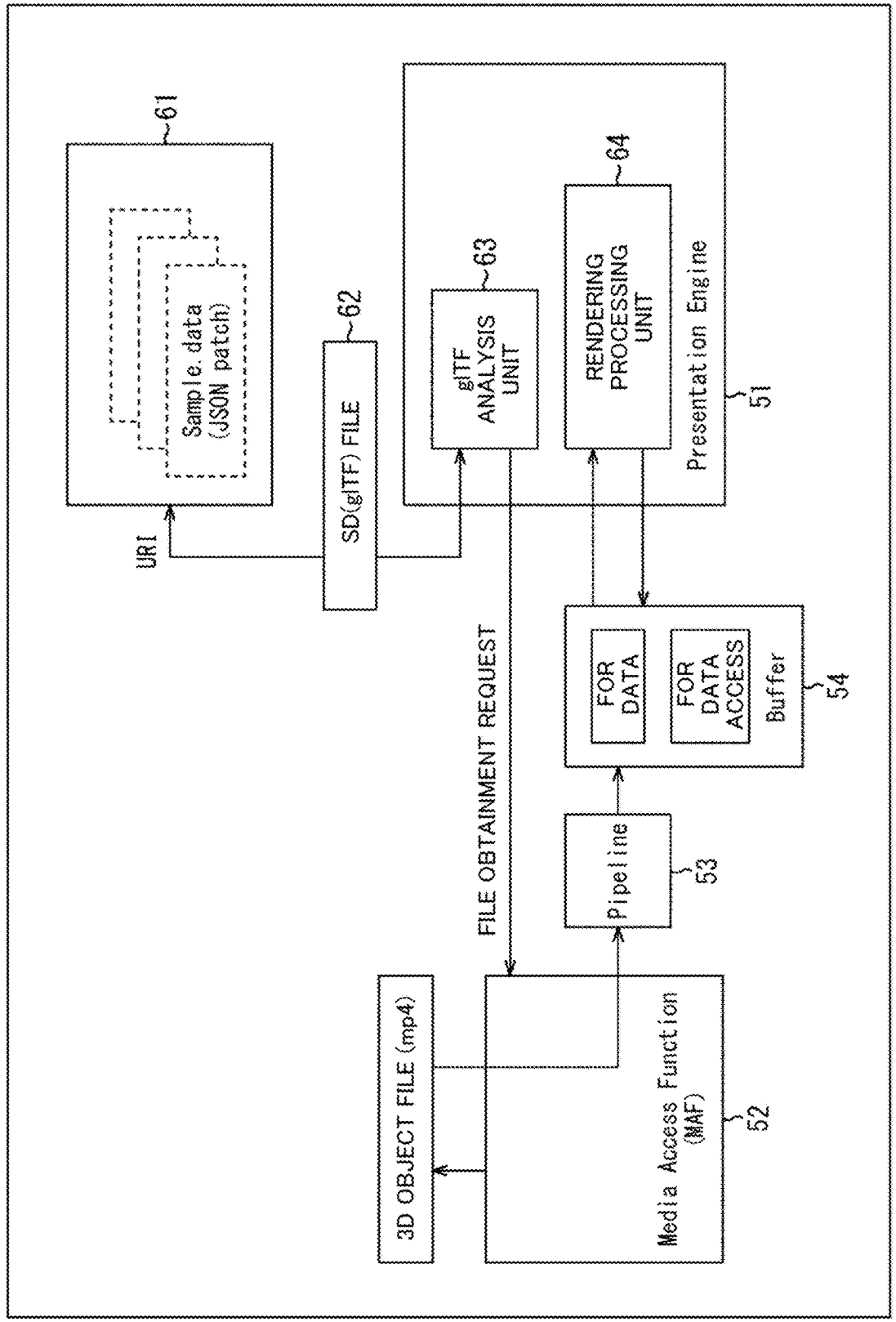
FIG. 9 is a diagram illustrating updating of a scene description using a JSON patch.

As described in NPL 2 and NPL 3, with MPEG-I Scene Description, such updating of the scene description is performed using a JSON patch. In other words, update information 61 for the scene description at each time is written as a JSON patch and provided to the client device, as illustrated in FIG. 9. For example, a hash value of the scene description to be updated, information on the timing at which the update is executed, and the like are written in this JSON patch. JSON patches are delivered using Web Resource in ISOBMFF (International Organization for Standardization Base Media File Format), described in NPL 3 and NPL 6.

An SD (glTF) file 62, in which the initial values of the scene description are stored, stores link information to the update information 61. For example, a Uniform Resource Locator (URL) from which the ISOBMFF containing the update information 61 (the JSON patch) is delivered is described in the MPEG_dynamic_scene extension within glTF.

In FIG. 9, a glTF analysis unit 63 of the Presentation Engine 51 obtains the update information 61 corresponding to the processing target time through the link information in the SD (glTF) file 62. The glTF analysis unit 63 then updates the scene description using the update information 61 and generates a scene description corresponding to the processing target time.

The glTF analysis unit 63 analyzes the generated scene description corresponding to the processing target time, and makes a request to obtain the necessary file to the Media Access function 52. Then, as described above, the Media Access function 52 obtains the files, which are decoded by the pipeline 53, and the decoding result is held in the buffer 54.

A rendering processing unit 64 of the Presentation Engine 51 generates the display image by performing rendering and the like also using the data in the media held in the buffer 54. In this manner, the client device 50 can generate a display image based on the scene description corresponding to the processing target time.

As described in NPL 5, JSON patches express operations such as additions, updates, and deletions to a JSON document, and a JSON patch itself is also expressed as a JSON document. For example, as illustrated in FIG. 10, when a JSON patch 72 is applied to an original JSON document 71, the JSON document after the application will look like a JSON document 73.

As described in NPL 2 and NPL 3, with the MPEG-I Scene Description, an ISOBMFF is delivered including the original SD file, which is the initial scene description before the update, and a JSON patch, which stores difference information from the previous update, as a sample. The client device calculates a unique value such as a hash code (also called a "transaction ID") from the scene description currently loaded into the memory. The transaction ID of the scene description to which the update is applied, and the difference information from that scene description, are provided to the client device using the JSON patch document. The client device applies the update in the JSON patch when the transaction ID calculated from the scene description currently loaded matches the transaction ID of the JSON patch.

Figure 11:
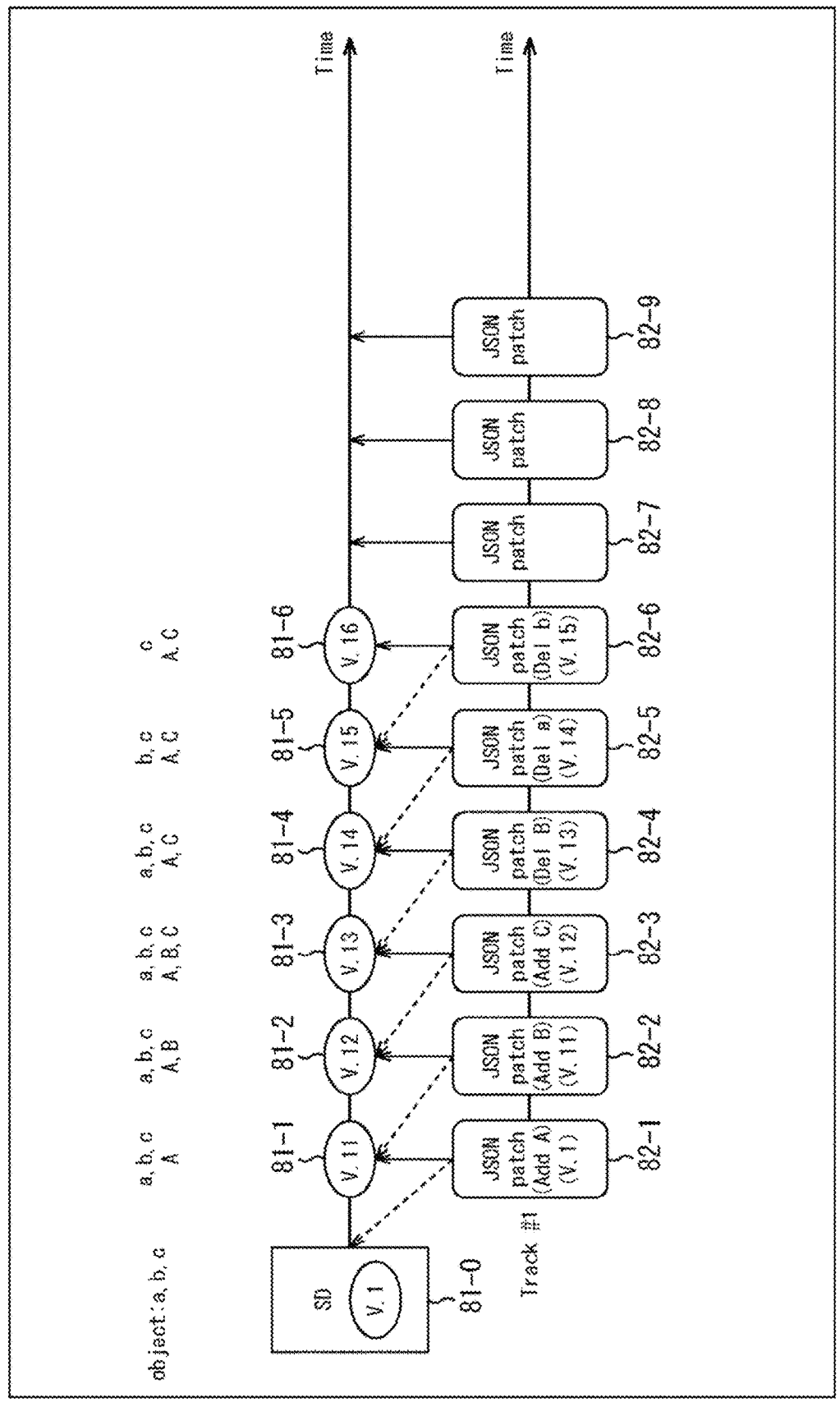
FIG. 11 is a diagram illustrating updating of a scene description through normal playback.

Assume, for example, that a scene description 81 is to be played back. The scene description 81 can change in the time direction. A scene description 81-0 illustrated in FIG. 11 is the initial values of the scene description 81. Assume that the transaction ID of this scene description 81-0 is V.1. The scene description 81-0 arranges 3D objects a, b, and c in a 3D space.

Update information for this scene description 81 is supplied to the client device as JSON patch samples, as indicated by JSON patch 82-1 to JSON patch 82-9. The update information for the scene description 81, such as the JSON patch 82-1 to the JSON patch 82-9, are called a "JSON patch 82". The JSON patch 82-1 to the JSON patch 82-9 are each one sample of the JSON patch 82. The samples of the JSON patch 82 are stored in a track which stores the update information of the ISOBMFF (e.g., Track #1), and are supplied to the client device.

The JSON patch 82-1 is update information that adds an object A to the scene description for which the transaction ID is V.1 (Add A). Accordingly, a scene description 81-1 is obtained by the client device applying the sample of the JSON patch 82-1 to the scene description 81-0. In other words, the scene description 81-1 arranges the objects a, b, c, and A in the 3D space. Assume that the transaction ID of the scene description 81-1 is V.11.

The JSON patch 82-2 is update information that adds an object B to the scene description for which the transaction ID is V.11 (Add B). Accordingly, a scene description 81-2 is obtained by the client device applying the sample of the JSON patch 82-2 to the scene description 81-1. In other words, the scene description 81-2 arranges the objects a, b, c, A, and B in the 3D space. Assume that the transaction ID of the scene description 81-2 is V.12.

The JSON patch 82-3 is update information that adds an object C to the scene description for which the transaction ID is V.12 (Add C). Accordingly, a scene description 81-3 is obtained by the client device applying the sample of the JSON patch 82-3 to the scene description 81-2. In other words, the scene description 81-3 arranges the objects a, b, c, A, B, and C in the 3D space. Assume that the transaction ID of the scene description 81-3 is V.13.

The JSON patch 82-4 is update information that deletes the object B from the scene description for which the transaction ID is V.13 (Del B). Accordingly, a scene description 81-4 is obtained by the client device applying the sample of the JSON patch 82-4 to the scene description 81-3. In other words, the scene description 81-4 arranges the objects a, b, c, A, and C in the 3D space. Assume that the transaction ID of the scene description 81-4 is V.14.

The JSON patch 82-5 is update information that deletes the object a from the scene description for which the transaction ID is V.14 (Del a). Accordingly, a scene description 81-5 is obtained by the client device applying the sample of the JSON patch 82-5 to the scene description 81-4. In other words, the scene description 81-5 arranges the objects b, c, A, and C in the 3D space. Assume that the transaction ID of the scene description 81-5 is V.15.

The JSON patch 82-6 is update information that deletes the object b from the scene description for which the transaction ID is V.15 (Del b). Accordingly, a scene description 81-6 is obtained by the client device applying the sample of the JSON patch 82-6 to the scene description 81-5. In other words, the scene description 81-6 arranges the objects c, A, and C in the 3D space. Assume that the transaction ID of the scene description 81-6 is V.16.

The scene description 81 is updated by applying the samples of JSON patch 82-7 to JSON patch 82-9 in a similar manner. During normal playback, when the sequence is played back in order along the time axis from the beginning, the sample of each JSON patch 82 in track #1 are applied at their respective timings, in order from the sample of the JSON patch 82-1. In other words, the scene description 81 is updated at each timing, and the content thereof changes along the time axis, from the scene description 81-0, to the scene description 81-1, to the scene description 81-2, and so on.

Figure 12:
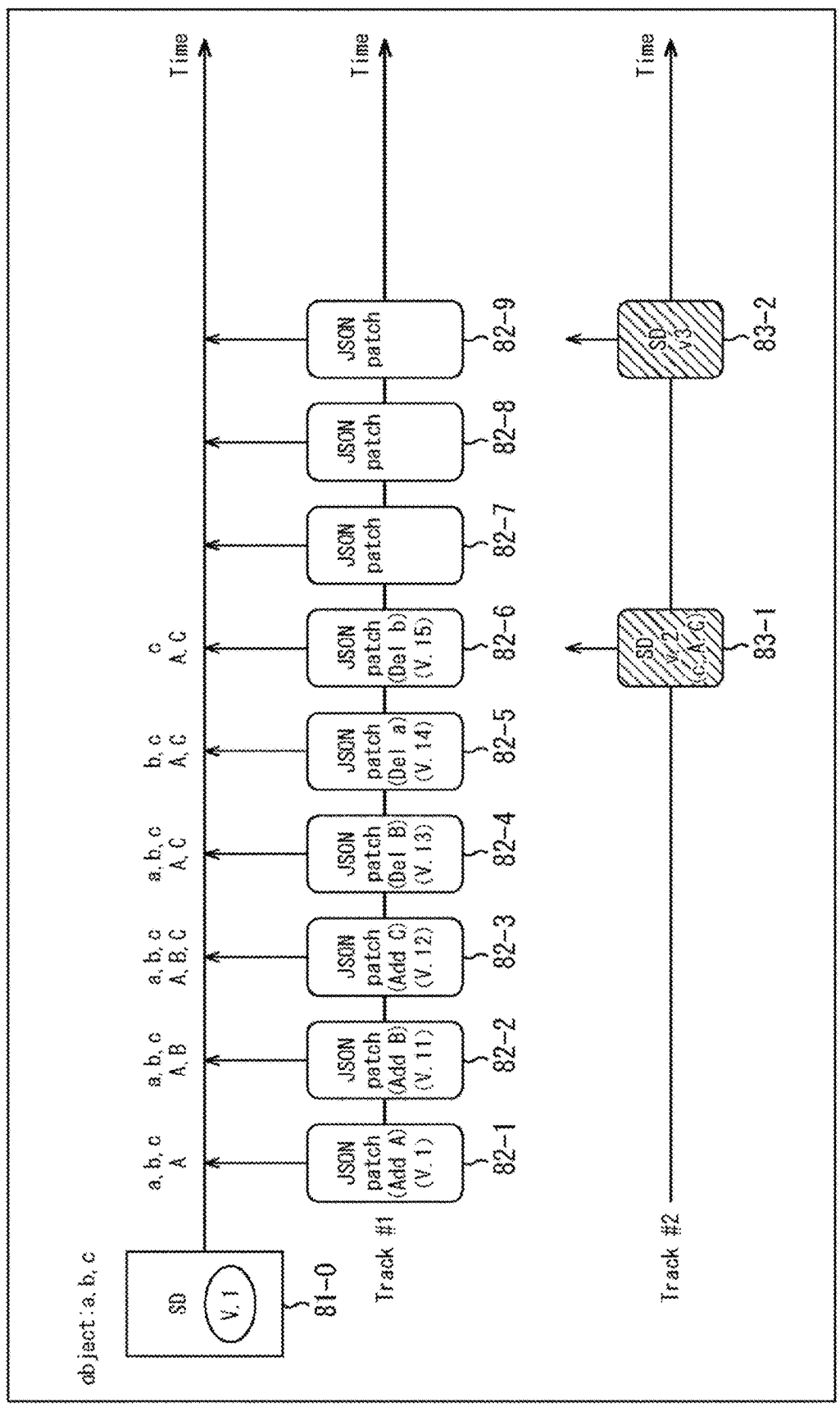
FIG. 12 is a diagram illustrating updating of a scene description through random access.

The updating of this scene description 81 can be performed through what is known as random access. In other words, rather than performing the update of the scene description 81 in time series, the client device can start from an update at a timing partway through. Accordingly, random access points which can be accessed without following the time series are provided, and updated scene descriptions (also called "post-update information" in the present specification) are prepared as data of those random access points. As illustrated in FIG. 12, this post-update information is stored in a different track (Track #2) from the track in which the above-described JSON patch 82 is stored (Track #1).

In FIG. 12, a scene description 83-1 and a scene description 83-2 are post-update information prepared as random access points. The post-update information prepared as random access points, such as the scene description 83-1 and the scene description 83-2, is called a "scene description 83". In other words, the scene description 83-1 and the scene description 83-2 are each one sample in the scene description 83.

The sample of the scene description 83-1 corresponds to the sample of the JSON patch 82-6. In other words, the content of the scene description 83-1 is equivalent to a result of applying, to the scene description 81-0, the updates in JSON patch 82-1 to JSON patch 82-6 (the scene description 81-6 in FIG. 11). That is, when the client device randomly accesses the sample of the scene description 83-1, the scene description 81-6 in FIG. 11 is obtained without performing the updates in JSON patch 82-1 to JSON patch 82-6. In other words, random access is possible. When the subsequent normal playback is performed, the sample of the JSON patch 82-7 is applied to the scene description 83-1.

The sample of the scene description 83-2 corresponds to the sample of the JSON patch 82-9. In other words, the content of the scene description 83-2 is equivalent to a result of applying, to the scene description 81-0, the updates in JSON patch 82-1 to JSON patch 82-9. That is, when the client device randomly accesses the sample of the scene description 83-2, the update results of JSON patch 82-1 to JSON patch 82-9 are obtained without performing those updates. In other words, random access is possible. When the subsequent normal playback is performed, the sample of the next JSON patch 82 is applied to the scene description 83-2.

However, with such a method, there has been a risk of increasing the processing load on client devices that randomly access scene descriptions. In other words, the above-described scene description 83 (post-update information) is the scene description itself (the entire scene description), and thus has a large amount of data. Additionally, of the content of the scene description 83, information not updated from the scene description 81-0 is redundant. As such, there has been a risk of the amount of processing, processing time, buffer volume, and the like of the client device increasing during random access.

2. Transmission of Initial Value Reference Difference Information

<Method 1>

Accordingly, as a random access point, update information indicating a difference from the initial values of the scene description to that timing (initial value reference difference information) is prepared, and that initial value reference difference information is provided when the client device makes a random access. In other words, the initial value reference difference information is stored in a file as a random access point, as indicated in the uppermost row of the table in FIG. 13 (Method 1).

For example, an information processing device that generates a file which stores update information of a scene description includes: an update information generation unit that generates, as update information for updating spatial arrangement information for arranging at least one 3D object in a 3D space (i.e., the scene description), initial value reference difference information that is difference information which uses an initial value of the spatial arrangement information as a reference; and a file generation unit that generates an update file which stores the update information, and stores the initial value reference difference information in the update file as a random access point.

Additionally, for example, an information processing method for generating a file which stores update information of a scene description includes: generating, as update information for updating spatial arrangement information for arranging at least one 3D object in a 3D space (i.e., the scene description), initial value reference difference information that is difference information which uses an initial value of the spatial arrangement information as a reference; and generating an update file which stores the update information, and storing the initial value reference difference information in the update file as a random access point.

For example, an information processing device that obtains a file which stores update information of a scene description, and updates the scene description, includes: a difference information obtainment unit that obtains initial value reference difference information, which is stored as a random access point in an update file storing update information for updating spatial arrangement information for arranging at least one 3D object in a 3D space (i.e., the scene description), and which is difference information that uses an initial value of the spatial arrangement information as a reference; and a spatial arrangement information generation unit that generates the spatial arrangement information at an update application time of the initial value reference difference information by reflecting the update to the initial value reference difference information in the initial value of the spatial arrangement information.

Additionally, for example, an information processing method for obtaining a file which stores update information of a scene description, and updating the scene description, includes: obtaining initial value reference difference information, which is stored as a random access point in an update file storing update information for updating spatial arrangement information for arranging at least one 3D object in a 3D space (i.e., the scene description), and which is difference information that uses an initial value of the spatial arrangement information as a reference; and generating the spatial arrangement information at an update application time of the initial value reference difference information by reflecting the update to the initial value reference difference information in the initial value of the spatial arrangement information.

The initial value reference difference information indicates a difference between the initial values of the spatial arrangement information (the scene description) and the spatial arrangement information at the timing of that random access point (the post-update information). In other words, the initial value reference difference information can be provided as a JSON patch. For example, in FIG. 12, when the sample of the scene description 83-1 is taken as a random access point and the initial value reference difference information is stored as the data of the random access point, that initial value reference difference information indicates the difference between the scene description 81-0 and the scene description 83-1 (Del a, Del b, Add A, and Add C).

Accordingly, the amount of data provided to the client device can be reduced compared to a case where the sample of the scene description 83-1 is provided. Additionally, by applying the sample of that initial value reference difference information to the scene description 81-0, i.e., by making a single update, the client device can obtain the scene description 83 at the timing of that sample (i.e., the scene description 83-1). This makes it possible to suppress an increase in the amount of processing, processing time, buffer volume, and the like of the client device increasing during random access. In other words, an increase in the processing load on a client device that randomly accesses scene descriptions can be suppressed.

Note that during random access, providing the samples of all JSON patches 82 up to the random access point to the client device and having the client device update the scene description 81 using those JSON patches 82 makes it possible to obtain the scene description 83 at the timing of the random access point (the post-update information). For example, in the case of FIG. 12, by providing each sample of the JSON patch 82-1 to JSON patch 82-6 to the client device that made the random access, and having that client device update the scene description 81-0 using those samples, the (scene description 81-6 equivalent to the) scene description 83-1 is obtained.

However, with this method, it is necessary to obtain a plurality of the JSON patches 82 and update the scene description 81 multiple times, which complicates the processing and risks increasing the processing load on the client device. Additionally, if redundant processing is included in the multiple updates, there is a risk of the processing load on the client device increasing needlessly. For example, in the case of FIG. 12, the updates using the JSON patch 82-2 (Add B) and the JSON patch 82-4 (Del B) are unnecessary. Updating the scene description 81-0 using the initial value reference difference information as described above makes it possible for the client device to efficiently obtain the scene description at the timing of the random access point.

<Method 1-1>

When Method 1 is applied, the initial value reference difference information may be stored in a different track from the previous value reference difference information, as indicated in the second row from the top in the table in FIG. 13 (Method 1-1). Note that the previous value reference difference information is difference information that takes, as a reference, the spatial arrangement information in which updates up to the update information immediately previous are reflected. In other words, the previous value reference difference information is update information (a JSON patch) indicating a difference from the scene description reflecting the updates up to the immediately-previous JSON patch. In the example in FIG. 12, the JSON patch 82 corresponds to the previous value reference difference information. The sample of this previous value reference difference information (the JSON patch 82) is applied in the normal playback of the scene description 81, as described above.

For example, the file generation unit may store the initial value reference difference information in a different track than the previous value reference difference information in the update file. Additionally, the difference information obtainment unit may obtain the initial value reference difference information stored in a different track than the previous value reference difference information in the update file.

Figure 14:
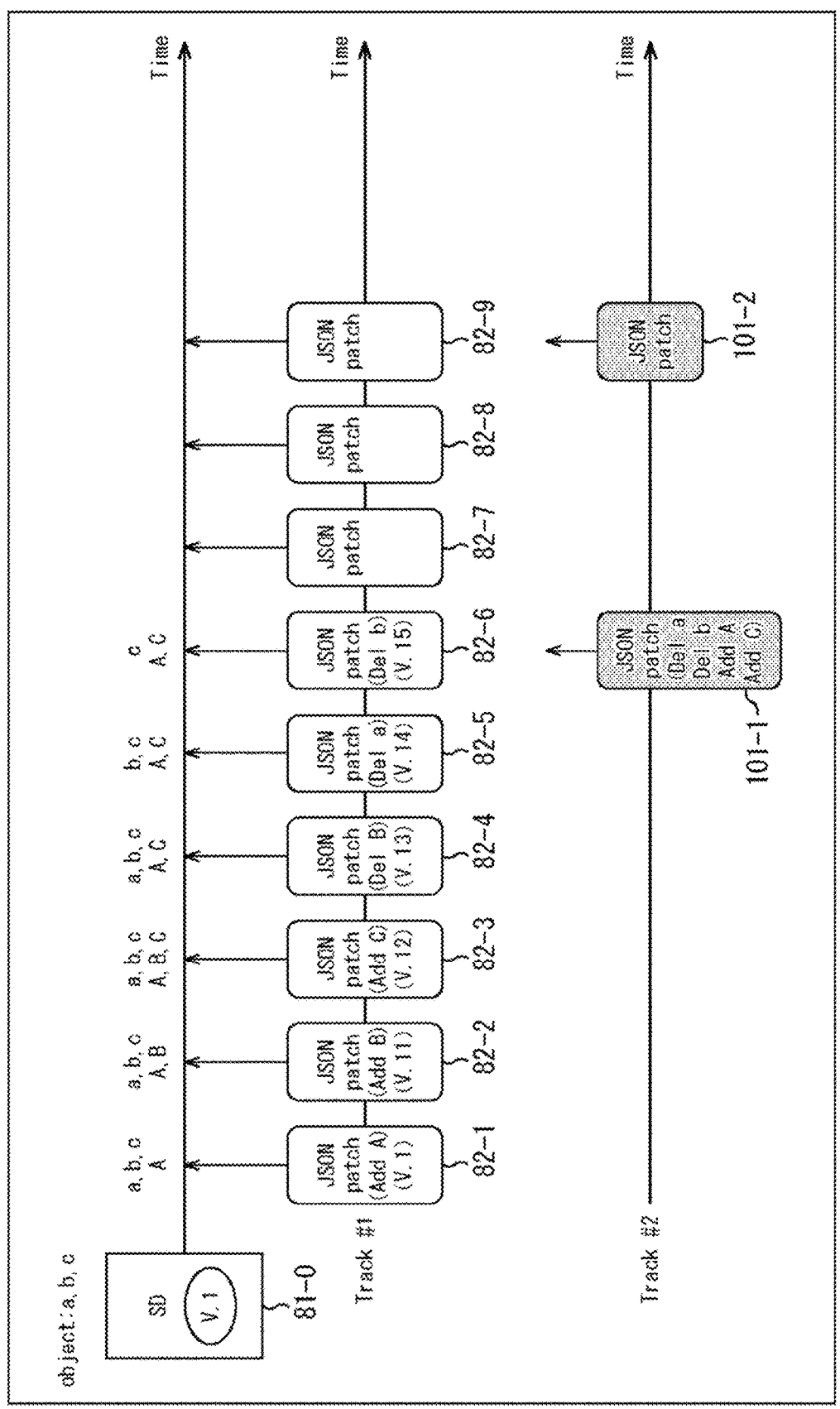
FIG. 14 is a diagram illustrating an example of the storage of update information.

FIG. 14 illustrates an example of this case. In the example in FIG. 14, the initial value reference difference information is prepared as the data of the random access point. In FIG. 14, a JSON patch 101-1 and a JSON patch 101-2 are initial value reference difference information prepared as random access points. The initial value reference difference information prepared as random access points, such as the JSON patch 101-1 and the JSON patch 101-2, is called a "JSON patch 101". In other words, the JSON patch 101-1 and the JSON patch 101-2 are each one of the samples of the JSON patch 101.

In the case of Method 1-1, as illustrated in FIG. 14, the samples of the JSON patch 101 (the initial value reference difference information) are stored in a different track (Track #2) from the track in which the above-described JSON patch 82 is stored (Track #1). Accordingly, by specifying the track, the client device can more easily obtain the samples of the JSON patch 101 (the initial value reference difference information) independently from the samples of the JSON patch 82.

Note that in the example in FIG. 14, the samples of the JSON patch 101 (the initial value reference difference information) may be difference information that takes a scene description aside from the scene description 81-0 (i.e., the initial value of the scene description 81) as a reference. In other words, the samples of the JSON patch 101 (the initial value reference difference information) may be any information that enables the scene description at the timing of the samples to be obtained by performing an update using the JSON patch 101, and any scene description may be used as a reference for that difference.

For example, a scene description for random access may be prepared separate from the scene description 81-0 and stored in track #2, for example. Then, each JSON patch 101 (initial value reference difference information) may indicate a difference from that scene description for random access. For example, the scene description 81-5 (FIG. 11) may be used as this scene description for random access. In this case, the content of the JSON patch 101-1 (FIG. 14) is equivalent to the JSON patch 82-6. In other words, this makes it possible to reduce the amount of data in the JSON patch 101-1. Although the overall data amount depends on the number of random access points, the details of the update, and the like, these factors may be taken into account to set the scene description used as the random access point so as to reduce the overall amount of data, for example.

<Method 1-1-1>

When applying Method 1-1, link information to the track in which the sample of the initial value reference difference information is stored may be stored in the initial values of the scene description (SD) as link information for random access (Method 1-1-1), as indicated in the third row from the top in the table in FIG. 13.

For example, the file generation unit may generate an initial value file which stores the initial value of the spatial arrangement information, and may store link information indicating a link to the track where the initial value reference difference information is stored as the link information for random access in that initial value file. Additionally, the difference information obtainment unit may obtain the initial value reference difference information using link information indicating a link to the track in which the initial value reference difference information is stored, stored as link information for random access in an initial value file storing the initial value of the spatial arrangement information.

FIG. 15 illustrates part of an example of the content of the scene description 81-0 in such a case. As illustrated in FIG. 15, link information ("uri_for_randomaccess":scene_updata_type2.json-patch}) to the track in which the sample of the initial value reference difference information is stored is written in the scene description 81-0 (Scene.gltf), separate from the link information ("uri":scen_updata.json-patch) to the track in which the sample of the previous value reference difference information is stored. The link information to the track in which the sample of the previous value reference difference information is stored is link information used during normal playback. In contrast, the link information to the track in which the sample of the initial value reference difference information is stored is link information used during random access. In other words, in the example in FIG. 15, the link information is written in a state where both of these are identifiable. In other words, the link information to the track in which the sample of the initial value reference difference information is stored is written in the SD initial values as link information for random access. Doing so enables the client device to more easily identify the track in which the appropriate update information is stored. For example, during normal playback, the client device can easily select the link information for obtaining the sample of the previous value reference difference information. Additionally, during random access, the client device can easily select the link information for obtaining the sample of the initial value reference difference information.

<Method 1-2>

Additionally, when Method 1 is applied, the initial value reference difference information may be stored in the same sample of the same track as the previous value reference difference information, as indicated in the fourth row from the top in the table in FIG. 13 (Method 1-2). Note that as described above in <Method 1-1>, the previous value reference difference information is difference information that takes, as a reference, the spatial arrangement information in which updates up to the update information immediately previous are reflected.

For example, the file generation unit may store the initial value reference difference information in the same sample of the same track as the previous value reference difference information in the update file. Additionally, the difference information obtainment unit may obtain the initial value reference difference information stored in the same sample of the same track as the previous value reference difference information in the update file.

Figure 16:
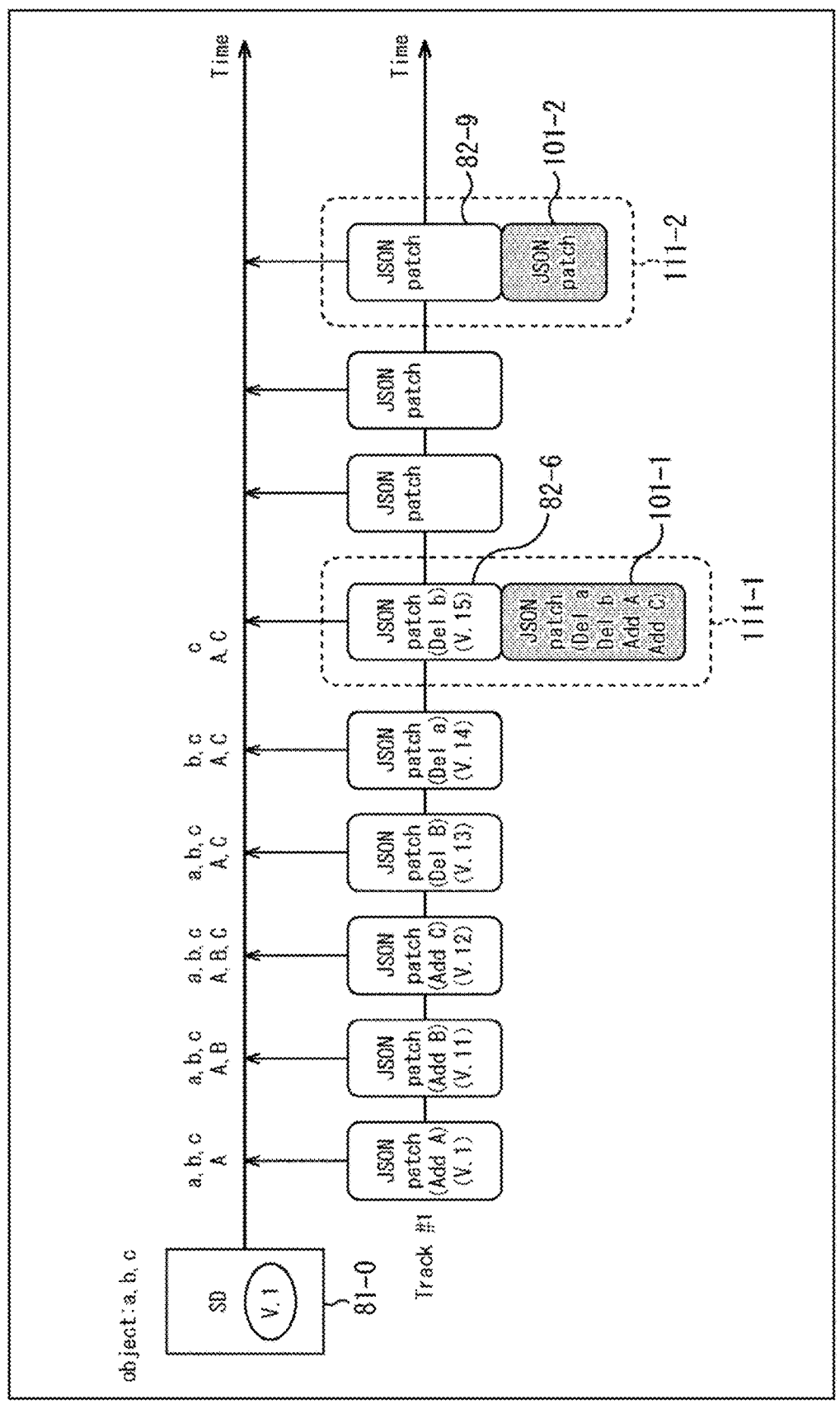
FIG. 16 is a diagram illustrating an example of the storage of update information.

FIG. 16 illustrates an example of this case. As in the case of FIG. 14, in the example in FIG. 16, the initial value reference difference information (the JSON patch 101-1 and the JSON patch 101-2) is prepared as the data of the random access point.

However, in the case of Method 1-2, the JSON patch 101 (the initial value reference difference information) is stored in the same sample of the same track (Track #1) as the aforementioned JSON patch 82. For example, the JSON patch 101-1 is stored in the same sample 111-1 as the JSON patch 82-6. The JSON patch 101-1 and the JSON patch 82-6 have the same timing for applying the update as each other, and the results of applying the updates are the same as well. Additionally, the JSON patch 101-2 is stored in the same sample 111-2 as the JSON patch 82-9. The JSON patch 101-2 and the JSON patch 82-9 have the same timing for applying the update as each other, and the results of applying the updates are the same as well.

Doing so makes it possible to use a single track of the update file. As such, the client device can obtain the update information (the previous value reference difference information or the initial value reference difference information) using the same link information both during normal playback and during random access.

<Method 1-2-1>

When Method 1-2 is applied, the previous value reference difference information and the initial value reference difference information are combined into a single sample as the sample of the random access point. Accordingly, the previous value reference difference information and the initial value reference difference information may be stored such that the client device can distinguish between these pieces of information during use. In other words, the previous value reference difference information and the initial value reference difference information may be stored as a list with those pieces of information as elements (Method 1-2-1), as indicated in the fifth row from the top in the table in FIG. 13.

For example, the file generation unit may store the previous value reference difference information and the initial value reference difference information as a list with each information as an element. Additionally, the previous value reference difference information and the initial value reference difference information may be stored in the sample as a list with each piece of information as an element.

For example, in the case of FIG. 17, the previous value reference difference information and the initial value reference difference information are written as elements in a list, delimited by [ ]. In other words, the first element written in the third row from the top ([{"op": "remove", "path": "", "value":""}]) is the previous value reference difference information (the JSON patch 82-6, in the case of the sample 111-1 in FIG. 16). In contrast, the second element (shown below), written in the fourth to seventh rows from the top, is the initial value reference difference information (the JSON patch 101-1, in the case of the sample 111-1 in FIG. 16).

[{"op": "remove", "path": "", "value": ""},
 {"op": "remove", "path": "", "value": ""},
 {"op": "add", "path": "", "value": ""},
 {"op": "add", "path": "", "value": ""}]

For example, the client device obtains the sample (the entire list), uses the first element in the list as the update information (the previous value reference difference information) in the case of normal playback, and uses the second element in the list as the update information (the initial value reference difference information) in the case of random access. In this manner, the client device can more easily obtain the previous value reference difference information and the initial value reference difference information.

<Method 1-2-2>

When applying Method 1-2, the previous value reference difference information and the initial value reference difference information may each be managed as a sub-sample in a management region of the file (Method 1-2-2), as indicated in the sixth row from the top of the table in FIG. 13.

For example, the file generation unit may store management information that manages each of the previous value reference difference information and the initial value reference difference information as sub-samples, in a management region of the update file. Additionally, the difference information obtainment unit may obtain the initial value reference difference information based on the management information, which is stored in the management region of the update file and which manages the previous value reference difference information and the initial value reference difference information as sub-samples.

For example, as described in NPL 5, the ISOBMFF sub-sample information box can divide the data within a sub-sample into sub-samples, and store the data size of each sub-sample (subsample_size). This enables the client device to obtain the sub-sample data, which is data partway through the data, without interpreting the data within the sample from the beginning.

In other words, by having management information, which manages the previous value reference difference information and the initial value reference difference information as respective sub-samples, stored in the management region of the update file, the client device can obtain the previous value reference difference information and the initial value reference difference information from the sample based on that management information, without parsing within the sample. In other words, the client device can more easily obtain the previous value reference difference information, the initial value reference difference information, and the like.

<Method 1-2-2-1>

When Method 1-2-2 is applied, identification information identifying the sub-sample in which the previous value reference difference information is stored and the sub-sample in which the initial value reference difference information is stored may be stored in the management region of the file (Method 1-2-2-1), as indicated in the seventh row from the top of the table in FIG. 13.

For example, the management information which manages the previous value reference difference information and the initial value reference difference information as respective sub-samples may include identification information identifying the sub-sample in which the previous value reference difference information is stored and the sub-sample in which the initial value reference difference information is stored.

For example, as described in NPL 5, the ISOBMFF sub-sample information box can store codec-specific parameters (codec_specific_parameters). These codec-specific parameters may be used as the identification information identifying the sub-sample in which the previous value reference difference information is stored and the sub-sample in which the initial value reference difference information is stored.

FIG. 19 illustrates an example of the semantics of the codec-specific parameters in this case. In the example in FIG. 19, the codec-specific parameters being false (codec_specific_parameters=0) indicates that the sub-picture thereof is the previous value reference difference information, whereas the codec-specific parameters being true (codec_specific_parameters=1) indicates that the sub-picture thereof is the initial value reference difference information. By referring to the values of the codec-specific parameters, the client device can easily (that is, without parsing within the sample) identify whether a sub-sample is a sub-sample in which the previous value reference difference information is stored or a sub-sample in which the initial value reference difference information is stored.

<Method 1-2-3>

When applying Method 1-2, the sample in which the initial value reference difference information is stored may be managed, in the management region of the file, as a sample which can be randomly accessed (Method 1-2-3), as indicated in the eighth row from the top of the table in FIG. 13.

For example, the file generation unit may store management information that manages a sample in which the initial value reference difference information is stored as the sample capable of being randomly accessed in a management region of the update file. Additionally, the difference information obtainment unit may obtain the initial value reference difference information based on management information, which is stored in a management region of the update file and which manages a sample in which the initial value reference difference information is stored as the sample capable of being randomly accessed.

For example, the sample in which the initial value reference difference information is stored is written as a SyncSample in the ISOBMFF SyncSampleBox. This SyncSample is a sample which can be randomly accessed. FIG. 18 is a diagram illustrating an example of the content of the SyncSampleBox in this case. By writing the sample in which the initial value reference difference information is stored within the SyncSampleBox in this manner, the client device can easily (that is, without parsing within the sample) identify a sample which can be randomly accessed by referring to that SyncSampleBox. In other words, the client device can more easily identify the sample in which the initial value reference difference information is stored based on this information.

<Method 1-3>

Additionally, when Method 1 is applied, the initial value reference difference information may be stored in a different sample of the same track as the previous value reference difference information, as indicated in the ninth row from the top in the table in FIG. 13 (Method 1-3). Note that as described above in <Method 1-1>, the previous value reference difference information is difference information that takes, as a reference, the spatial arrangement information in which updates up to the update information immediately previous are reflected.

For example, the file generation unit may store the initial value reference difference information in a different sample of the same track as the previous value reference difference information in the update file. Additionally, the difference information obtainment unit may obtain the initial value reference difference information stored in a different sample of the same track as the previous value reference difference information in the update file.

Figure 20:
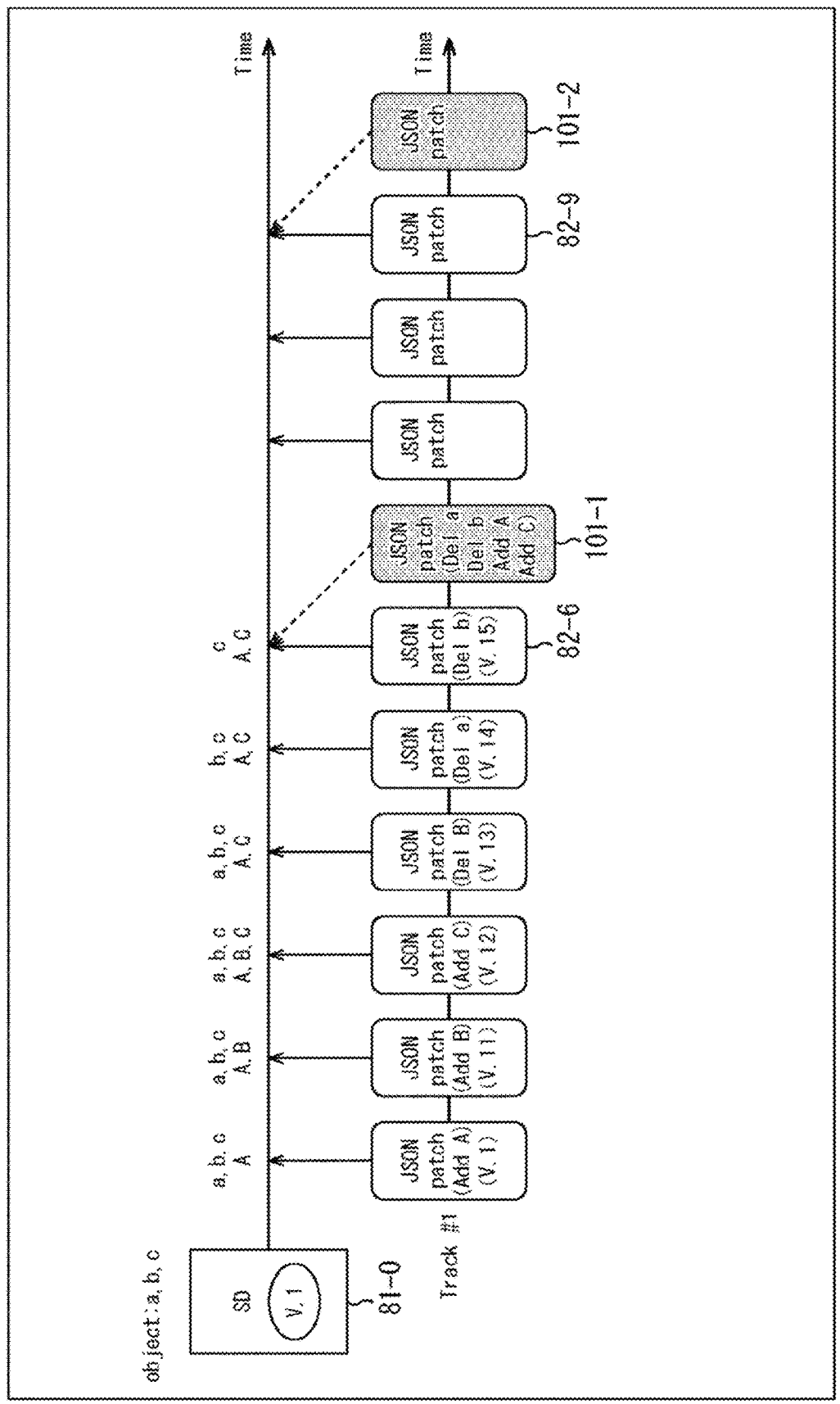
FIG. 20 is a diagram illustrating an example of the storage of update information.

FIG. 20 illustrates an example of this case. As in the case of FIG. 14, in the example in FIG. 20, the initial value reference difference information (the JSON patch 101-1 and the JSON patch 101-2) is prepared as the data of the random access point.

However, in the case of Method 1-3, the JSON patch 101 (the initial value reference difference information) is stored in a different sample of the same track (Track #1) as the JSON patch 82, which has the same update application timing as that JSON patch 101. For example, the JSON patch 101-1 is stored in the same track (Track #1) as the JSON patch 82-6, in the sample following the sample in which the JSON patch 82-6 is stored. The JSON patch 101-1 and the JSON patch 82-6 have the same timing for applying the update as each other, and the results of applying the updates are the same as well. Additionally, the JSON patch 101-2 is stored in the same track (Track #1) as the JSON patch 82-9, in the sample following the sample in which the JSON patch 82-9 is stored. The JSON patch 101-2 and the JSON patch 82-9 have the same timing for applying the update as each other, and the results of applying the updates are the same as well.

Doing so makes it possible to use a single track of the update file. As such, the client device can obtain the update information (the previous value reference difference information or the initial value reference difference information) using the same link information both during normal playback and during random access. Additionally, because the previous value reference difference information or the initial value reference difference information is stored in the sample (that is, because the previous value reference difference information and the initial value reference difference information are not stored in the same sample), the client device can select the previous value reference difference information or the initial value reference difference information by selecting the sample.

<Method 1-3-1>

When Method 1-3 is applied, update application time information which is the same as in the sample in which the previous value reference difference information is stored may be stored in the sample in which the initial value reference difference information updated at the same timing as the previous value reference difference information is stored (Method 1-3-1), as indicated in the tenth row from the top of the table in FIG. 13.

For example, the file generation unit may store update application time information, which is the same as in the sample in which the previous value reference difference information is stored, in the sample in which the initial value reference difference information is stored. Additionally, update application time information, which is the same as in the sample in which the previous value reference difference information is stored, may be stored in the sample in which the initial value reference difference information is stored.

As described in NPL 3, the JSON patch can be extended, and a time aside from a presentation time included in the sample of the JSON patch can be stored as time information specifying the time at which the update is to be executed. For example, a version ID (version_id), an event ID (event_id), a Coordinated Universal Time (absolute_time_UTC), an International Atomic Time (absolute_time_TAI), and the like can be stored in the JSON patch as this time information. Of course, any time information may be used, and the time information may be information aside from these examples.

Such time information specifying the time at which the update is executed is stored in the sample, and time information that is the same as in the sample in which is stored the previous value reference difference information, for which the timing of applying the update is the same as in the initial value reference difference information, is stored in the sample in which the initial value reference difference information is stored. For example, in the case of FIG. 20, the time information that is the same as in one sample previous is stored in the sample in which the initial value reference difference information is stored. For example, the same time information is stored in the sample of the JSON patch 82-6 and the sample of the JSON patch 101-1. Additionally, the same time information is stored in the sample of the JSON patch 82-9 and the sample of the JSON patch 101-2.

Doing so enables the client device to identify the previous value reference difference information corresponding to the initial value reference difference information (that is, for which the update application timing is the same as the initial value reference difference information) easily and without parsing within the sample.

<Method 1-3-2>

When applying Method 1-3, the sample in which the initial value reference difference information is stored may be managed, in the management region of the file, as a sample which is not used during normal playback (Method 1-3-2), as indicated in the eleventh row from the top of the table in FIG. 13.

For example, the file generation unit may store management information that manages the sample in which the initial value reference difference information is stored as the sample which is not used during normal playback in a management region of the update file. Additionally, the difference information obtainment unit may obtain the initial value reference difference information based on management information, which is stored in a management region of the update file and which manages the sample in which the initial value reference difference information is stored as the sample which is not used during normal playback.

Managing the sample in which the initial value reference difference information is stored as a sample which is not used during normal playback in the management region of the update file that stores the update information enables the client device to skip obtaining the sample in which the initial value reference difference information is stored, easily and without parsing within the sample, during normal playback. In other words, when sequentially obtaining samples of update files as normal playback, the client device can easily obtain only the samples in which the previous value reference difference information is stored, without obtaining the samples in which the initial value reference difference information is stored, based on the management information.

In other words, the client device can obtain the sample in which the initial value reference difference information is stored easily, and without parsing within the sample, during random access. In other words, when performing random access, the client device can easily obtain the sample in which the initial value reference difference information is stored based on this management information.

<Method 1-3-2-1>

When applying Method 1-3-2, identification information indicating whether a sample is a sample used during normal playback may be stored in the management region of the file on a sample-by-sample basis (Method 1-3-2-1), as indicated in the twelfth row from the top of the table in FIG. 13.

For example, the management information that manages the sample in which the initial value reference difference information is stored as a sample not used during normal playback may include identification information indicating whether it is the sample used during normal playback.

For example, as described in NPL 5, a sample_has_redundancy flag, which indicates that a sample has redundancy, can be stored in the SampleDependencyTypeBox defined in ISOBMFF. The value of the sample_has_redundancy flag being "1" (sample_has_redundancy flag=1) indicates that the sample contains information which is redundant with other samples. The value of the sample_has_redundancy flag being "2" (sample_has_redundancy flag=2) indicates that the sample does not contain information which is redundant with other samples. Furthermore, the value of the sample_has_redundancy flag being "0" (sample_has_redundancy flag=0) indicates that it is unclear whether the sample contains information which is redundant with other samples.

FIG. 21 illustrates an example of the content of the SampleDependencyTypeBox. As illustrated in FIG. 21, the sample_has_redundancy flag can be stored in the SampleDependencyTypeBox on a sample-by-sample basis.

This sample_has_redundancy flag may be used as identification information indicating whether a sample is a sample used during normal playback. In other words, a sample_has_redundancy flag having a value of "1" (sample_has_redundancy flag=1) is stored in the SampleDependencyTypeBox for the sample in which the initial value reference difference information is stored. In other words, this indicates that the sample contains information which is redundant with other samples. The client device skips obtaining samples for which the value of the sample_has- _redundancy flag is "1" during normal playback. Doing so enables the client device to skip obtaining the sample in which the initial value reference difference information is stored easily, and without parsing within the sample, during normal playback. In other words, when sequentially obtaining samples of update files as normal playback, the client device can easily obtain only the samples in which the previous value reference difference information is stored, without obtaining the samples in which the initial value reference difference information is stored, based on the sample_has_redundancy flag.

<Method 1-3-3>

When applying Method 1-3, the sample in which the initial value reference difference information is stored may be managed, in the management region of the file, as a sample which can be randomly accessed (Method 1-3-3), as indicated in the thirteenth row from the top of the table in FIG. 13.

For example, the file generation unit may store management information that manages a sample in which the initial value reference difference information is stored as the sample capable of being randomly accessed in a management region of the update file. Additionally, the difference information obtainment unit may obtain the initial value reference difference information based on management information, which is stored in a management region of the update file and which manages a sample in which the initial value reference difference information is stored as the sample capable of being randomly accessed.

For example, similar to the case of <Method 1-2-3>, the sample in which the initial value reference difference information is stored is written as a SyncSample in the SyncSampleBox. By doing so, the client device can easily (that is, without parsing within the sample) identify a sample which can be randomly accessed by referring to that SyncSampleBox. In other words, the client device can more easily identify the sample in which the initial value reference difference information is stored based on this information.

<Method 1-4>

Additionally, when Method 1 is applied, the initial value reference difference information may replace the previous value reference difference information, as indicated in the fourteenth row from the top in the table in FIG. 13 (Method 1-4). Note that as described above in <Method 1-1>, the previous value reference difference information is difference information that takes, as a reference, the spatial arrangement information in which updates up to the update information immediately previous are reflected.

For example, the file generation unit may replace previous value reference difference information, which is stored in the update file and for which an update application time is the same as in the initial value reference difference information, with the initial value reference difference information. Additionally, the difference information obtainment unit may obtain the initial value reference difference information that has replaced previous value reference difference information, which is stored in the update file and for which an update application time is the same as in the initial value reference difference information.

Figure 22:
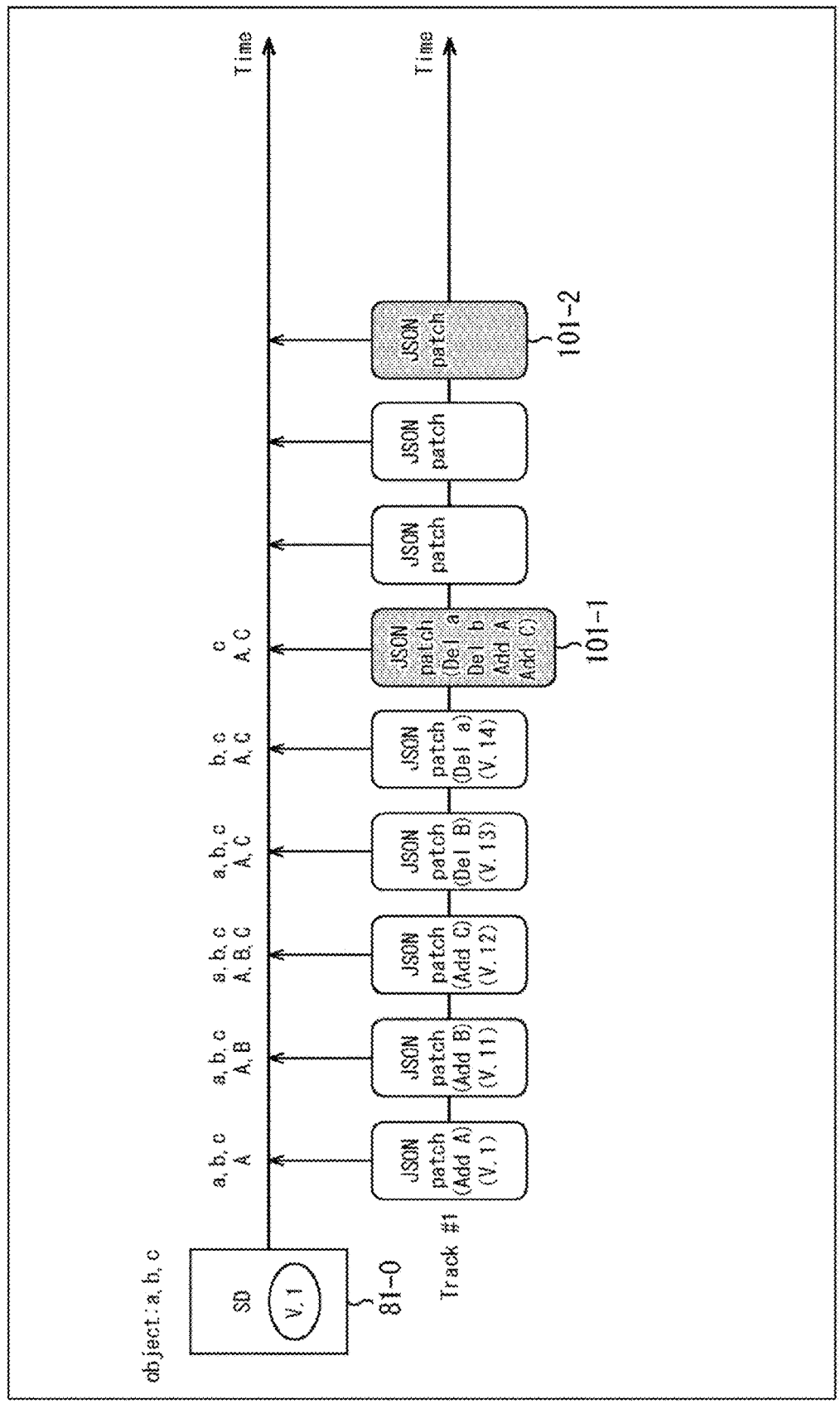
FIG. 22 is a diagram illustrating an example of the storage of update information.

FIG. 22 illustrates an example of this case. In the example in FIG. 22, the JSON patch 101 (the JSON patch 101-1 and the JSON patch 101-2) is the initial value reference difference information, and is data of a random access point. Similar to Method 1-2 and Method 1-3, in the case of Method 1-4, the JSON patch 101 is stored in the same track (Track #1) as the sample of the JSON patch 82, which is the previous value reference difference information. However, in the case of Method 1-4, the sample of the JSON patch 101 is replaced with the sample of the JSON patch 82 corresponding to that JSON patch 101 (that is, having the same update application timing).

For example, in the example in FIG. 20, the JSON patch 101-1 has the same update application timing as the JSON patch 82-6. In the example in FIG. 22, the sample of the JSON patch 101-1 is replaced with the sample of the JSON patch 82-6. In other words, the sample of the JSON patch 82-6 is deleted, and the sample of the JSON patch 101-1 is provided instead.

Similarly, in the example in FIG. 20, the JSON patch 101-2 has the same update application timing as the JSON patch 82-9. In the example in FIG. 22, the sample of the JSON patch 101-2 is replaced with the sample of the JSON patch 82-9. In other words, the sample of the JSON patch 82-9 is deleted, and the sample of the JSON patch 101-2 is provided instead.

Accordingly, in the case of normal playback, the scene description at an update application timing of a sample aside from the sample of a random access point is generated using the previous value reference difference information (the JSON patch 82) and the scene description from one timing previous thereto. In contrast, a scene description at an update application timing of the sample of the random access point is generated using the initial value reference difference information (the JSON patch 101) and the initial values of the scene description (the scene description 81-0) both in the case of normal playback and in the case of random access.

Doing so makes it possible to reduce the data amount of the update file compared to the cases of Method 1-2, Method 1-3, and the like.

Note that in the case of Method 1-4, there is no previous value reference difference information having the same update application timing as the initial value reference difference information, and the sample_has_redundancy flag is therefore unnecessary (can be omitted), as in the case of Method 1-3.

<Method 1-4-1>

When applying Method 1-4, the sample in which the initial value reference difference information is stored may be managed, in the management region of the file, as a sample which can be randomly accessed (Method 1-3-3), as indicated in the lowermost row of the table in FIG. 13.

For example, the file generation unit may store management information that manages a sample in which the initial value reference difference information is stored as the sample capable of being randomly accessed in a management region of the update file. Additionally, the difference information obtainment unit may obtain the initial value reference difference information based on management information, which is stored in a management region of the update file and which manages a sample in which the initial value reference difference information is stored as the sample capable of being randomly accessed.

For example, similar to the case of <Method 1-2-3>, the sample in which the initial value reference difference information is stored is written as a SyncSample in the SyncSampleBox. By doing so, the client device can easily (that is, without parsing within the sample) identify a sample which can be randomly accessed by referring to that SyncSampleBox. In other words, the client device can more easily identify the sample in which the initial value reference difference information is stored based on this information.

3. Transmission of Initial Value Reference Difference Information or Post-Update Information <Method 2>

The initial value reference difference information or the post-update information are prepared as a random access point, and that initial value reference difference information or post-update information is provided when the client device performs random access. In other words, the initial value reference difference information or the post-update information is stored in a file as a random access point, as indicated in the uppermost row of the table in FIG. 23 (Method 2).

As described above in <2. Transmission of Initial Value Reference Difference Information>, the initial value reference difference information is difference information that takes the initial values of the scene description as a reference. The post-update information is a scene description in which the updates of the previous value reference difference information from the initial values to the sample to be processed are reflected. In other words, the post-update information is a scene description in which the updates of the initial value reference difference information with respect to the initial values of the scene description are reflected.

For example, an information processing device that generates a file which stores update information of a scene description includes: an update information generation unit that generates, as update information for updating spatial arrangement information for arranging at least one 3D object in a 3D space (i.e., the scene description), initial value reference difference information that is difference information which uses an initial value of the spatial arrangement information as a reference, or post-update information in which an update to the initial value reference difference information is reflected in the initial value of the spatial arrangement information; and a file generation unit that generates an update file which stores the update information, and stores the initial value reference difference information or the post-update information in the update file as a random access point.

Additionally, for example, an information processing method for generating a file which stores update information of a scene description includes: generating, as update information for updating spatial arrangement information for arranging at least one 3D object in a 3D space (i.e., the scene description), initial value reference difference information that is difference information which uses an initial value of the spatial arrangement information as a reference, or post-update information in which an update to the initial value reference difference information is reflected in the initial value of the spatial arrangement information; and generating an update file which stores the update information, and storing the initial value reference difference information or the post-update information in the update file as a random access point.

For example, an information processing device that obtains a file which stores update information of a scene description, and updates the scene description, includes: an update information obtainment unit that obtains initial value reference difference information or post-update information, which is stored as a random access point in an update file storing update information for updating spatial arrangement information for arranging at least one 3D object in a 3D space (i.e., the scene description), as the update information, the initial value reference difference information being difference information that uses an initial value of the spatial arrangement information as a reference and the post-update information being information in which an update to the initial value reference difference information is reflected in the initial value of the spatial arrangement information; and a spatial arrangement information generation unit that generates the spatial arrangement information at an update application time of the initial value reference difference information by reflecting the update to the initial value reference difference information in the initial value of the spatial arrangement information or by applying the post-update information.

Additionally, for example, an information processing method for obtaining a file which stores update information of a scene description, and updating the scene description, includes: obtaining, as the update information, initial value reference difference information or post-update information, which is stored as a random access point in an update file storing update information for updating spatial arrangement information for arranging at least one 3D object in a 3D space (i.e., the scene description), the initial value reference difference information being difference information that uses an initial value of the spatial arrangement information as a reference and the post-update information being information in which an update to the initial value reference difference information is reflected in the initial value of the spatial arrangement information; and generating the spatial arrangement information at an update application time of the initial value reference difference information by reflecting the update to the initial value reference difference information in the initial value of the spatial arrangement information or by applying the post-update information.

The initial value reference difference information is stored in the file as an random access point is similar to Method 1. In other words, an increase in the processing load on a client device that randomly accesses scene descriptions can be suppressed.

However, in such a case, when, for example, almost the entire scene description is updated, the amount of information in the initial value reference difference information is almost the same as that in the scene description. In other words, compared to the example in FIG. 12, the amount of information transmitted to the client device during random access remains almost the same in this case, and the amount of update processing performed in the client device increases.

In contrast, when the post-update information is stored in the file as a random access point, processing for updating the scene description is not performed in the client device during random access. Accordingly, in this case, when, as described above, almost the entire scene description is updated, compared to the example in FIG. 14, the amount of information transmitted to the client device during random access remains almost the same, but the amount of update processing performed in the client device decreases.

In other words, by storing the initial value reference difference information or the post-update information in the file as a random access point, an increase in the processing load during random access to the scene description can be suppressed in a wider range of cases. For example, by storing the post-update information in the file as the random access point when the amount of information to be updated in the scene description is large as described above, and storing the initial value reference difference information in the file as the random access point when the amount of information to be updated in the scene description is small, an increase in the processing load on the client device that randomly accesses the scene description can be suppressed regardless of the amount of information to be updated in the scene description.

Note that any method may be used to select whether to store the initial value reference difference information or the post-update information as the random access point. Which to store may be selected based on any desired information, or may be selected according to a request, instruction, or the like from the exterior, such as a user instruction or a request from an application, for example.

<Method 2-1>

When Method 2 is applied, the initial value reference difference information or the post-update information may be stored in a different track from the previous value reference difference information, as indicated in the second row from the top in the table in FIG. 23 (Method 2-1). Note that as described above in <Method 1-1> and the like, the previous value reference difference information is difference information that takes, as a reference, the spatial arrangement information in which updates up to the update information immediately previous are reflected.

For example, the file generation unit may store the initial value reference difference information or the post-update information in a different track than the previous value reference difference information in the update file. Additionally, the update information obtainment unit may obtain the initial value reference difference information or the post-update information stored in a different track from previous value reference difference information in the update file.

When the initial value reference difference information is stored, as the random access point, in a different track from the previous value reference difference information, that initial value reference difference information is stored as indicated by the example in FIG. 14. Accordingly, similar to the case of Method 1-1, by specifying the track, the client device can more easily obtain the samples of the initial value reference difference information (the JSON patch 101) independently from the samples of the previous value reference difference information (the JSON patch 82).

Meanwhile, when the post-update information is stored, as the random access point, in a different track from the previous value reference difference information, that post-update information is stored as indicated by the example in FIG. 12. In other words, during random access, the client device can obtain the newest scene description without updating the scene description.

Note that whether to store the initial value reference difference information or the post-update information as the random access point may be selected at any desired data level. For example, this selection may be made at the sequence level, as in the examples in FIGS. 12 and 14. In other words, in this case, the initial value reference difference information and the post-update information are not intermixed in the same track (only one thereof is stored).

Figure 24:
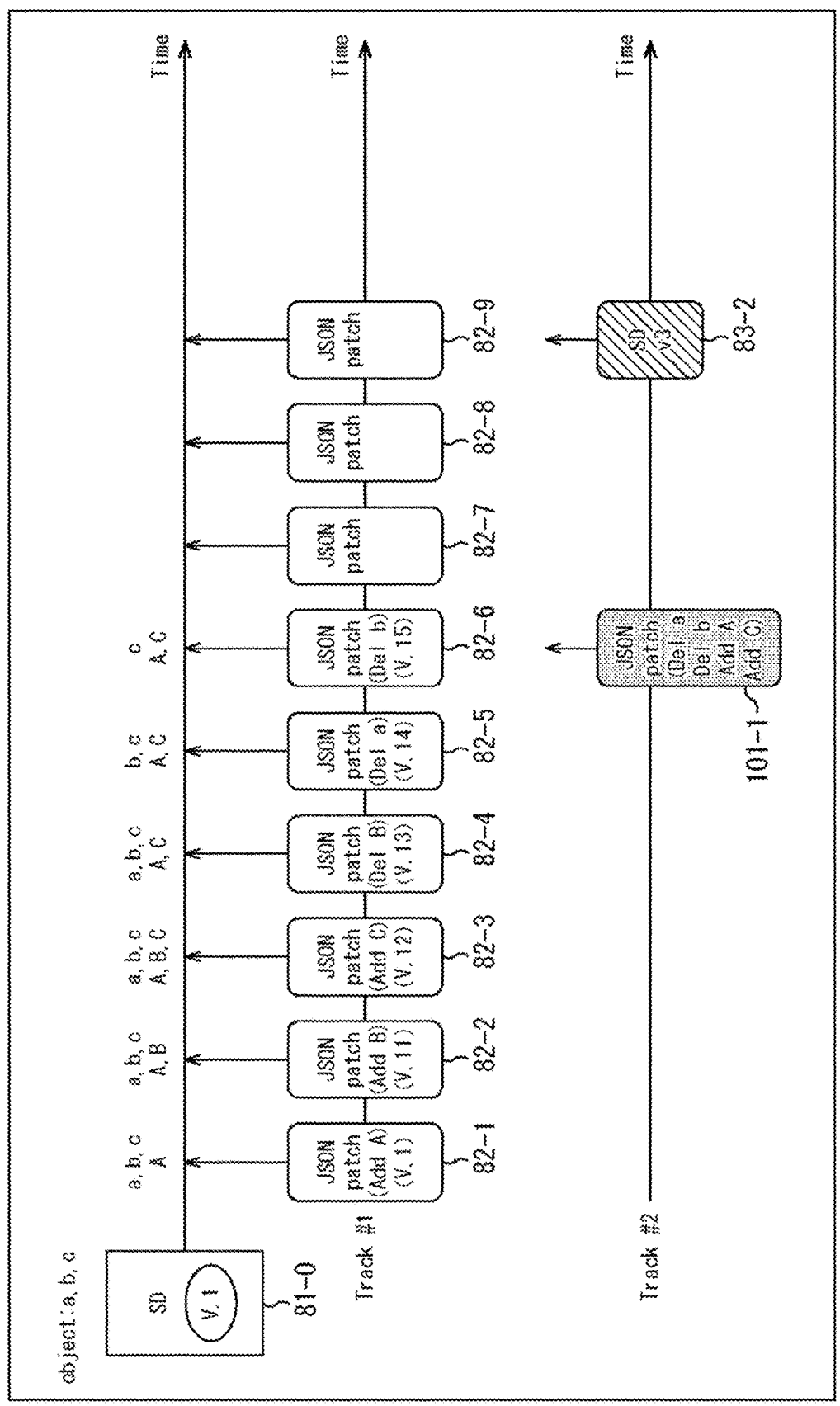
FIG. 24 is a diagram illustrating an example of the storage of update information.

In contrast, whether to store the initial value reference difference information or the post-update information may be selected on a sample-by-sample basis (for each random access point). FIG. 24 illustrates an example of this case. In the example in FIG. 24, the JSON patch 101-1 and the scene description 83-2 are stored in the same track (Track #2) as the data of random access points. The JSON patch 101-1 is the initial value reference difference information, and the scene description 83-2 is the post-update information. In other words, in this case, the initial value reference difference information and the post-update information can be intermixed in the same track.

Note that in this case too, the difference information stored as the random access point may take values other than the initial values as a reference, similar to the case of Method 1-1.

<Method 2-1-1>

When applying Method 2-1, link information to the track in which the initial value reference difference information or the post-update information is stored may be stored in the initial values of the scene description (SD) as link information for random access (Method 2-1-1), as indicated in the third row from the top in the table in FIG. 23.

For example, the file generation unit may generate an initial value file which stores the initial value of the spatial arrangement information, and store link information indicating a link to the track where the initial value reference difference information or the post-update information is stored as the link information for random access. Additionally, the update information obtainment unit may obtain the initial value reference difference information or the post-update information using link information indicating a link to the track in which the initial value reference difference information or the post-update information is stored, stored as link information for random access in an initial value file storing the initial value of the spatial arrangement information.

FIG. 25 illustrates part of an example of the content of the scene description 81-0 in such a case. As illustrated in FIG. 25, link information ("uri_for_random_access": random_access.json) to the track in which the sample of the initial value reference difference information or the post-update information is stored is written in the scene description 81-0 (Scene.gltf), separate from the link information ("uri":scen_updata.json-patch) to the track in which the sample of the previous value reference difference information is stored. The link information to the track in which the sample of the previous value reference difference information is stored is link information used during normal playback. In contrast, the link information to the track in which the sample of the initial value reference difference information or the post-update information is stored is link information used during random access. In other words, in the example in FIG. 15, the link information is written in a state where both of these are identifiable. In other words, the link information to the track in which the sample of the initial value reference difference information or the post-update information is stored is written in the scene description initial values as link information for random access. Doing so enables the client device to more easily identify the track in which the appropriate update information is stored. For example, during normal playback, the client device can easily select the link information for obtaining the sample of the previous value reference difference information. Additionally, during random access, the client device can easily select the link information for obtaining the sample of the initial value reference difference information or the post-update information.

<Method 2-2>

Additionally, when Method 2 is applied, the initial value reference difference information or the post-update information may be stored in the same sample of the same track as the previous value reference difference information, as indicated in the fourth row from the top in the table in FIG. 23 (Method 2-2). Note that as described above in <Method 1-1>, the previous value reference difference information is difference information that takes, as a reference, the spatial arrangement information in which updates up to the update information immediately previous are reflected.

For example, the file generation unit may store the initial value reference difference information or the post-update information in a same sample of a same track as previous value reference difference information in the update file. Additionally, the update information obtainment unit may obtain the initial value reference difference information or the post-update information stored in a same sample of a same track as previous value reference difference information in the update file.

When the initial value reference difference information is stored, as the random access point, in the same sample of the same track as the previous value reference difference information, that initial value reference difference information is stored as indicated by the example in FIG. 16. Accordingly, similar to Method 1-2, the client device can combine the tracks of the update file into one. As such, the client device can obtain the update information (the previous value reference difference information or the initial value reference difference information) using the same link information both during normal playback and during random access.

Figure 26:
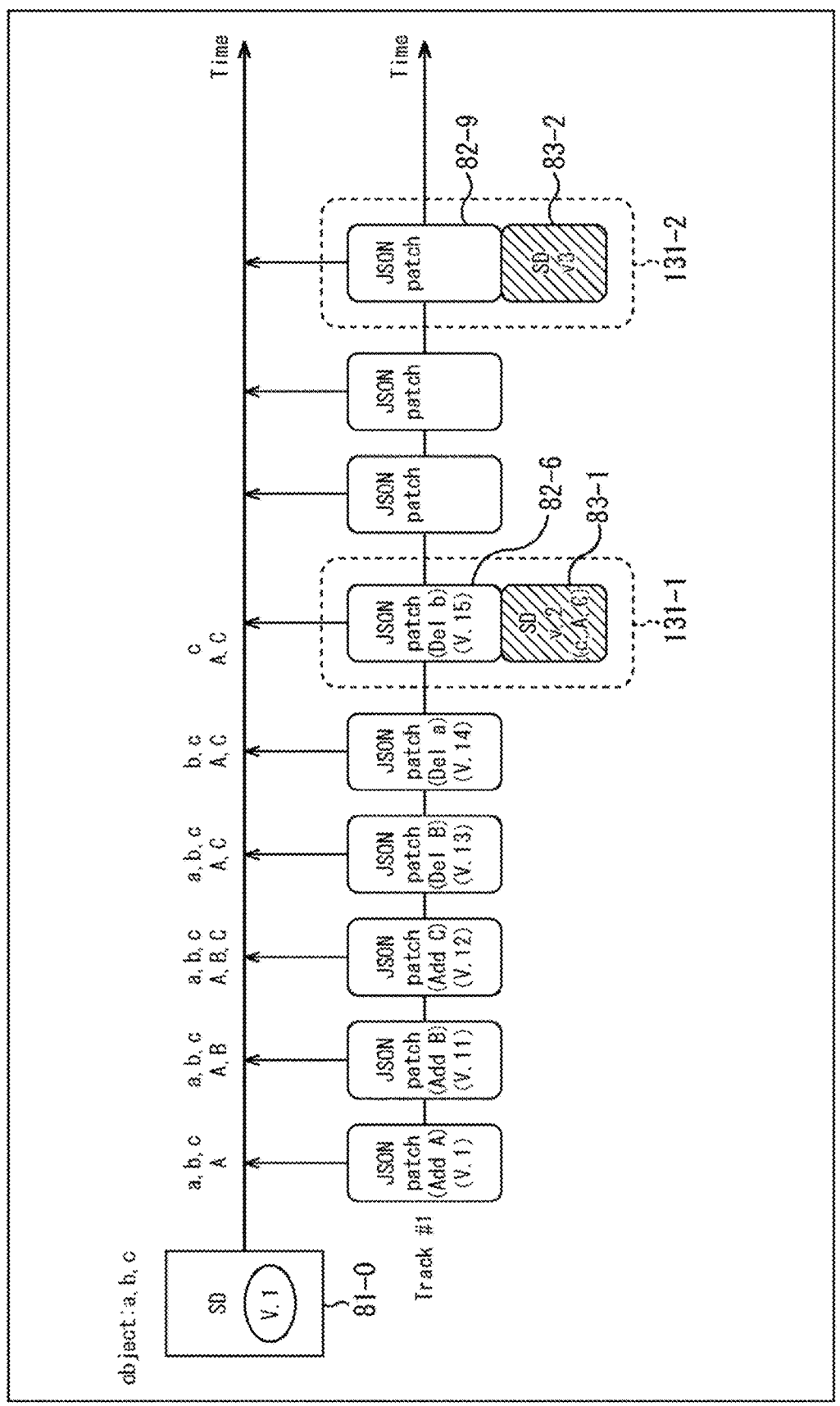
FIG. 26 is a diagram illustrating an example of the storage of update information.

Meanwhile, when the post-update information is stored, as the random access point, in the same sample of the same track as the previous value reference difference information, that post-update information is stored as indicated by the example in FIG. 26, for example. In other words, the scene description 83-1 (the post-update information) is stored in the same sample 131-1 as the JSON patch 82-6. The update result in which the JSON patch 82-6 is applied is equivalent to the scene description 83-1. Additionally, the scene description 83-2 (the post-update information) is stored in the same sample 131-2 as the JSON patch 82-9. The update result in which the JSON patch 82-9 is applied is equivalent to the scene description 83-2. Doing so makes it possible to use a single track of the update file. As such, the client device can obtain the update information (the previous value reference difference information or the post-update information) using the same link information both during normal playback and during random access.

Note that whether to store the initial value reference difference information or the post-update information as the random access point may be selected at any desired data level. For example, this selection may be made at the sequence level, as in the examples in FIGS. 16 and 26. In other words, in this case, the initial value reference difference information and the post-update information are not intermixed in the same track (only one thereof is stored).

Figure 27:
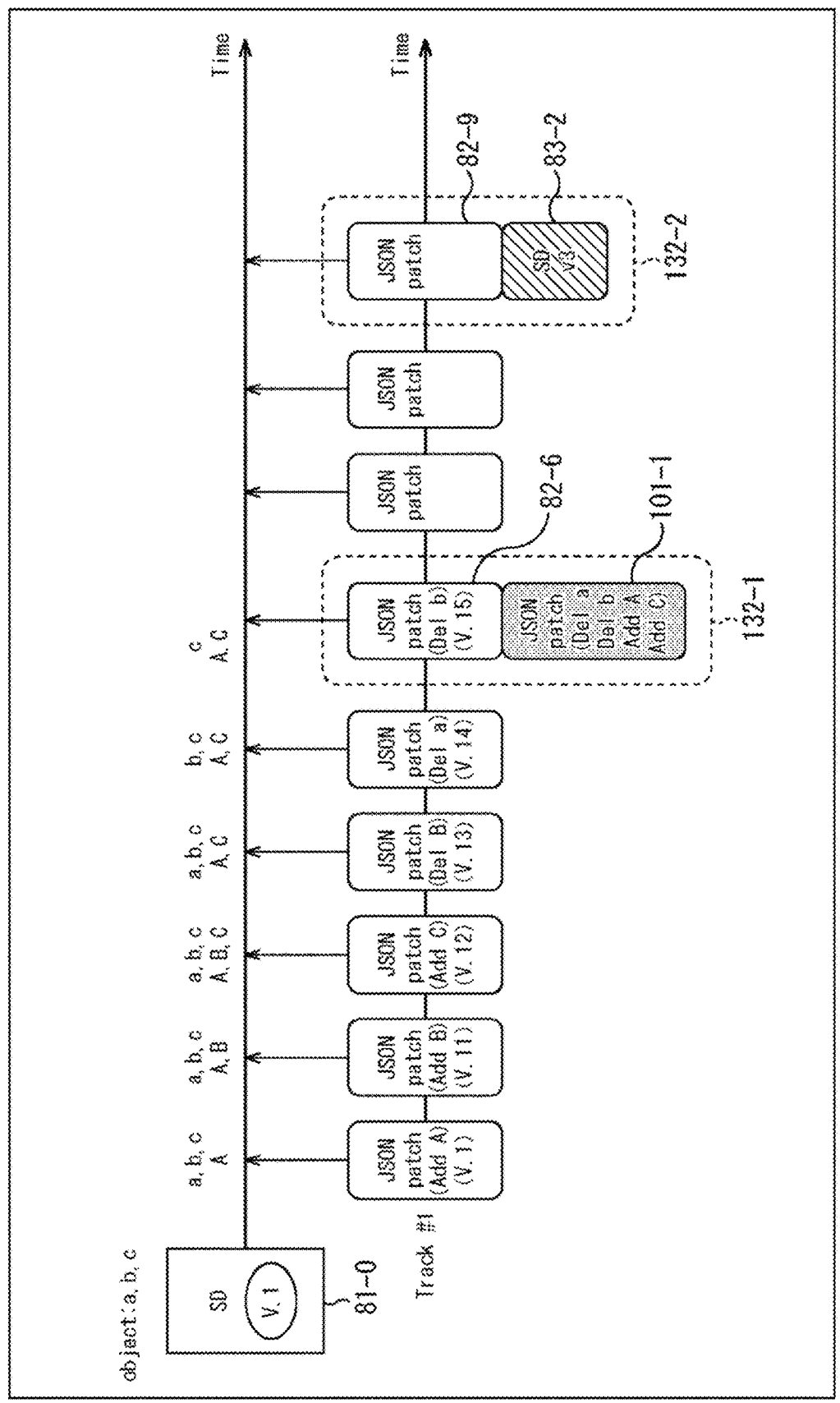
FIG. 27 is a diagram illustrating an example of the storage of update information.

In contrast, whether to store the initial value reference difference information or the post-update information may be selected on a sample-by-sample basis (for each random access point). FIG. 27 illustrates an example of this case. In the example in FIG. 27, the JSON patch 101-1 is stored in the same sample 132-1 of the same track as the JSON patch 82-6, as the data of a random access point. Additionally, the scene description 83-2 is stored in the same sample 132-2 of the same track as the JSON patch 82-9, as the data of a random access point. In other words, the JSON patch 101-1 and the scene description 83-2 are stored in the same track (Track #1). The JSON patch 101-1 is the initial value reference difference information, and the scene description 83-2 is the post-update information. In other words, in this case, the initial value reference difference information and the post-update information can be intermixed in the same track.

<Method 2-2-1>

When Method 2-2 is applied, the previous value reference difference information, as well as the initial value reference difference information or the post-update information, are combined into a single sample as the sample of the random access point. Accordingly, the previous value reference difference information, as well as the initial value reference difference information or the post-update information, may be stored such that the client device can distinguish between these pieces of information during use. In other words, the previous value reference difference information, as well as the initial value reference difference information or the post-update information, may be stored as a list with those pieces of information as elements (Method 2-2-1), as indicated in the fifth row from the top in the table in FIG. 23.

For example, the file generation unit may store the previous value reference difference information, as well as the initial value reference difference information or the post-update information, as a list with each piece of information as an element. Additionally, the previous value reference difference information, as well as the initial value reference difference information or the post-update information, may be stored in the sample as a list with each piece of information as an element.

In other words, similar to the case of Method 1-2-1 described with reference to FIG. 17, when the previous value reference difference information and the initial value reference difference information are stored in the same sample, the previous value reference difference information and the initial value reference difference information are each delimited by [ ], and are written as elements of a list. Similarly, when the previous value reference difference information and the post-update information are stored in the same sample, the previous value reference difference information and the post-update information are each delimited by [ ], and are written as elements of a list.

In this manner, the client device can more easily obtain the previous value reference difference information, as well as the initial value reference difference information or the post-update information.

<Method 2-2-2>

When applying Method 2-2, the previous value reference difference information, as well as the initial value reference difference information or the post-update information, may each be managed as a sub-sample in a management region of the file (Method 2-2-2), as indicated in the sixth row from the top of the table in FIG. 23.

For example, the file generation unit may store management information that manages each of the previous value reference difference information, as well as the initial value reference difference information or the post-update information, as sub-samples, in a management region of the update file. Additionally, the update information obtainment unit may obtain the initial value reference difference information or the post-update information based on management information, which is stored in a management region of the update file and which manages the previous value reference difference information, as well as the initial value reference difference information or the post-update information, as sub-samples.

For example, the ISOBMFF sub-sample information box divides the data within a sub-sample into sub-samples, and stores the data size of each sub-sample (subsample_size). This enables the client device to obtain the sub-sample data, which is data partway through the data, without interpreting the data within the sample from the beginning.

In other words, similar to Method 1-2-2, by having management information, which manages the previous value reference difference information and the initial value reference difference information as respective sub-samples, stored in the management region of the update file, the client device can obtain the previous value reference difference information and the initial value reference difference information from the sample based on that management information, without parsing within the sample. Similarly, by having management information, which manages the previous value reference difference information and the post-update information as respective sub-samples, stored in the management region of the update file, the client device can obtain the previous value reference difference information and the post-update information from the sample based on that management information, without parsing within the sample. In other words, the client device can more easily obtain the previous value reference difference information, the initial value reference difference information, the post-update information, and the like.

<Method 2-2-2-1>

When Method 2-2-2 is applied, identification information identifying the sub-sample in which the previous value reference difference information is stored and the sub-sample in which the initial value reference difference information or the post-update information is stored may be stored in the management region of the file (Method 2-2-2-1), as indicated in the seventh row from the top of the table in FIG. 23.

For example, the management information which manages the previous value reference difference information, as well as the initial value reference difference information or the post-update information, as respective sub-samples may include identification information identifying the sub-sample in which the previous value reference difference information is stored and the sub-sample in which the initial value reference difference information or the post-update information is stored.

For example, the codec-specific parameters (codec_specific_parameters) stored in the ISOBMFF sub-sample information box may be used as the identification information identifying the sub-sample in which the previous value reference difference information is stored and the sub-sample in which the initial value reference difference information or the update information is stored.

For example, the codec-specific parameters being false (codec_specific_parameters=0) indicates that the sub-picture thereof is the previous value reference difference information, whereas the codec-specific parameters being true (codec_specific_parameters=1) indicates that the sub-picture thereof is the initial value reference difference information or the post-update information. By referring to the values of the codec-specific parameters, the client device can easily (that is, without parsing within the sample) identify whether a sub-sample is a sub-sample in which the previous value reference difference information is stored or a sub-sample in which the initial value reference difference information or the post-update information is stored.

<Method 2-2-3>

When applying Method 2-2, the sample in which the initial value reference difference information or the post-update information is stored may be managed, in the management region of the file, as a sample which can be randomly accessed (Method 2-2-3), as indicated in the eighth row from the top of the table in FIG. 23.

For example, the file generation unit may store management information that manages a sample in which the initial value reference difference information or the post-update information is stored as the sample capable of being randomly accessed in a management region of the update file. Additionally, the update information obtainment unit may obtain the initial value reference difference information or the post-update information based on management information, which is stored in a management region of the update file and which manages a sample in which the initial value reference difference information or the post-update information is stored as the sample capable of being randomly accessed.

For example, the sample in which the initial value reference difference information is stored is written as a SyncSample in the ISOBMFF SyncSampleBox. This SyncSample is a sample which can be randomly accessed. By writing the sample in which the initial value reference difference information or the post-update information is stored within the SyncSampleBox, the client device can easily (that is, without parsing within the sample) identify a sample which can be randomly accessed by referring to that SyncSampleBox. In other words, the client device can more easily identify the sample in which the initial value reference difference information or the post-update information is stored based on this information.

<Method 2-3>

Additionally, when Method 2 is applied, the initial value reference difference information or the post-update information may be stored in a different sample of the same track as the previous value reference difference information, as indicated in the ninth row from the top in the table in FIG. 23 (Method 2-3). Note that as described above in <Method 1-1>, the previous value reference difference information is difference information that takes, as a reference, the spatial arrangement information in which updates up to the update information immediately previous are reflected.

For example, the file generation unit may store the initial value reference difference information or the post-update information in a different sample of a same track as previous value reference difference information in the update file. Additionally, the update information obtainment unit may obtain the initial value reference difference information or the post-update information stored in a different sample of a same track as previous value reference difference information in the update file.

When the initial value reference difference information is stored, as the random access point, in a different sample of the same track as the previous value reference difference information, that initial value reference difference information is stored as indicated by the example in FIG. 20. Accordingly, similar to Method 1-3, the tracks of the update file can be combined into one. As such, the client device can obtain the update information (the previous value reference difference information or the initial value reference difference information) using the same link information both during normal playback and during random access. Additionally, because the previous value reference difference information or the initial value reference difference information is stored in the sample (that is, because the previous value reference difference information and the initial value reference difference information are not stored in the same sample), the client device can select the previous value reference difference information or the initial value reference difference information by selecting the sample.

Figure 28:
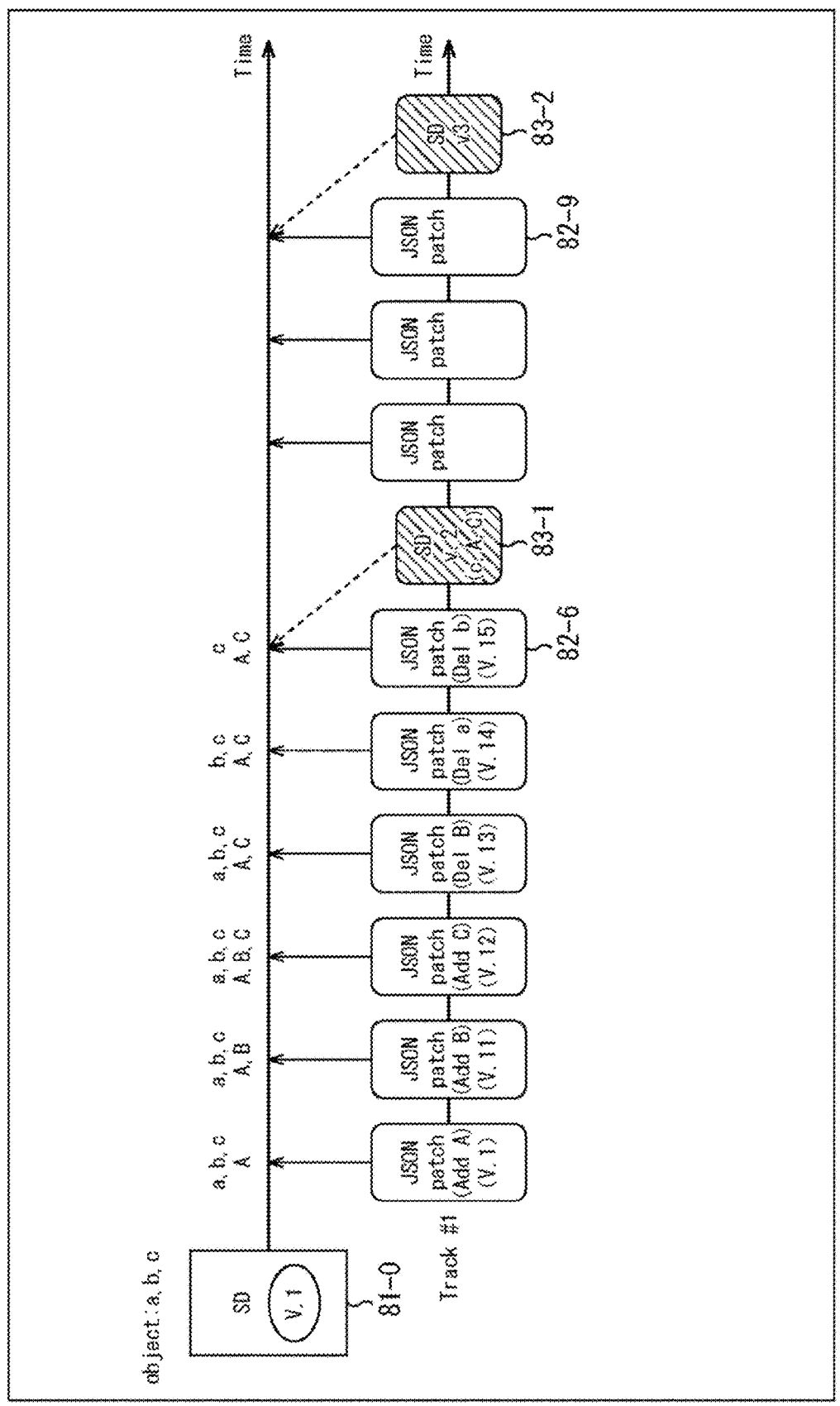
FIG. 28 is a diagram illustrating an example of the storage of update information.

In contrast, when the post-update information is stored, as the random access point, in a different sample of the same track as the previous value reference difference information, that post-update information is stored as indicated by the example in FIG. 28, for example. In the example in FIG. 28, the scene description 83-1 (the post-update information) is stored in the same track (Track #1) as the JSON patch 82-6, in the sample following the sample in which the JSON patch 82-6 is stored. The update result in which the JSON patch

82-6 is applied is equivalent to the scene description 83-1. Additionally, the scene description 83-2 (the post-update information) is stored in the same track (Track #1) as the JSON patch 82-9, in the sample following the sample in which the JSON patch 82-9 is stored. The update result in which the JSON patch 82-9 is applied is equivalent to the scene description 83-2.

Doing so makes it possible to use a single track of the update file. As such, the client device can obtain the update information (the previous value reference difference information or the post-update information) using the same link information both during normal playback and during random access. Additionally, because the previous value reference difference information or the post-update information is stored in the sample (that is, because the previous value reference difference information and the post-update information are not stored in the same sample), the client device can select the previous value reference difference information or the post-update information by selecting the sample.

Note that whether to store the initial value reference difference information or the post-update information as the random access point may be selected at any desired data level. For example, this selection may be made at the sequence level, as in the examples in FIGS. 20 and 28. In other words, in this case, the initial value reference difference information and the post-update information are not intermixed in the same track (only one thereof is stored).

Figure 29:
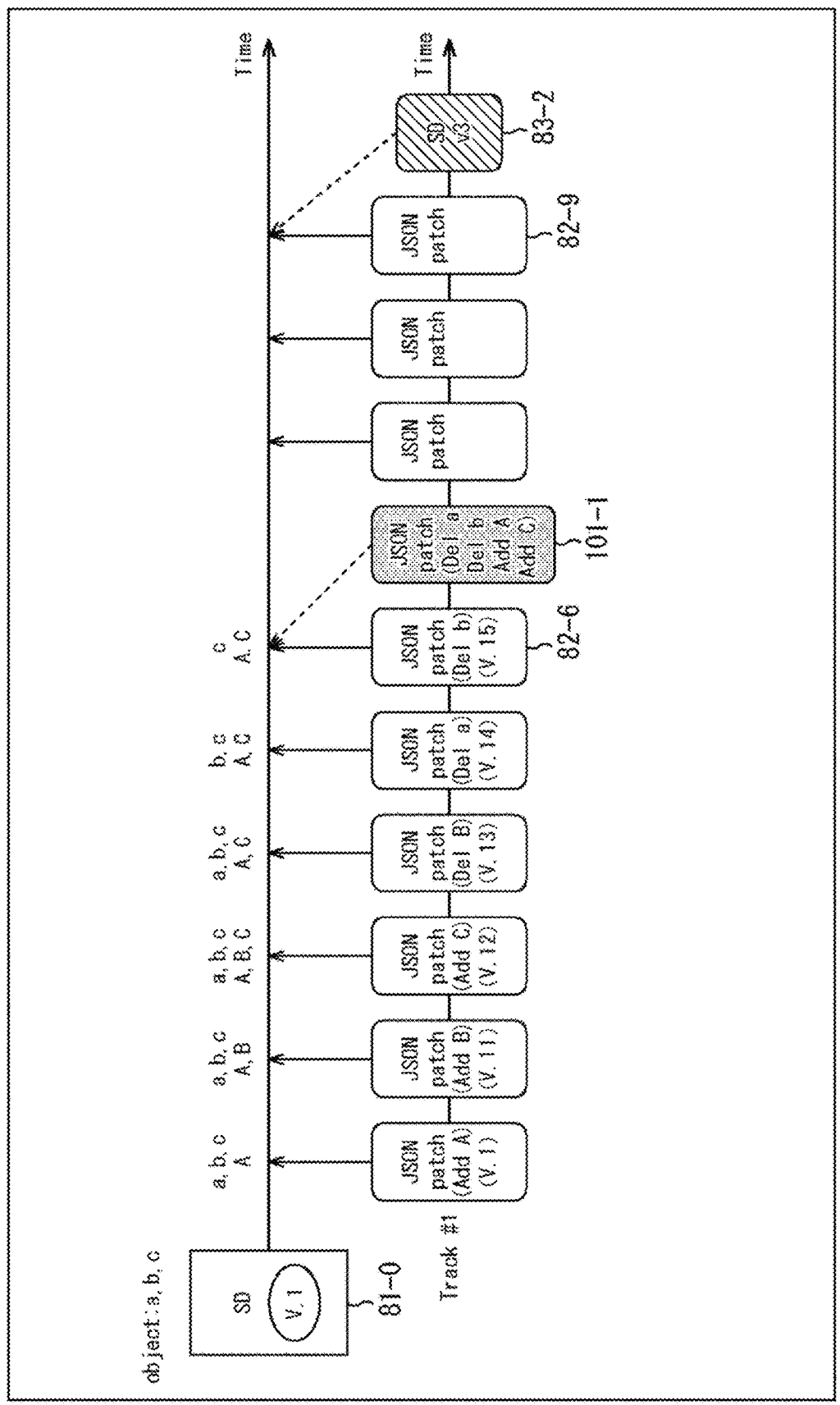
FIG. 29 is a diagram illustrating an example of the storage of update information.

In contrast, whether to store the initial value reference difference information or the post-update information may be selected on a sample-by-sample basis (for each random access point). FIG. 29 illustrates an example of this case. In the example in FIG. 29, the JSON patch 101-1 is stored in the sample following the JSON patch 82-6 as the data of a random access point. Additionally, the scene description 83-2 is stored in the sample following the JSON patch 82-9 as the data of a random access point. In other words, the JSON patch 101-1 and the scene description 83-2 are stored in the same track (Track #1). The JSON patch 101-1 is the initial value reference difference information, and the scene description 83-2 is the post-update information. In other words, in this case, the initial value reference difference information and the post-update information can be intermixed in the same track.

<Method 2-3-1>

When Method 2-3 is applied, update application time information which is the same as in the sample in which the previous value reference difference information is stored may be stored in the sample in which the initial value reference difference information or the post-update information updated at the same timing as the previous value reference difference information is stored (Method 2-3-1), as indicated in the tenth row from the top of the table in FIG. 23.

For example, the file generation unit may store update application time information, which is the same as in the sample in which the previous value reference difference information is stored, in the same sample in which the initial value reference difference information or the post-update information is stored. Additionally, update application time information, which is the same as in the sample in which the previous value reference difference information is stored, may be stored in the sample in which the initial value reference difference information or the post-update information is stored.

Similar to Method 1-3-1, time information specifying the time at which the update is executed is stored in the sample, and time information that is the same as in the sample in which is stored the previous value reference difference information, for which the timing of applying the update is the same as in the initial value reference difference information, is stored in the sample in which the initial value reference difference information or the post-update information is stored. For example, in the case of FIG. 20, the same time information is stored in the sample of the JSON patch 82-6 and the following sample, namely the sample of the JSON patch 101-1. Additionally, the same time information is stored in the sample of the JSON patch 82-9 and the following sample, namely the sample of the JSON patch 101-2. In the case of FIG. 28, the same time information is stored in the sample of the JSON patch 82-6 and the following sample, namely the sample of the scene description 83-1. Additionally, the same time information is stored in the sample of the JSON patch 82-9 and the following sample, namely the sample of the scene description 83-2. In the case of FIG. 29, the same time information is stored in the sample of the JSON patch 82-6 and the following sample, namely the sample of the JSON patch 101-1. Additionally, the same time information is stored in the sample of the JSON patch 82-9 and the following sample, namely the sample of the scene description 83-2.

Doing so enables the client device to identify the previous value reference difference information corresponding to the initial value reference difference information or the post-update information (that is, for which the update application timing is the same as the initial value reference difference information or the post-update information) easily and without parsing within the sample.

<Method 2-3-2>

When applying Method 2-3, the sample in which the initial value reference difference information or the post-update information is stored may be managed, in the management region of the file, as a sample which is not used during normal playback (Method 2-3-2), as indicated in the eleventh row from the top of the table in FIG. 23.

For example, the file generation unit may store management information that manages the sample in which the initial value reference difference information or the post-update information is stored as the sample which is not used during normal playback in a management region of the update file. Additionally, the update information obtainment unit may obtain the initial value reference difference information or the post-update information based on management information, which is stored in a management region of the update file and which manages the sample in which the initial value reference difference information or the post-update information is stored as the sample which is not used during normal playback.

Managing the sample in which the initial value reference difference information or the post-update information is stored as a sample which is not used during normal playback in the management region of the update file that stores the update information enables the client device to skip obtaining the sample in which the initial value reference difference information or the post-update information is stored, easily and without parsing within the sample, during normal playback. In other words, when sequentially obtaining samples of update files as normal playback, the client device can easily obtain only the samples in which the previous value reference difference information or the post-update information is stored, without obtaining the samples in which the initial value reference difference information is stored, based on the management information.

In other words, the client device can obtain the sample in which the initial value reference difference information or the post-update information is stored easily, and without parsing within the sample, during random access. In other words, when performing random access, the client device can easily obtain the sample in which the initial value reference difference information or the post-update information is stored based on this management information.
<Method 2-3-2-1>

When applying Method 2-3-2, identification information indicating whether a sample is a sample used during normal playback may be stored in the management region of the file on a sample-by-sample basis (Method 2-3-2-1), as indicated in the twelfth row from the top of the table in FIG. 23.

For example, the management information that manages the sample in which the initial value reference difference information or the post-update information is stored as a sample not used during normal playback may include identification information indicating whether it is the sample used during normal playback.

For example, similar to Method 1-3-2-1, the sample_has_redundancy flag written in the SampleDependencyTypeBox may be used as identification information indicating whether a sample is a sample used during normal playback. In other words, a sample_has_redundancy flag having a value of "1" (sample_has_redundancy flag=1) is stored in the SampleDependencyTypeBox for the sample in which the initial value reference difference information or the post-update information is stored. Then, the client device skips obtaining samples for which the value of the sample_has_redundancy flag is "1" during normal playback. Doing so enables the client device to skip obtaining the sample in which the initial value reference difference information or the post-update information is stored easily, and without parsing within the sample, during normal playback. In other words, when sequentially obtaining samples of update files as normal playback, the client device can easily obtain only the samples in which the previous value reference difference information is stored, without obtaining the samples in which the initial value reference difference information or the post-update information is stored, based on the sample_has_redundancy flag.
<Method 2-3-3>

When applying Method 2-3, the sample in which the initial value reference difference information or the post-update information is stored may be managed, in the management region of the file, as a sample which can be randomly accessed (Method 2-3-3), as indicated in the thirteenth row from the top of the table in FIG. 23.

For example, the file generation unit may store management information that manages a sample in which the initial value reference difference information or the post-update information is stored as the sample capable of being randomly accessed in a management region of the update file. Additionally, the update information obtainment unit may obtain the initial value reference difference information or the post-update information based on management information, which is stored in a management region of the update file and which manages a sample in which the initial value reference difference information or the post-update information is stored as the sample capable of being randomly accessed.

For example, similar to the case of <Method 2-2-3>, the sample in which the initial value reference difference information or the post-update information is stored is written as a SyncSample in the SyncSampleBox. By doing so, the client device can easily (that is, without parsing within the sample) identify a sample which can be randomly accessed by referring to that SyncSampleBox. In other words, the client device can more easily identify the sample in which the initial value reference difference information or the post-update information is stored based on this information.
<Method 2-4>

Additionally, when Method 2 is applied, the initial value reference difference information or the post-update information may replace the previous value reference difference information, as indicated in the fourteenth row from the top in the table in FIG. 23 (Method 2-4). Note that as described above in <Method 1-1>, the previous value reference difference information is difference information that takes, as a reference, the spatial arrangement information in which updates up to the update information immediately previous are reflected.

For example, the file generation unit may replace previous value reference difference information, which is stored in the update file and for which an update application time is the same as in the initial value reference difference information or the post-update information, with that initial value reference difference information or the post-update information. Additionally, the update information obtainment unit may obtain the initial value reference difference information or the post-update information that has replaced previous value reference difference information, which is stored in the update file and for which an update application time is the same as in the initial value reference difference information or the post-update information.

When the initial value reference difference information replaces the previous value reference difference information as a random access point, that initial value reference difference information is stored as indicated by the example in FIG. 22. Accordingly, similar to Method 1-4, the amount of data in the update file can be reduced compared to the case of Method 2-2, Method 2-3, and the like.

Figure 30:
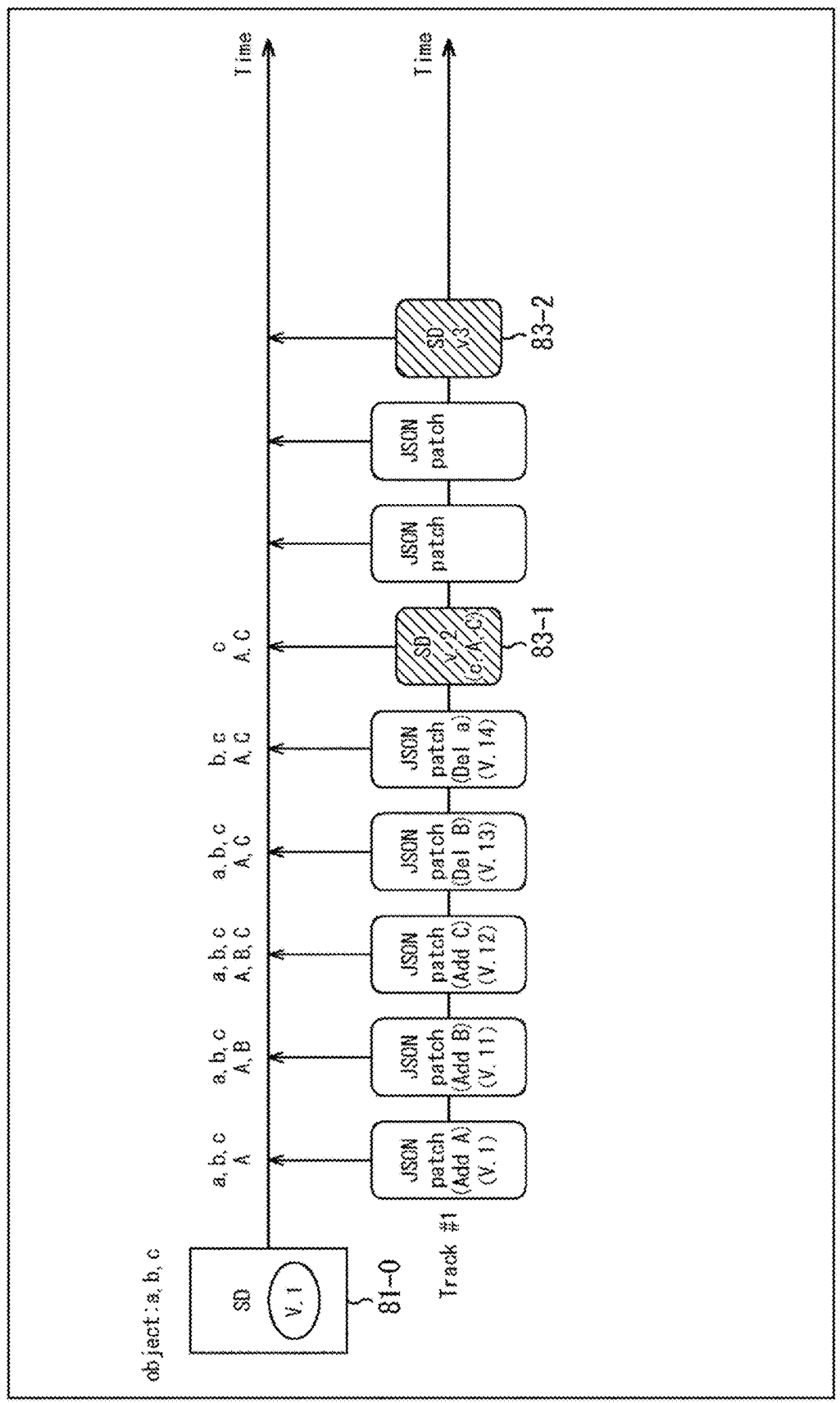
FIG. 30 is a diagram illustrating an example of the storage of update information.

In contrast, when the post-update information replaces the previous value reference difference information as a random access point, that post-update information is stored as indicated by the example in FIG. 30, for example. In the example in FIG. 30, the sample of the scene description 83-1 (the post-update information) replaces the sample of the JSON patch 82-6. Similarly, the sample of the scene description 83-2 (the post-update information) replaces the sample of the JSON patch 82-9.

Accordingly, in the case of normal playback, the scene description at an update application timing of a sample aside from the sample of a random access point is generated using the previous value reference difference information (the JSON patch 82) and the scene description from one timing previous thereto. In contrast, the post-update information (the scene description 83) is applied as a scene description at an update application timing of the sample of the random access point, in both the case of normal playback and the case of random access.

Doing so makes it possible to reduce the data amount of the update file compared to the cases of Method 1-2, Method 1-3, and the like.

Note that whether to store the initial value reference difference information or the post-update information as the random access point may be selected at any desired data level. For example, this selection may be made at the sequence level, as in the examples in FIGS. 22 and 30. In other words, in this case, the initial value reference difference information and the post-update information are not intermixed in the same track (only one thereof is stored).

Figure 31:
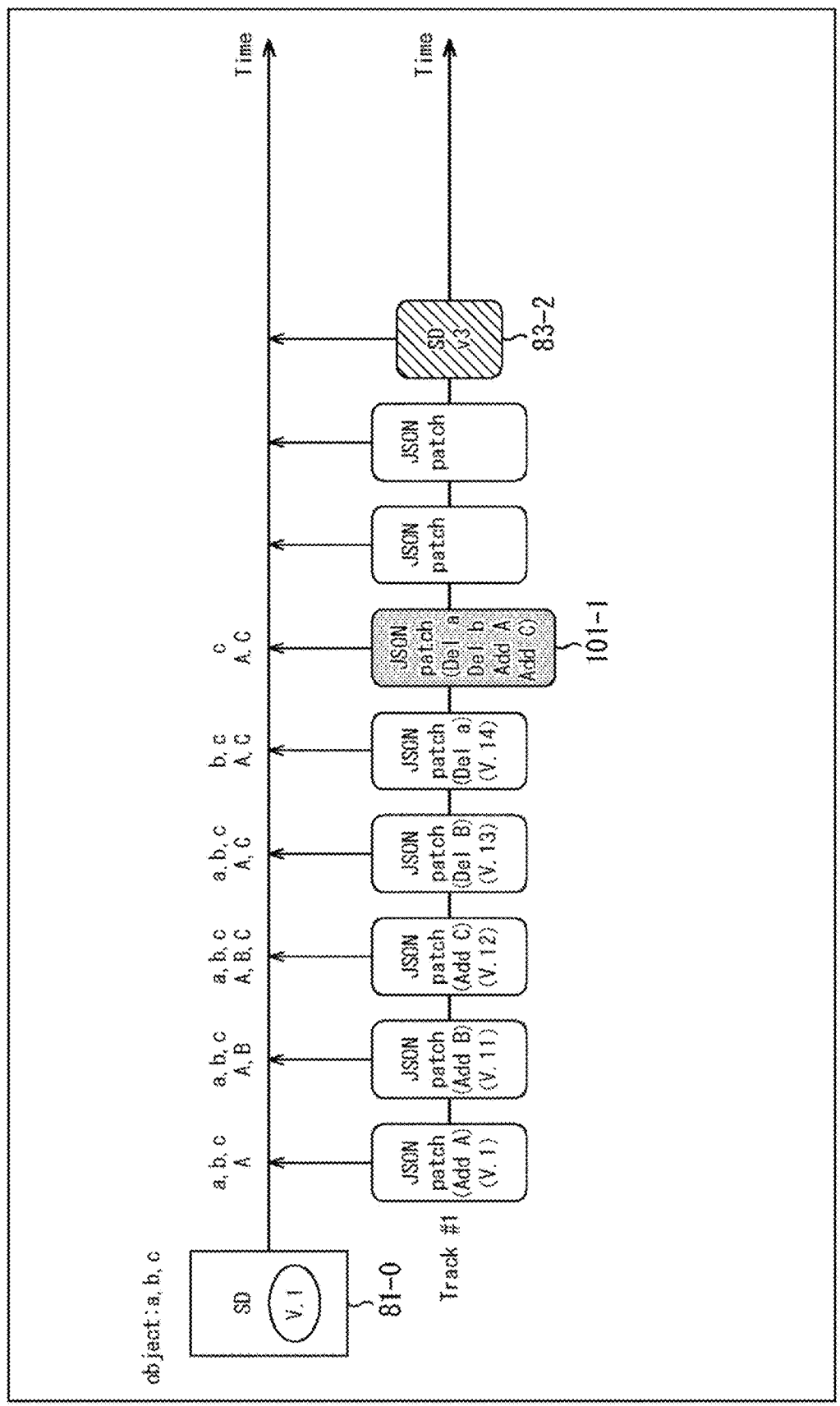
FIG. 31 is a diagram illustrating an example of the storage of update information.

In contrast, whether to store the initial value reference difference information or the post-update information may be selected on a sample-by-sample basis (for each random access point). FIG. 31 illustrates an example of this case. In the example in FIG. 31, the sample of the JSON patch 101-1 replaces the sample of the JSON patch 82-6 as the data of a random access point. Additionally, the sample of the scene description 83-2 replaces the sample of the JSON patch 82-9 as the data of a random access point. In other words, the JSON patch 101-1 and the scene description 83-2 are stored in the same track (Track #1). The JSON patch 101-1 is the initial value reference difference information, and the scene description 83-2 is the post-update information. In other words, in this case, the initial value reference difference information and the post-update information can be intermixed in the same track.

Note that in the case of Method 2-4, there is no previous value reference difference information having the same update application timing as the initial value reference difference information or the post-update information, and the sample_has_redundancy flag is therefore unnecessary (can be omitted), as in the case of Method 2-3.

<Method 2-4-1>

When applying Method 2-4, the sample in which the initial value reference difference information or the post-update information is stored may be managed, in the management region of the file, as a sample which can be randomly accessed (Method 2-3-3), as indicated in the lowermost row of the table in FIG. 23.

For example, the file generation unit may store management information that manages a sample in which the initial value reference difference information or the post-update information is stored as the sample capable of being randomly accessed in a management region of the update file. Additionally, the update information obtainment unit may obtain the initial value reference difference information or the post-update information based on management information, which is stored in a management region of the update file and which manages a sample in which the initial value reference difference information or the post-update information is stored as the sample capable of being randomly accessed.

For example, similar to the case of <Method 2-2-3>, the sample in which the initial value reference difference information or the post-update information is stored is written as a SyncSample in the SyncSampleBox. By doing so, the client device can easily (that is, without parsing within the sample) identify a sample which can be randomly accessed by referring to that SyncSampleBox. In other words, the client device can more easily identify the sample in which the initial value reference difference information or the post-update information is stored based on this information.

4. First Embodiment

<File Generation Device>

Figure 32:
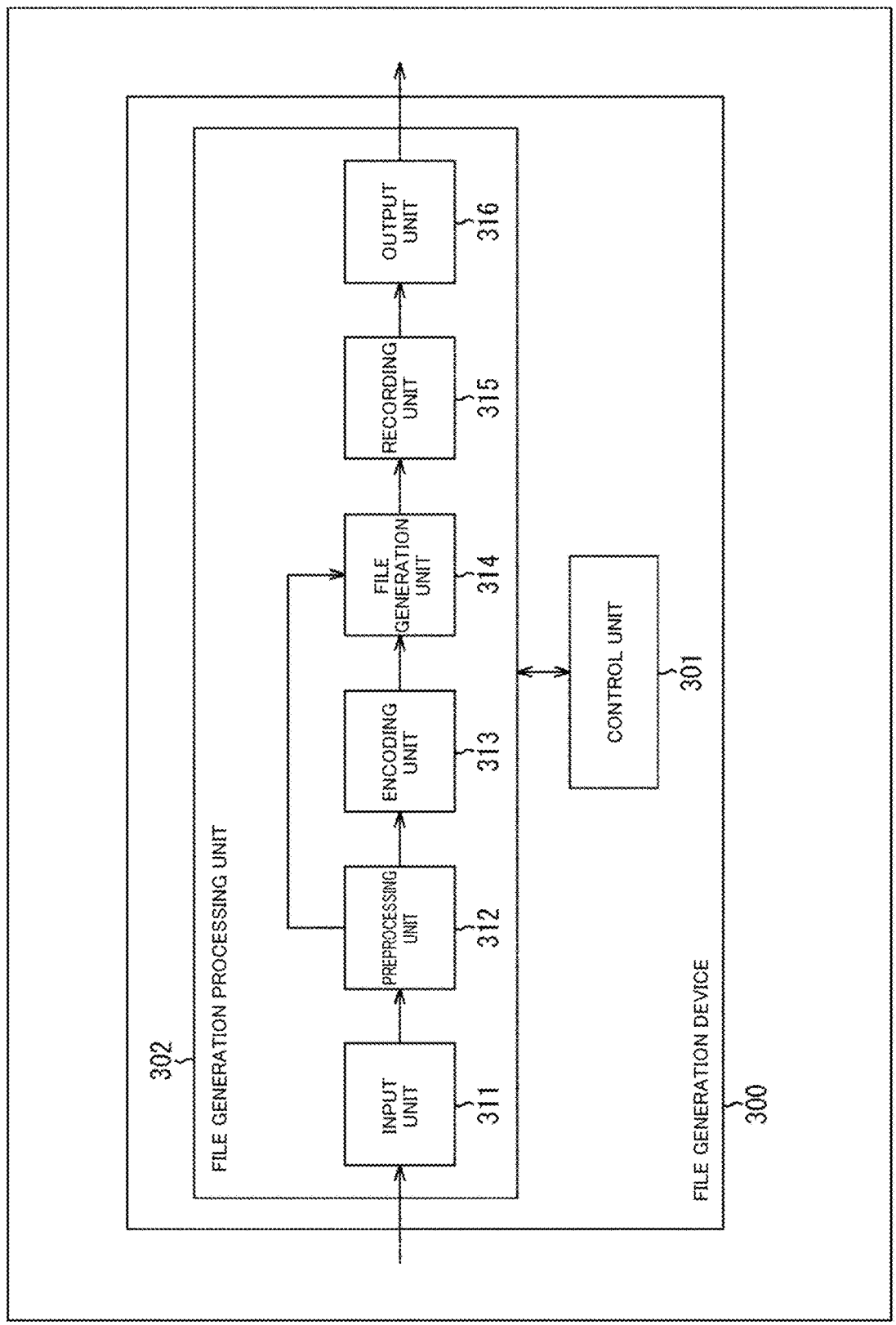
FIG. 32 is a block diagram illustrating an example of the main configuration of a file generation device.

Each of the methods of the present technique described above can be applied in any desired device. FIG. 32 is a block diagram illustrating an example of the configuration of a file generation device serving as one aspect of an information processing device in which the present technique is applied. A file generation device 300 illustrated in FIG. 28 is a device that generates information for arranging 3D object content. For example, the file generation device 300 generates a file of 3D object content to be arranged, generates a scene description file (a scene description) of the 3D object content, and the like.

Note that FIG. 32 illustrates the main processing units, data flows, and the like, and the items illustrated in FIG. 32 are not necessarily all the items. That is, processing units not illustrated in FIG. 32 as blocks and processing and data flows not illustrated in FIG. 32 as arrows or the like may be present in the file generation device 300.

As illustrated in FIG. 32, the file generation device 300 includes a control unit 301 and a file generation processing unit 302. The control unit 301 controls the file generation processing unit 302. The file generation processing unit 302 performs processing pertaining to the generation of files, under the control of the control unit 301. For example, the file generation processing unit 302 generates a 3D object file, which is a content file storing the data of 3D objects to be arranged. The file generation processing unit 302 also generates a scene description file storing a scene description corresponding to those 3D objects, an update file thereof, and the like. The file generation processing unit 302 outputs the generated file to the exterior of the file generation device 300. For example, the file generation processing unit 302 uploads the generated file to a distribution server or the like.

The file generation processing unit 302 includes an input unit 311, a preprocessing unit 312, an encoding unit 313, a file generation unit 314, a recording unit 315, and an output unit 316.

The input unit 311 obtains the data of the 3D objects and supplies that data to the preprocessing unit 312. The preprocessing unit 312 generates a scene description using the data of the 3D objects, generates update information thereof, and the like. The preprocessing unit 312 supplies the generated information to the file generation unit 314. The preprocessing unit 312 also supplies the data of the 3D objects to the encoding unit 313.

The encoding unit 313 encodes the data of the 3D objects supplied from the preprocessing unit 312 and generates encoded data (a bitstream). The encoding unit 313 supplies the generated encoded data of the 3D objects to the file generation unit 314.

The file generation unit 314 obtains the encoded data of the 3D objects, supplied from the encoding unit 313. The file generation unit 314 also obtains the information supplied from the preprocessing unit 312 (e.g., the scene description, the update information thereof, and the like).

The file generation unit 314 generates a 3D object file storing the encoded data of the 3D objects, supplied from the encoding unit 313. The file generation unit 314 also generates a scene description file storing the scene description supplied from the preprocessing unit 312. Furthermore, the file generation unit 314 generates an update file storing the update information supplied from the preprocessing unit 312.

The file generation unit 314 supplies the generated file to the recording unit 315. The recording unit 315 has any type of recording medium, such as a hard disk, a semiconductor memory, or the like, and records the file supplied from the file generation unit 314 into that recording medium. The recording unit 315 also reads out files recorded in the recording medium, and supplies the files to the output unit 316, in response to a request from the control unit 301 or the output unit 316, or at a predetermined timing.

The output unit 316 obtains the file supplied from the recording unit 315 and outputs that file to the exterior of the file generation device 300 (e.g., to a distribution server, a playback device, or the like).

<File Generation Processing Flow 1>

Figure 33:
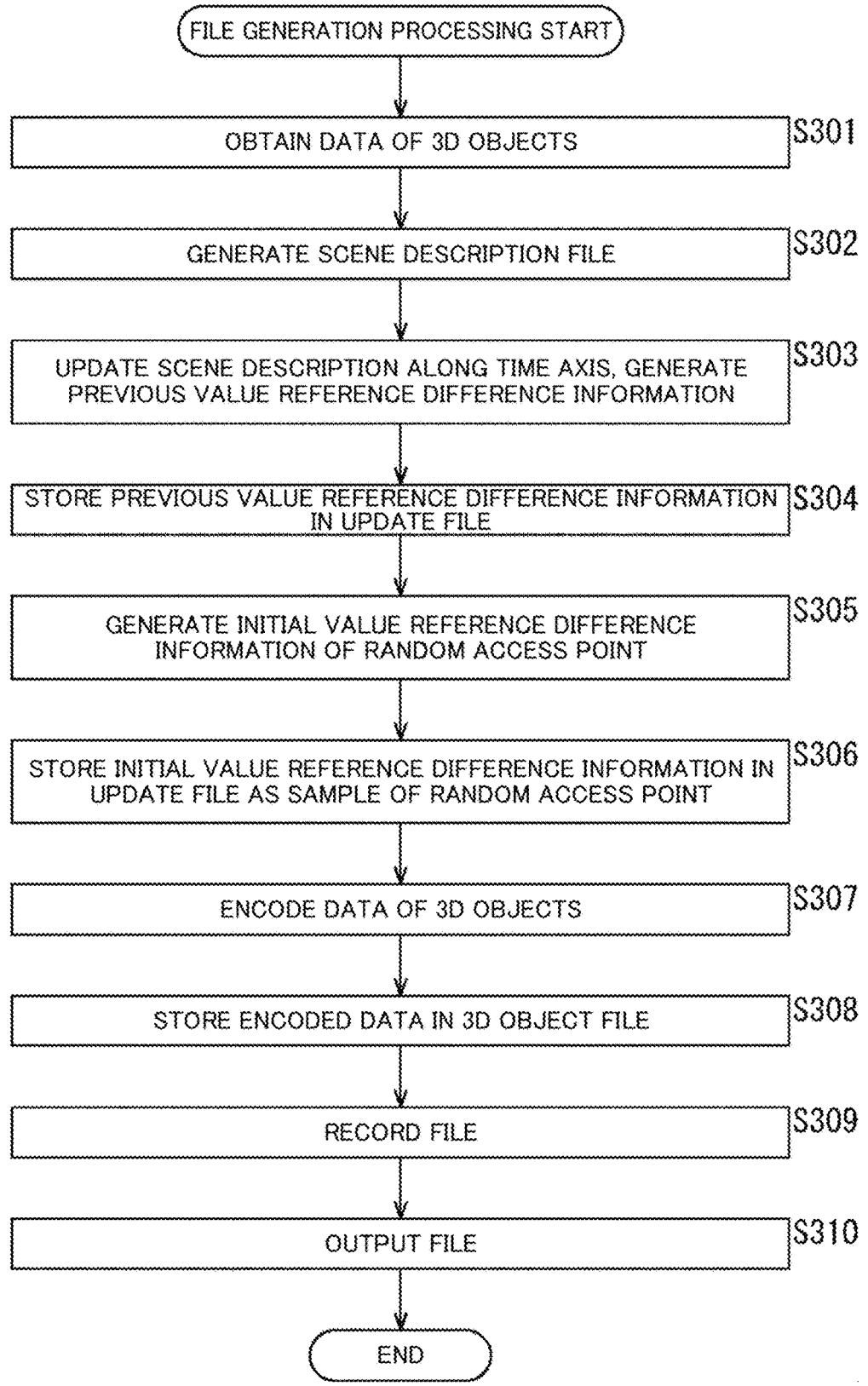
FIG. 33 is a flowchart illustrating an example of the flow of file generation processing.

This file generation device 300 can generate a file by applying the present disclosure described above in <2. Transmission of Initial Value Reference Difference Information>, for example. For example, the file generation device 300 can generate a file by applying the above-described Method 1. An example of the flow of file generation processing executed by the file generation device 300 in this case will be described with reference to the flowchart in FIG. 33.

When the file generation processing starts, in step S301, the input unit 311 of the file generation device 300 obtains 3D object data.

In step S302, the preprocessing unit 312 generates a scene description, which is spatial arrangement information for arranging at least one 3D object in a 3D space, using the 3D object data obtained in step S301. The file generation unit 314 also generates a scene description file storing that scene description.

In step S303, the preprocessing unit 312 updates the scene description generated in step S302 along the time axis, and generates previous value reference difference information as the update information to be applied during normal playback.

In step S304, the file generation unit 314 generates an update file for storing update information, and stores the update information (the previous value reference difference information) generated in step S303 in that update file. At this time, the file generation unit 314 stores the previous value reference difference information in the sample of a track for storing the previous value reference difference information.

In step S305, the preprocessing unit 312 applies Method 1, described above in <Method 1>, and generates initial value reference difference information as update information of the scene description generated in step S302.

In step S306, the file generation unit 314 applies Method 1, described above in <Method 1>, and stores the initial value reference difference information generated in step S303 in the update file as a sample of a random access point.

In step S307, the encoding unit 313 encodes the data of the 3D objects obtained in step S301, and generates encoded data of the 3D objects (a bitstream).

In step S308, the file generation unit 314 generates a 3D object file, which is a content file, and stores the encoded data of the 3D objects generated in step S307 in the 3D object file.

In step S309, the recording unit 315 records the scene description file generated in step S302 in the recording medium. The recording unit 315 also records the update file, generated in step S304 and in which the update information was stored in step S304 or step S306, in the recording medium. Furthermore, the recording unit 315 records the 3D object file generated in step S308 in the recording medium.

In step S310, the output unit 316 reads out the various files recorded in step S309 from the recording medium, and outputs the read-out files to the exterior of the file generation device 300 at a predetermined timing. For example, the output unit 316 may transmit (upload) the files read out from the recording medium to another device, such as a distribution server, a playback device, or the like, over a communication medium such as a network or the like. The output unit 316 may also record the files read out from the recording medium into an external recording medium such as a removable medium or the like. In this case, the output file may be supplied to another device (a distribution server, a playback device, or the like) via that external recording medium, for example.

When the processing of step S310 ends, the file generation processing ends.

As described above, by executing each process, the file generation device 300 can suppress an increase in the processing load on a client device that randomly accesses scene descriptions, as described above in <Method 1>.

Note that when Method 1 is applied in step S306, the file generation unit 314 may apply Method 1-1 described above in <Method 1-1>. In other words, the file generation unit 314 may store the initial value reference difference information in a different track than the previous value reference difference information in the update file. Accordingly, by specifying the track, the client device can more easily obtain the samples of the initial value reference difference information independently from the samples of the previous value reference difference information.

Additionally, when Method 1-1 is applied in step S306, the file generation unit 314 may apply Method 1-1-1 described above in <Method 1-1-1>. In other words, the file generation unit 314 may generate an initial value file which stores the initial value of the spatial arrangement information, and may store link information indicating a link to the track where the initial value reference difference information is stored as the link information for random access in that initial value file. Doing so enables the client device to more easily identify the track in which the appropriate update information is stored.

Additionally, when Method 1 is applied in step S306, the file generation unit 314 may apply Method 1-2 described above in <Method 1-2>. In other words, the file generation unit 314 may store the initial value reference difference information in the same sample of the same track as the previous value reference difference information in the update file. By doing so, the client device can obtain the update information (the previous value reference difference information or the initial value reference difference information) using the same link information both during normal playback and during random access.

Additionally, when Method 1-2 is applied in step S306, the file generation unit 314 may apply Method 1-2-1 described above in <Method 1-2-1>. In other words, the file generation unit 314 may store, in the same sample, the previous value reference difference information and the initial value reference difference information as a list with each piece of information as an element. By doing so, the client device can more easily obtain the previous value reference difference information and the initial value reference difference information.

Additionally, when Method 1-2 is applied in step S306, the file generation unit 314 may apply Method 1-2-2 described above in <Method 1-2-2>. In other words, the file generation unit 314 may store management information (e.g., a SubSampleInformationBox) that manages each of the previous value reference difference information and the initial value reference difference information as sub-samples, in a management region of the update file. By doing so, the client device can more easily obtain the previous value reference difference information, the initial value reference difference information, and the like.

Additionally, when Method 1-2-2 is applied in step S306, the file generation unit 314 may apply Method 1-2-2-1 described above in <Method 1-2-2-1>. In other words, the management information may include identification information (e.g., codec_specific_parameters) identifying the sub-sample in which the previous value reference difference information is stored and the sub-sample in which the initial value reference difference information is stored. By referring to the values of this identification information, the client device can easily (that is, without parsing within the sample) identify whether a sub-sample is a sub-sample in which the previous value reference difference information is stored or a sub-sample in which the initial value reference difference information is stored.

Additionally, when Method 1-2 is applied in step S306, the file generation unit 314 may apply Method 1-2-3 described above in <Method 1-2-3>. In other words, the file generation unit 314 may store management information (the SyncSampleBox) that manages a sample in which the initial value reference difference information is stored as the sample capable of being randomly accessed in a management region of the update file. The client device can more easily identify the sample in which the initial value reference difference information is stored based on this management information.

Additionally, when Method 1 is applied in step S306, the file generation unit 314 may apply Method 1-3 described above in <Method 1-3>. In other words, the file generation unit 314 may store the initial value reference difference information in a different sample of the same track as the previous value reference difference information in the update file. By doing so, the client device can select the previous value reference difference information or the initial value reference difference information by selecting a sample.

Additionally, when Method 1-3 is applied in step S306, the file generation unit 314 may apply Method 1-3-1 described above in <Method 1-3-1>. In other words, the file generation unit 314 may store update application time information, which is the same as in the sample in which the previous value reference difference information is stored, in the sample in which the initial value reference difference information is stored. Doing so enables the client device to identify the previous value reference difference information corresponding to the initial value reference difference information easily and without parsing within the sample.

Additionally, when Method 1-3 is applied in step S306, the file generation unit 314 may apply Method 1-3-2 described above in <Method 1-3-2>. In other words, the file generation unit 314 may store management information that manages the sample in which the initial value reference difference information is stored as the sample which is not used during normal playback in a management region of the update file. Doing so enables the client device to skip obtaining the sample in which the initial value reference difference information is stored easily (without parsing within the sample) based on this management information, during normal playback. In other words, when performing random access, the client device can easily (without parsing within the sample) obtain the sample in which the initial value reference difference information is stored based on this management information.

Additionally, when Method 1-3-2 is applied in step S306, the file generation unit 314 may apply Method 1-3-2-1 described above in <Method 1-3-2-1>. In other words, the above-described management information may include identification information (e.g., the sample_has_redundancy_flag) indicating whether the sample is a sample which is used during normal playback. Doing so enables the client device to skip obtaining the sample in which the initial value reference difference information is stored easily (without parsing within the sample) based on this identification information, during normal playback.

Additionally, when Method 1-3 is applied in step S306, the file generation unit 314 may apply Method 1-3-3 described above in <Method 1-3-3>. In other words, the file generation unit 314 may store management information (e.g., the SyncSampleBox) that manages a sample in which the initial value reference difference information is stored as the sample capable of being randomly accessed in a management region of the update file. By doing so, the client device can more easily identify the sample in which the initial value reference difference information is stored based on this management information.

Additionally, when Method 1 is applied in step S306, the file generation unit 314 may apply Method 1-4 described above in <Method 1-4>. In other words, the file generation unit 314 may replace previous value reference difference information, which is stored in the update file and for which an update application time is the same as in the initial value reference difference information, with that initial value reference difference information. Doing so makes it possible to reduce the data amount of the update file compared to the cases of Method 1-2, Method 1-3, and the like.

Additionally, when Method 1-4 is applied in step S306, the file generation unit 314 may apply Method 1-4-1 described above in <Method 1-4-1>. In other words, the file generation unit 314 may store management information (e.g., the SyncSampleBox) that manages a sample in which the initial value reference difference information is stored as the sample capable of being randomly accessed in a management region of the update file. By doing so, the client device can more easily identify the sample in which the initial value reference difference information is stored based on this management information.

Note that any number of the above-described methods may be applied in combination with each other as long as doing so produces no conflicts. The methods described above may also be applied in combination with other desired methods not described above.

<File Generation Processing Flow 2>

Figure 34:
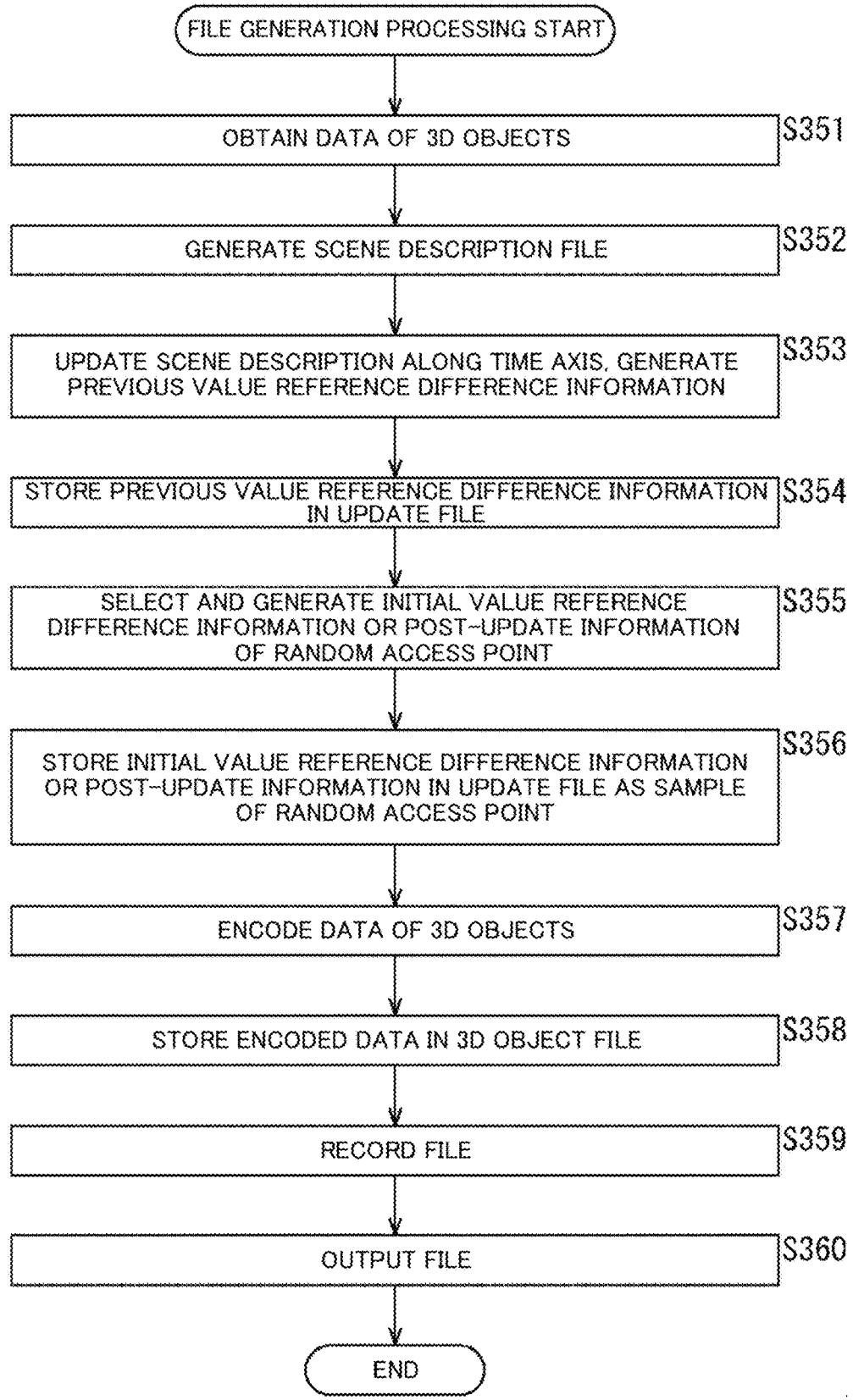
FIG. 34 is a flowchart illustrating an example of the flow of file generation processing.

Additionally, this file generation device 300 can generate a file by applying the present disclosure described above in <3. Transmission of Initial Value Reference Difference Information or Post-Update Information>, for example. For example, the file generation device 300 can generate a file by applying the above-described Method 2. An example of the flow of file generation processing executed by the file generation device 300 in this case will be described with reference to the flowchart in FIG. 34.

When the file generation processing starts, in step S351, the input unit 311 of the file generation device 300 obtains 3D object data.

In step S352, the preprocessing unit 312 generates a scene description, which is spatial arrangement information for arranging at least one 3D object in a 3D space, using the 3D object data obtained in step S351. The file generation unit 314 also generates a scene description file storing that scene description.

In step S353, the preprocessing unit 312 updates the scene description generated in step S352 along the time axis, and generates previous value reference difference information as the update information to be applied during normal playback.

In step S354, the file generation unit 314 generates an update file for storing update information, and stores the update information (the previous value reference difference information) generated in step S353 in that update file. At this time, the file generation unit 314 stores the previous value reference difference information in the sample of a track for storing the previous value reference difference information.

In step S355, the preprocessing unit 312 applies Method 2, described above in <Method 2>, and selects and generates initial value reference difference information or post-update information as update information of the scene description generated in step S352.

In step S356, the file generation unit 314 applies Method 2, described above in <Method 2>, and stores the initial value reference difference information or the post-update information generated in step S353 in the update file as a sample of a random access point.

In step S357, the encoding unit 313 encodes the data of the 3D objects obtained in step S351, and generates encoded data of the 3D objects (a bitstream).

In step S358, the file generation unit 314 generates a 3D object file, which is a content file, and stores the encoded data of the 3D objects generated in step S357 in the 3D object file.

In step S359, the recording unit 315 records the scene description file generated in step S352 in the recording medium. The recording unit 315 also records the update file, generated in step S354 and in which the update information was stored in step S354 or step S356, in the recording medium. Furthermore, the recording unit 315 records the 3D object file generated in step S358 in the recording medium.

In step S360, the output unit 316 reads out the various files recorded in step S359 from the recording medium, and outputs the read-out files to the exterior of the file generation device 300 at a predetermined timing. For example, the output unit 316 may transmit (upload) the files read out from the recording medium to another device, such as a distribution server, a playback device, or the like, over a communication medium such as a network or the like. The output unit 316 may also record the files read out from the recording medium into an external recording medium such as a removable medium or the like. In this case, the output file may be supplied to another device (a distribution server, a playback device, or the like) via that external recording medium, for example.

When the processing of step S360 ends, the file generation processing ends.

As described above, by executing each process, the file generation device 300 can, in a broader range of cases, suppress an increase in the processing load on a client device that randomly accesses scene descriptions, as described above in <Method 2>.

Note that when Method 2 is applied in step S356, the file generation unit 314 may apply Method 2-1 described above in <Method 2-1>. In other words, the file generation unit 314 may store the initial value reference difference information or the post-update information in a different track than the previous value reference difference information in the update file. Accordingly, by specifying the track, the client device can more easily obtain the samples of the initial value reference difference information independently or the scene description from the samples of the previous value reference difference information.

Additionally, when Method 2-1 is applied in step S356, the file generation unit 314 may apply Method 1-1-1 described above in <Method 2-1-1>. In other words, the file generation unit 314 may generate an initial value file which stores the initial value of the spatial arrangement information, and may store link information indicating a link to the track where the initial value reference difference information or the post-update information is stored as the link information for random access in that initial value file. Doing so enables the client device to more easily identify the track in which the appropriate update information is stored.

Additionally, when Method 2 is applied in step S356, the file generation unit 314 may apply Method 2-2 described above in <Method 2-2>. In other words, the file generation unit 314 may store the initial value reference difference information or the post-update information in the same sample of the same track as the previous value reference difference information in the update file. By doing so, the client device can obtain the update information using the same link information both during normal playback and during random access.

Additionally, when Method 2-2 is applied in step S356, the file generation unit 314 may apply Method 2-2-1 described above in <Method 2-2-1>. In other words, the file generation unit 314 may store, in the same sample, the previous value reference difference information, as well as the initial value reference difference information or the post-update information, as a list with each piece of information as an element. By doing so, the client device can more easily obtain the previous value reference difference information, as well as the initial value reference difference information or the post-update information.

Additionally, when Method 2-2 is applied in step S356, the file generation unit 314 may apply Method 2-2-2 described above in <Method 2-2-2>. In other words, the file generation unit 314 may store management information (e.g., a SubSampleInformationBox) that manages each of the previous value reference difference information, as well as the initial value reference difference information or the post-update information, as sub-samples, in a management region of the update file. By doing so, the client device can more easily obtain the previous value reference difference information, the initial value reference difference information, the post-update information, and the like.

Additionally, when Method 2-2-2 is applied in step S356, the file generation unit 314 may apply Method 2-2-2-1 described above in <Method 2-2-2-1>. In other words, the management information may include identification information (e.g., codec_specific_parameters) identifying the sub-sample in which the previous value reference difference information is stored and the sub-sample in which the initial value reference difference information or the post-update information is stored. By referring to the values of this identification information, the client device can easily (that is, without parsing within the sample) identify whether a sub-sample is a sub-sample in which the previous value reference difference information is stored or a sub-sample in which the initial value reference difference information or the post-update information is stored.

Additionally, when Method 2-2 is applied in step S356, the file generation unit 314 may apply Method 2-2-3 described above in <Method 2-2-3>. In other words, the file generation unit 314 may store management information (the SyncSampleBox) that manages a sample in which the initial value reference difference information or the post-update information is stored as the sample capable of being randomly accessed in a management region of the update file. The client device can more easily identify the sample in which the initial value reference difference information or the post-update information is stored based on this management information.

Additionally, when Method 2 is applied in step S356, the file generation unit 314 may apply Method 2-3 described above in <Method 2-3>. In other words, the file generation unit 314 may store the initial value reference difference information or the post-update information in a different sample of the same track as the previous value reference difference information in the update file. By doing so, the client device can select the previous value reference difference information, as well as the initial value reference difference information or the post-update information, by selecting a sample.

Additionally, when Method 2-3 is applied in step S356, the file generation unit 314 may apply Method 2-3-1 described above in <Method 2-3-1>. In other words, the file generation unit 314 may store update application time information, which is the same as in the sample in which the previous value reference difference information is stored, in the sample in which the initial value reference difference information or the post-update information is stored. Doing so enables the client device to identify the previous value reference difference information corresponding to the initial value reference difference information or the post-update information easily and without parsing within the sample.

Additionally, when Method 2-3 is applied in step S356, the file generation unit 314 may apply Method 2-3-2 described above in <Method 2-3-2>. In other words, the file generation unit 314 may store management information that manages the sample in which the initial value reference difference information or the post-update information is stored as the sample which is not used during normal playback in a management region of the update file. Doing so enables the client device to skip obtaining the sample in which the initial value reference difference information is stored easily (without parsing within the sample) based on this management information, during normal playback. In other words, when performing random access, the client device can easily (without parsing within the sample) obtain the sample in which the initial value reference difference information or the post-update information is stored based on this management information.

Additionally, when Method 2-3-2 is applied in step S356, the file generation unit 314 may apply Method 2-3-2-1 described above in <Method 2-3-2-1>. In other words, the above-described management information may include identification information (e.g., the sample_has_redundancy_flag) indicating whether the sample is a sample which is used during normal playback. Doing so enables the client device to skip obtaining the sample in which the initial value reference difference information or the post-update information is stored easily (without parsing within the sample) based on this identification information, during normal playback.

Additionally, when Method 3-3 is applied in step S356, the file generation unit 314 may apply Method 2-3-3 described above in <Method 2-3-3>. In other words, the file generation unit 314 may store management information (e.g., the SyncSampleBox) that manages a sample in which the initial value reference difference information or the post-update information is stored as the sample capable of being randomly accessed in a management region of the update file. By doing so, the client device can more easily identify the sample in which the initial value reference difference information or the post-update information is stored based on this management information.

Additionally, when Method 2 is applied in step S356, the file generation unit 314 may apply Method 2-4 described above in <Method 2-4>. In other words, the file generation unit 314 may replace previous value reference difference information, which is stored in the update file and for which an update application time is the same as in the initial value reference difference information or the post-update information, with that initial value reference difference information or the post-update information. Doing so makes it possible to reduce the data amount of the update file compared to the cases of Method 2-2, Method 2-3, and the like.

Additionally, when Method 2-4 is applied in step S356, the file generation unit 314 may apply Method 2-4-1 described above in <Method 2-4-1>. In other words, the file generation unit 314 may store management information (e.g., the SyncSampleBox) that manages a sample in which the initial value reference difference information or the post-update information is stored as the sample capable of being randomly accessed in a management region of the update file. By doing so, the client device can more easily identify the sample in which the initial value reference difference information or the post-update information is stored based on this management information.

Note that any number of the above-described methods may be applied in combination with each other as long as doing so produces no conflicts. The methods described above may also be applied in combination with other desired methods not described above.

5. Second Embodiment

<Client Device>

Figure 35:
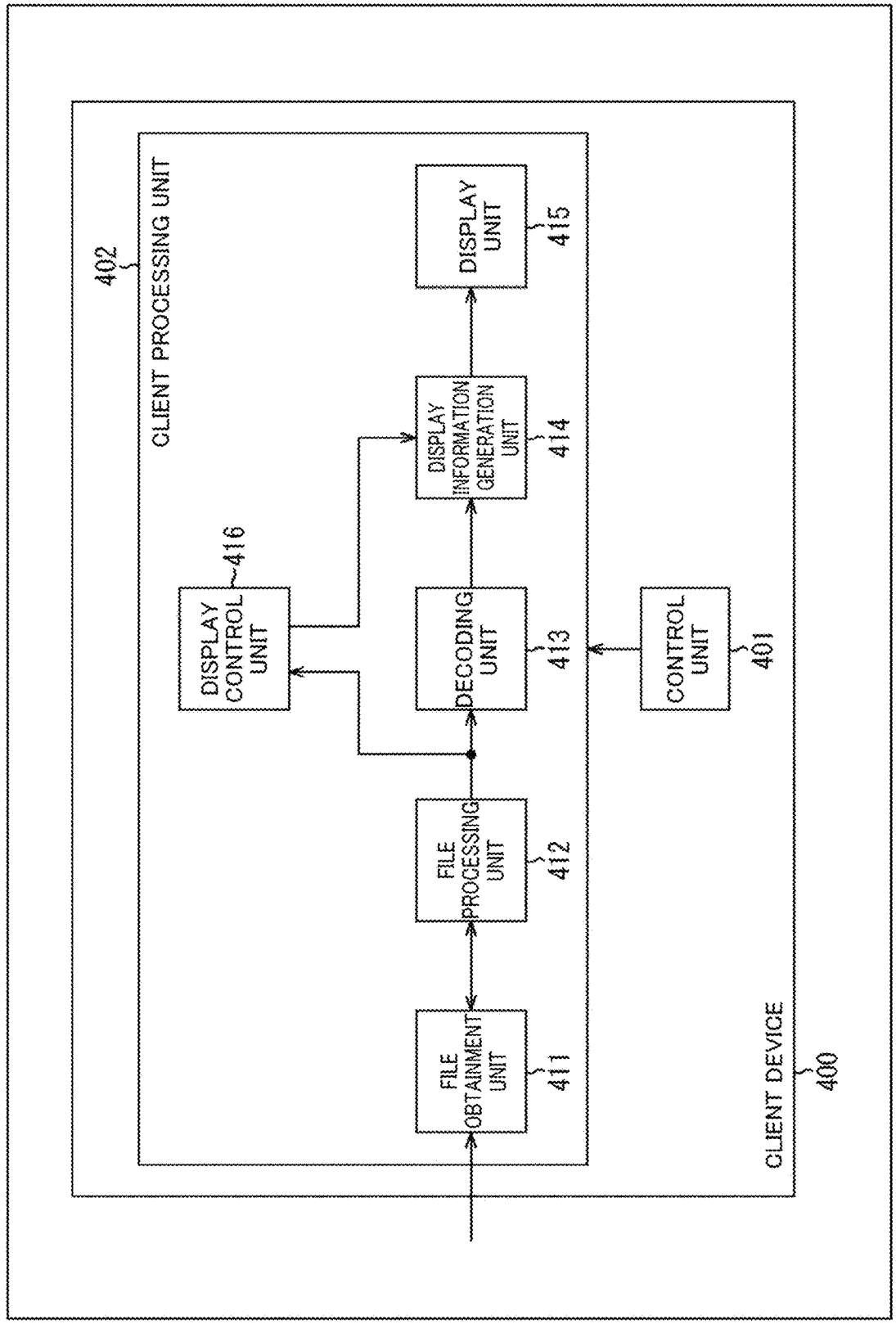
FIG. 35 is a block diagram illustrating an example of the main configuration of a client device.

FIG. 35 is a block diagram illustrating an example of the configuration of a client device serving as one aspect of an information processing device in which the present technique is applied. A client device 400 illustrated in FIG. 35 is a playback device that performs playback processing of 3D object content based on a scene description file (a scene description). For example, the client device 400 plays back data of 3D objects stored in a 3D object file generated by the file generation device 300. At this time, the client device 400 performs processing pertaining to the playback based on the scene description.

Note that FIG. 35 illustrates the main processing units, data flows, and the like, and the items illustrated in FIG. 35 are not necessarily all the items. That is, processing units not illustrated in FIG. 35 as blocks and processing and data flows not illustrated in FIG. 35 as arrows or the like may be present in the client device 400.

As illustrated in FIG. 35, the client device 400 includes a control unit 401 and a playback processing unit 402. The control unit 401 performs processing pertaining to control of the playback processing unit 402. The playback processing unit 402 performs processing pertaining to the playback of the data of 3D objects.

The playback processing unit 402 includes a file obtainment unit 411, a file processing unit 412, a decoding unit 413, a display information generation unit 414, a display unit 415, and a display control unit 416.

The file obtainment unit 411 obtains a file from outside the client device 400, such as from a distribution server, the file generation device 300, or the like, for example. For example, the file obtainment unit 411 obtains a scene description file and an update file thereof from outside the client device 400, and supplies those files to the file processing unit 412. The file obtainment unit 411 also obtains a 3D content file requested by the file processing unit 412 from outside the client device 400, and supplies that file to the file processing unit 412.

The file processing unit 412 obtains the various files supplied from the file obtainment unit 411 and performs processing pertaining to the obtained files. For example, the file processing unit 412 obtains the scene description file, the update file thereof, and the like from the file obtainment unit 411. The file processing unit 412 also extracts a scene description from the scene description file. The file processing unit 412 also extracts update information (the previous value reference difference information, the initial value reference difference information, the post-update information, and the like) from the update file. The file processing unit 412 also updates the scene description as necessary using the update information, and generates the newest (that is, corresponding to the timing for processing) scene description.

The file processing unit 412 also analyzes the scene description, and identifies the data of the 3D objects corresponding to the timing for processing, necessary for the playback. The file processing unit 412 then requests the file obtainment unit 411 to obtain the identified data of the 3D objects. The file processing unit 412 also obtains the 3D object file supplied from the file obtainment unit 411 based on that request, and extracts the data of the 3D objects (encoded data) stored in that file. The file processing unit 412 supplies the extracted data of the 3D objects (the encoded data) to the decoding unit 413. The file processing unit 412 also supplies information useful for generating display information, contained in the scene description and the like, to the display control unit 416.

The decoding unit 413 decodes the encoded data of the 3D objects supplied from the file processing unit 412. The decoding unit 413 supplies the data of the 3D objects, obtained through the decoding, to the display information generation unit 414.

The display information generation unit 414 obtains the data of the 3D objects supplied from the decoding unit 413. The display information generation unit 414 also renders the data of the 3D objects under the control of the display control unit 416, and generates a display image and the like. The display information generation unit 414 supplies the generated display image and the like to the display unit 415.

The display unit 415 includes a display device, and displays the display image supplied from the display information generation unit 414 using that display device.

The display control unit 416 obtains information, such as the scene description, supplied from the file processing unit 412. The display control unit 416 controls the display information generation unit 414 based on that information.

<Client Processing Flow 1>

This client device 400 can perform processing pertaining to the analysis of scene descriptions, the playback of data of 3D objects, and the like by applying the present disclosure described above in <2. Transmission of Initial Value Reference Difference Information>, for example. For example, the client device 400 can perform processing by applying Method 1 described above. An example of the flow of client processing executed by the client device 400 in this case will be described with reference to the flowcharts in FIGS. 36 and 37.

Figure 36:
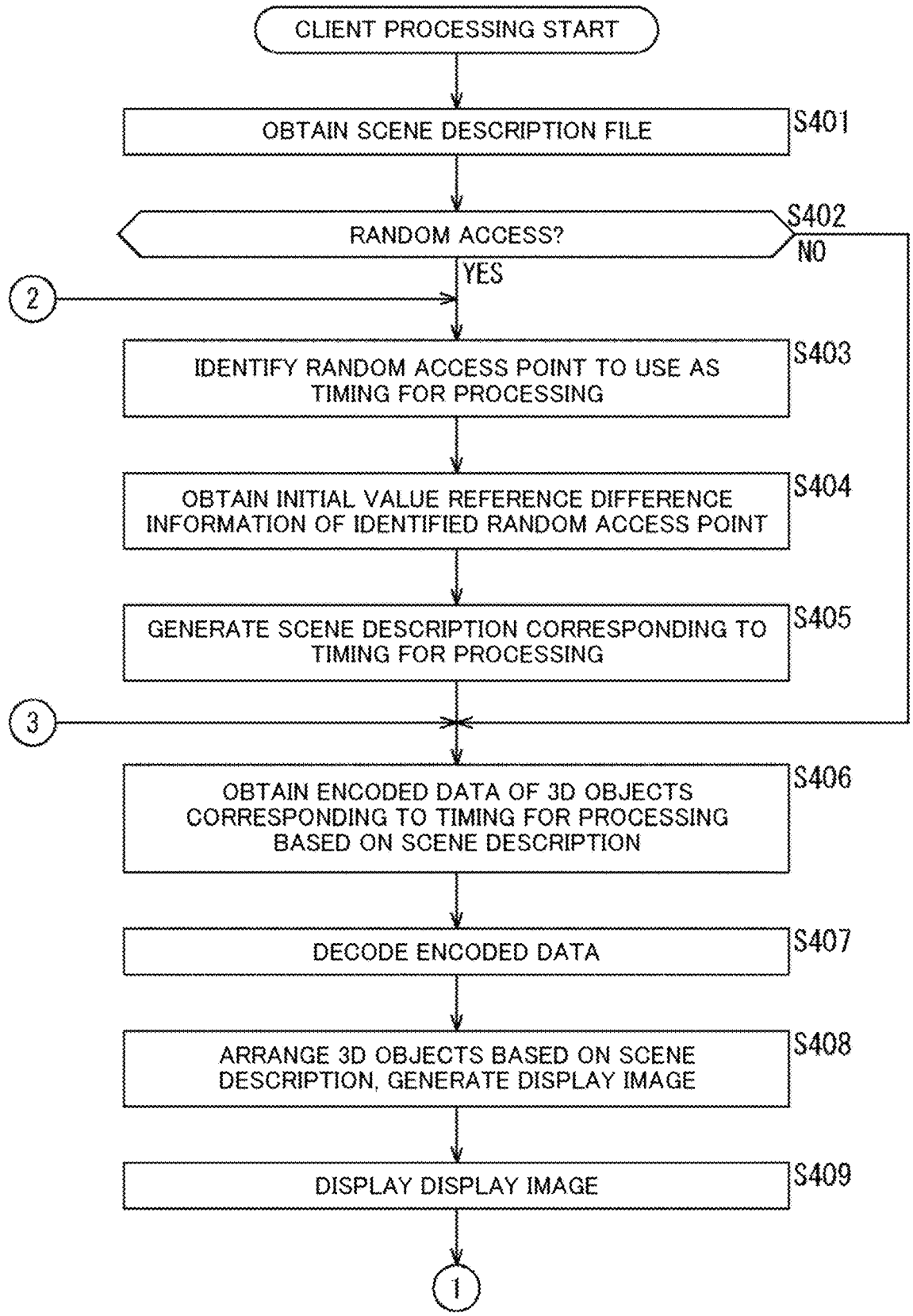
FIG. 36 is a flowchart illustrating an example of the flow of client processing.

When the client processing starts, in step S401 of FIG. 36, the file obtainment unit 411 of the client device 400 obtains a scene description file. The initial values of a scene description are stored in this scene description file. The file obtainment unit 411 supplies the obtained scene description file to the file processing unit 412. The file obtainment unit 411 extracts the scene description (the initial values) from that scene description file.

In step S402, the control unit 401 determines whether to perform random access on the scene description. The processing moves to step S403 when it is determined that random access is to be performed, based on an instruction from a user, an application, or the like, for example.

In step S403, the file processing unit 412 analyzes the scene description and identifies a random access point to serve as the timing for processing. In other words, the file processing unit 412 identifies a sample to be randomly accessed from among prepared random access points.

In step S404, the file processing unit 412 requests the file obtainment unit 411 to obtain the initial value reference difference information of the random access point identified in step S403. The file obtainment unit 411 obtains an update file, which contains the requested initial value reference difference information, from outside the client device 400, such as from a distribution server, the file generation device 300, or the like, for example. In other words, the file obtainment unit 411 requests the distribution server or the like to supply the update file containing the initial value reference difference information requested by the file processing unit 412. The file obtainment unit 411 then obtains the update file (the initial value reference difference information) supplied in accordance with the request. The file processing unit 412 applies Method 1, described above in <Method 1>, to extract and obtain the initial value reference difference information from the obtained update file.

In step S405, the file processing unit 412 applies Method 1, described above in <Method 1>, to update the scene description using the obtained initial value reference difference information and generate a scene description corresponding to the timing for processing. In other words, by reflecting the update to the initial value reference difference information in the initial values of the scene description, for example, the file processing unit 412 generates a scene description (spatial arrangement information) for the update application time of that initial value reference difference information (i.e., the timing for processing).

When the processing of step S405 ends, the processing moves to step S406. Additionally, when it is determined in step S402 that random access is not to be performed (i.e., that normal playback is to be performed), the processing moves to step S406.

In step S406, the file processing unit 412 requests the file obtainment unit 411 to obtain the encoded data of the 3D objects corresponding to the timing for processing, based on the scene description at the timing for processing. The file obtainment unit 411 obtains, from outside the client device 400, a 3D object file storing the encoded data of the 3D objects, corresponding to the timing for processing in the request. For example, the file obtainment unit 411 requests a distribution server or the like to supply the 3D object file containing the encoded data of the 3D objects, requested by the file processing unit 412. The file obtainment unit 411 then obtains the 3D object file supplied in response to that request and supplies the file to the file processing unit 412. The file processing unit 412 extracts, from that 3D object file, the encoded data of the 3D objects corresponding to the timing for processing.

In step S407, the decoding unit 413 decodes the encoded data of the 3D objects corresponding to the timing for processing, obtained in step S406.

In step S408, the display information generation unit 414 performs processing pertaining to the generation of a display image under the control of the display control unit 416. For example, based on the scene description corresponding to the timing for the processing, obtained in step S405, the display information generation unit 414 arranges the 3D objects corresponding to the timing for processing, obtained in step S407, in a 3D space, performs rendering, and generates a display image.

In step S409, the display unit 415 displays the display image generated in step S408. When the processing of step S409 ends, the processing moves to step S421 in FIG. 37.

Figure 37:
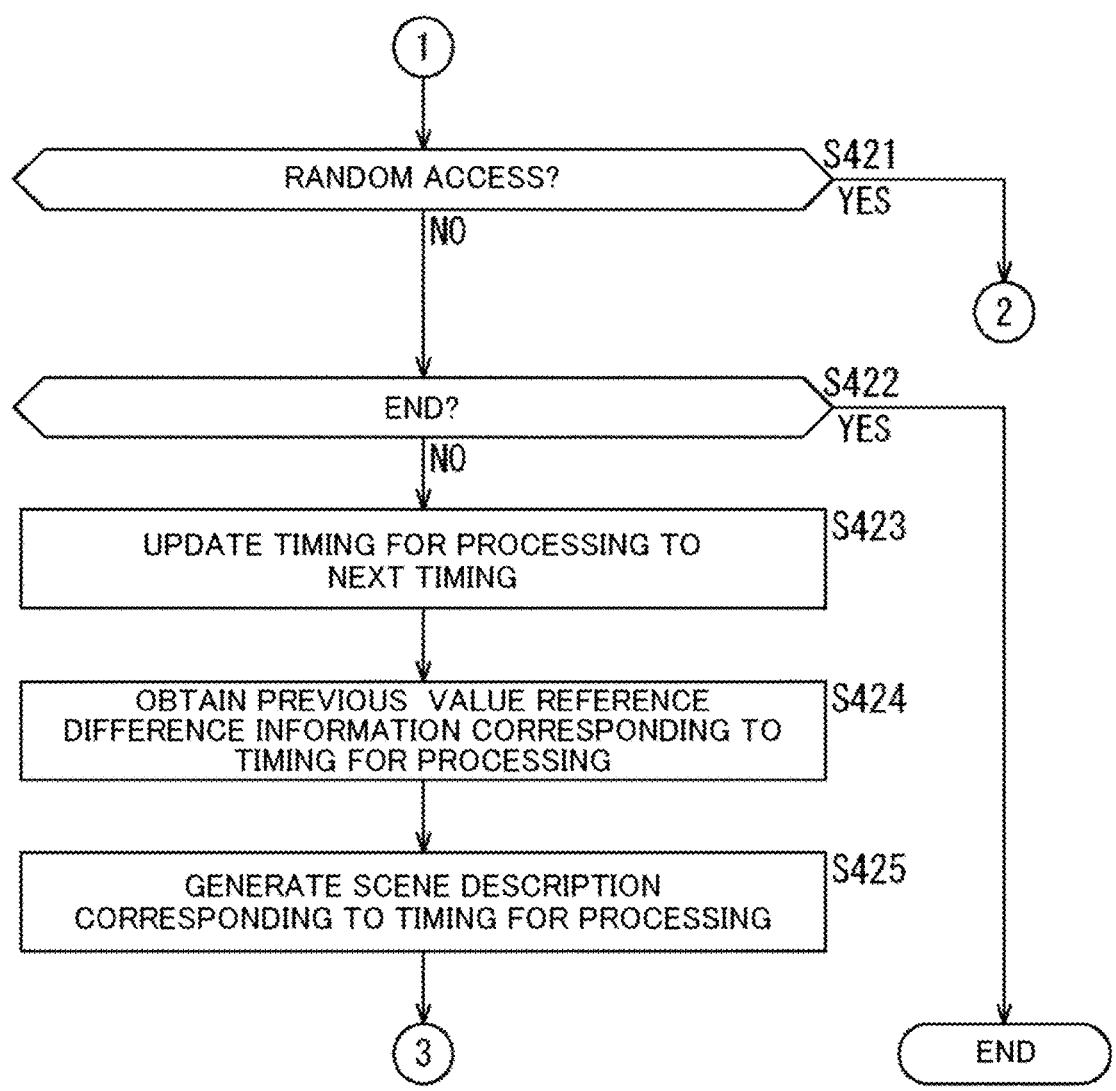
FIG. 37 is a flowchart, continuing from FIG. 36, illustrating an example of the flow of client processing.

In step S421 in FIG. 37, the control unit 401 determines whether to perform random access. The processing moves to step S403 in FIG. 36 when it is determined that random access is to be performed. The processing moves to step S422 if it is determined, in step S421 in FIG. 37, that random access is not to be performed (i.e., that normal playback is to be performed).

In step S422, the control unit 401 determines whether to end the client processing. The processing moves to step S423 if it is determined that the client processing is not to be ended.

In step S423, the control unit 401 switches the timing for processing to the next timing. In other words, the control unit 401 switches the sample to be processed to the next sample.

In step S424, the file obtainment unit 411 obtains, from outside the client device 400, the previous value reference difference information in the sample corresponding to the timing for processing. For example, the file obtainment unit 411 requests a distribution server or the like to supply the previous value reference difference information in the sample corresponding to the timing for processing. The file obtainment unit 411 then obtains the update file containing the previous value reference difference information corresponding to the timing for processing, supplied in response to that request, and supplies the file to the file processing unit 412. The file processing unit 412 obtains, from that update file, the previous value reference difference information in the sample corresponding to the timing for processing.

In step S425, the file processing unit 412 updates the scene description using the previous value reference difference information in the sample corresponding to the timing for processing, obtained through the processing of step S424, and generates a scene description corresponding to the timing for processing.

When the processing of step S425 ends, the processing returns to step S406 in FIG. 36. The client processing ends if it is determined in step S422 in FIG. 37 that the client processing is to be ended.

As described above, by executing each process, the client device 400 can suppress an increase in the processing load on the client device 400 that randomly accesses scene descriptions, as described above in <Method 1>.

Note that when Method 1 is applied in step S404, the file processing unit 412 may apply Method 1-1 described above in <Method 1-1>. In other words, the file processing unit 412, which is the difference information obtainment unit, may obtain the initial value reference difference information stored in a different track than the previous value reference difference information in the update file. Accordingly, by specifying the track, the client device 400 can more easily obtain the samples of the initial value reference difference information independently from the samples of the previous value reference difference information.

Additionally, when Method 1-1 is applied in step S404, the file processing unit 412 may apply Method 1-1-1 described above in <Method 1-1-1>. In other words, the file processing unit 412, which is the difference information obtainment unit, may obtain the initial value reference difference information using link information indicating a link to the track in which the initial value reference difference information is stored, stored as link information for random access in an initial value file storing the initial value of the spatial arrangement information (the scene description). Doing so enables the client device 400 to more easily identify the track in which the appropriate update information is stored.

Additionally, when Method 1 is applied in step S404, the file processing unit 412 may apply Method 1-2 described above in <Method 1-2>. In other words, the file processing unit 412, which is the difference information obtainment unit, may obtain the initial value reference difference information stored in the same sample of the same track as the previous value reference difference information in the update file. By doing so, the client device 400 can obtain the update information (the previous value reference difference information or the initial value reference difference information) using the same link information both during normal playback and during random access.

Additionally, when Method 1-2 is applied in step S404, the file processing unit 412 may apply Method 1-2-1 described above in <Method 1-2-1>. In other words, the previous value reference difference information and the initial value reference difference information may be stored in the sample as a list with each piece of information as an element. By doing so, the client device 400 can more easily obtain the previous value reference difference information and the initial value reference difference information.

Additionally, when Method 1-2 is applied in step S404, the file processing unit 412 may apply Method 1-2-2 described above in <Method 1-2-2>. In other words, the file processing unit 412, which is the difference information obtainment unit, may obtain the initial value reference difference information based on the management information (e.g., the SubSampleInformationBox), which is stored in the management region of the update file and which manages the previous value reference difference information and the initial value reference difference information as sub-samples. By doing so, the client device 400 can more easily obtain the previous value reference difference information, the initial value reference difference information, and the like.

Additionally, when Method 1-2-2 is applied in step S404, the file processing unit 412 may apply Method 1-2-2-1 described above in <Method 1-2-2-1>. In other words, the management information may include identification information (e.g., codec_specific_parameters) identifying the sub-sample in which the previous value reference difference information is stored and the sub-sample in which the initial value reference difference information is stored. By referring to the values of this identification information, the client device 400 can easily (that is, without parsing within the sample) identify whether a sub-sample is a sub-sample in which the previous value reference difference information is stored or a sub-sample in which the initial value reference difference information is stored.

Additionally, when Method 1-2 is applied in step S404, the file processing unit 412 may apply Method 1-2-3 described above in <Method 1-2-3>. In other words, the file processing unit 412, which is the difference information obtainment unit, may obtain the initial value reference difference information based on management information (e.g., the SyncSampleBox), which is stored in a management region of the update file and which manages a sample in which the initial value reference difference information is stored as the sample capable of being randomly accessed. The client device 400 can more easily identify the sample in which the initial value reference difference information is stored based on this management information.

Additionally, when Method 1 is applied in step S404, the file processing unit 412 may apply Method 1-3 described above in <Method 1-3>. In other words, the file processing unit 412, which is the difference information obtainment unit, may obtain the initial value reference difference information stored in a different sample of the same track as the previous value reference difference information in the update file. By doing so, the client device 400 can select the previous value reference difference information or the initial value reference difference information by selecting a sample.

Additionally, when Method 1-3 is applied in step S404, the file processing unit 412 may apply Method 1-3-1 described above in <Method 1-3-1>. In other words, update application time information, which is the same as in the sample in which the previous value reference difference information is stored, may be stored in the sample in which the initial value reference difference information is stored. Doing so enables the client device 400 to identify the previous value reference difference information corresponding to the initial value reference difference information easily and without parsing within the sample.

Additionally, when Method 1-3 is applied in step S404, the file processing unit 412 may apply Method 1-3-2 described above in <Method 1-3-2>. In other words, the file processing unit 412, which is the difference information obtainment unit, may obtain the initial value reference difference information based on management information, which is stored in a management region of the update file and which manages the sample in which the initial value reference difference information is stored as the sample which is not used during normal playback. Doing so enables the client device 400 to skip obtaining the sample in which the initial value reference difference information is stored easily (without parsing within the sample) based on this management information, during normal playback. In other words, when performing random access, the client device 400 can easily (without parsing within the sample) obtain the sample in which the initial value reference difference information is stored based on this management information.

Additionally, when Method 1-3-2 is applied in step S404, the file processing unit 412 may apply Method 1-3-2-1 described above in <Method 1-3-2-1>. In other words, the above-described management information may include identification information (e.g., the sample_has_redundancy_flag) indicating whether the sample is a sample which is used during normal playback. Doing so enables the client device 400 to skip obtaining the sample in which the initial value reference difference information is stored easily (without parsing within the sample) based on this identification information, during normal playback.

Additionally, when Method 1-3 is applied in step S404, the file processing unit 412 may apply Method 1-3-3 described above in <Method 1-3-3>. In other words, the file processing unit 412, which is the difference information obtainment unit, may obtain the initial value reference difference information based on management information (e.g., the SyncSampleBox), which is stored in a management region of the update file and which manages a sample in which the initial value reference difference information is stored as the sample capable of being randomly accessed. By doing so, the client device 400 can more easily identify the sample in which the initial value reference difference information is stored based on this management information.

Additionally, when Method 1 is applied in step S404, the file processing unit 412 may apply Method 1-4 described above in <Method 1-4>. In other words, the file processing unit 412, which is the difference information obtainment unit, may obtain the initial value reference difference information that has replaced previous value reference difference information, which is stored in the update file and for which an update application time is the same as in the initial value reference difference information. Doing so makes it possible to reduce the data amount of the update file compared to the cases of Method 1-2, Method 1-3, and the like.

Additionally, when Method 1-4 is applied in step S404, the file processing unit 412 may apply Method 1-4-1 described above in <Method 1-4-1>. In other words, the file processing unit 412, which is the difference information obtainment unit, may obtain the initial value reference difference information based on management information (e.g., the SyncSampleBox), which is stored in a management region of the update file and which manages a sample in which the initial value reference difference information is stored as the sample capable of being randomly accessed. By doing so, the client device 400 can more easily identify the sample in which the initial value reference difference information is stored based on this management information.

Note that any number of the above-described methods may be applied in combination with each other as long as doing so produces no conflicts. The methods described above may also be applied in combination with other desired methods not described above.

<Client Processing Flow 2>

This client device 400 can perform processing pertaining to the analysis of scene descriptions, the playback of data of 3D objects, and the like by applying the present disclosure described above in <3. Transmission of Initial Value Reference Difference Information or Post-Update Information>, for example. For example, the client device 400 can perform processing by applying Method 2 described above. An example of the flow of client processing executed by the client device 400 in this case will be described with reference to the flowcharts in FIGS. 38 and 39.

Figure 38:
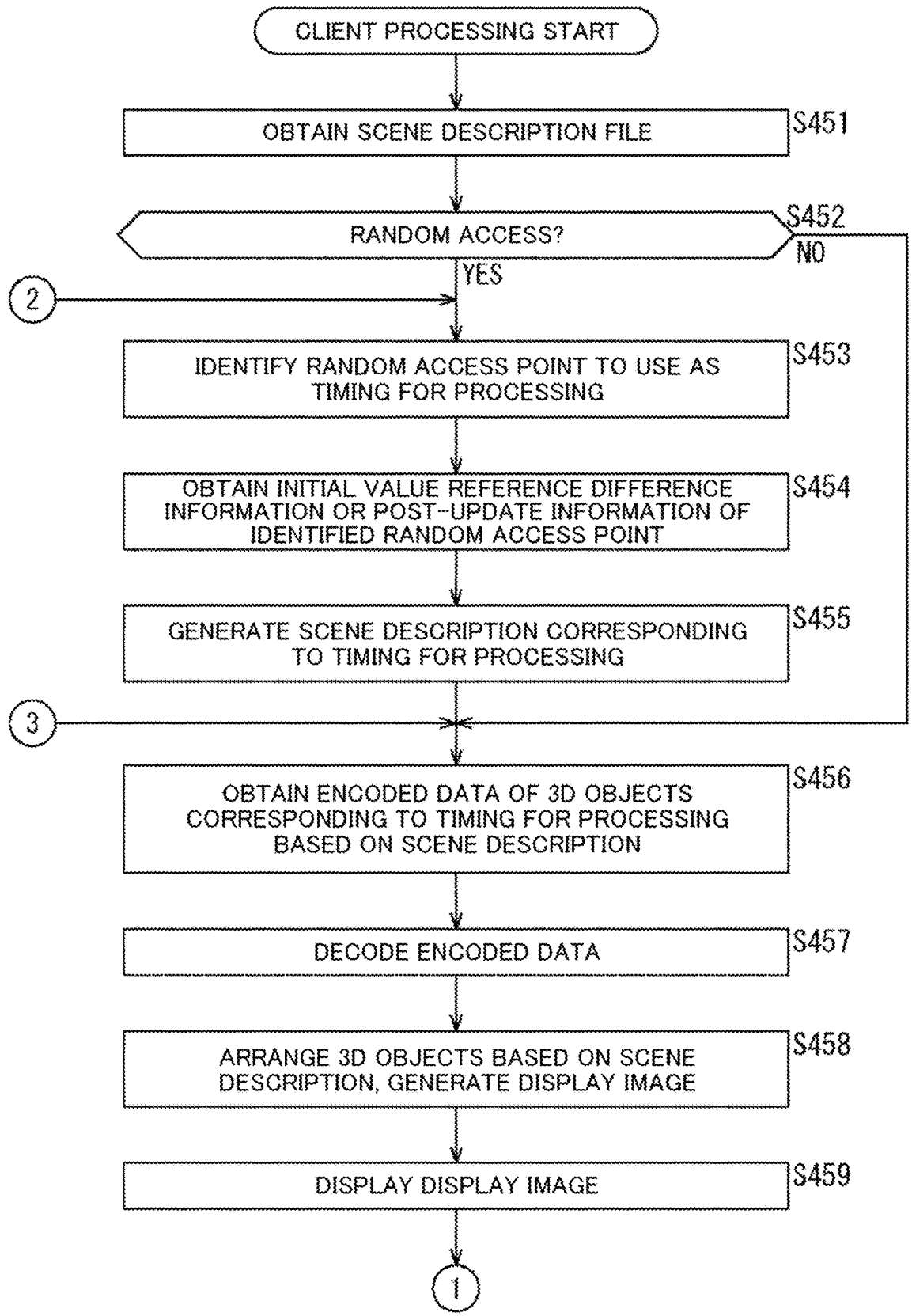
FIG. 38 is a flowchart illustrating an example of the flow of client processing.

When the client processing starts, in step S451 of FIG. 38, the file obtainment unit 411 of the client device 400 obtains a scene description file. The initial values of a scene description are stored in this scene description file. The file obtainment unit 411 supplies the obtained scene description file to the file processing unit 412. The file obtainment unit 411 extracts the scene description (the initial values) from that scene description file.

In step S452, the control unit 401 determines whether to perform random access on the scene description. The processing moves to step S453 when it is determined that random access is to be performed, based on an instruction from a user, an application, or the like, for example.

In step S453, the file processing unit 412 analyzes the scene description and identifies a random access point to serve as the timing for processing. In other words, the file processing unit 412 identifies a sample to be randomly accessed from among prepared random access points.

In step S454, the file processing unit 412 requests the file obtainment unit 411 to obtain the initial value reference difference information or the post-update information of the random access point identified in step S453. The file obtainment unit 411 obtains an update file, which contains the requested initial value reference difference information or post-update information, from outside the client device 400, such as from a distribution server, the file generation device 300, or the like, for example. In other words, the file obtainment unit 411 requests the distribution server or the like to supply the update file containing the initial value reference difference information or the post-update information requested by the file processing unit 412. The file obtainment unit 411 then obtains the update file (the initial value reference difference information or the post-update information) supplied in accordance with the request. The file processing unit 412 applies Method 2, described above in <Method 2>, to extract and obtain the initial value reference difference information or the post-update information from the obtained update file.

In step S455, the file processing unit 412 applies Method 2, described above in <Method 2>, to update the scene description using the obtained initial value reference difference information or post-update information and generate a scene description corresponding to the timing for processing. In other words, by reflecting the update to the initial value reference difference information in the initial values of the scene description, applying the post-update information, or the like, for example, the file processing unit 412 generates a scene description (spatial arrangement information) for the update application time of that initial value reference difference information or post-update information (i.e., the timing for processing).

The processing moves to step S456 when the processing of step S455 ends. Additionally, when it is determined in step S452 that random access is not to be performed (i.e., that normal playback is to be performed), the processing moves to step S456.

In step S456, the file processing unit 412 requests the file obtainment unit 411 to obtain the encoded data of the 3D objects corresponding to the timing for processing, based on the scene description at the timing for processing. The file obtainment unit 411 obtains, from outside the client device 400, a 3D object file storing the encoded data of the 3D objects, corresponding to the timing for processing in the request. For example, the file obtainment unit 411 requests a distribution server or the like to supply the 3D object file containing the encoded data of the 3D objects, requested by the file processing unit 412. The file obtainment unit 411 then obtains the 3D object file supplied in response to that request and supplies the file to the file processing unit 412. The file processing unit 412 extracts, from that 3D object file, the encoded data of the 3D objects corresponding to the timing for processing.

In step S457, the decoding unit 413 decodes the encoded data of the 3D objects corresponding to the timing for processing, obtained in step S456.

In step S458, the display information generation unit 414 performs processing pertaining to the generation of a display image under the control of the display control unit 416. For example, based on the scene description corresponding to the timing for the processing, obtained in step S455, the display information generation unit 414 arranges the 3D objects corresponding to the timing for processing, obtained in step S457, in a 3D space, performs rendering, and generates a display image.

In step S459, the display unit 415 displays the display image generated in step S458. When the processing of step S459 ends, the processing moves to step S471 in FIG. 39.

Figure 39:
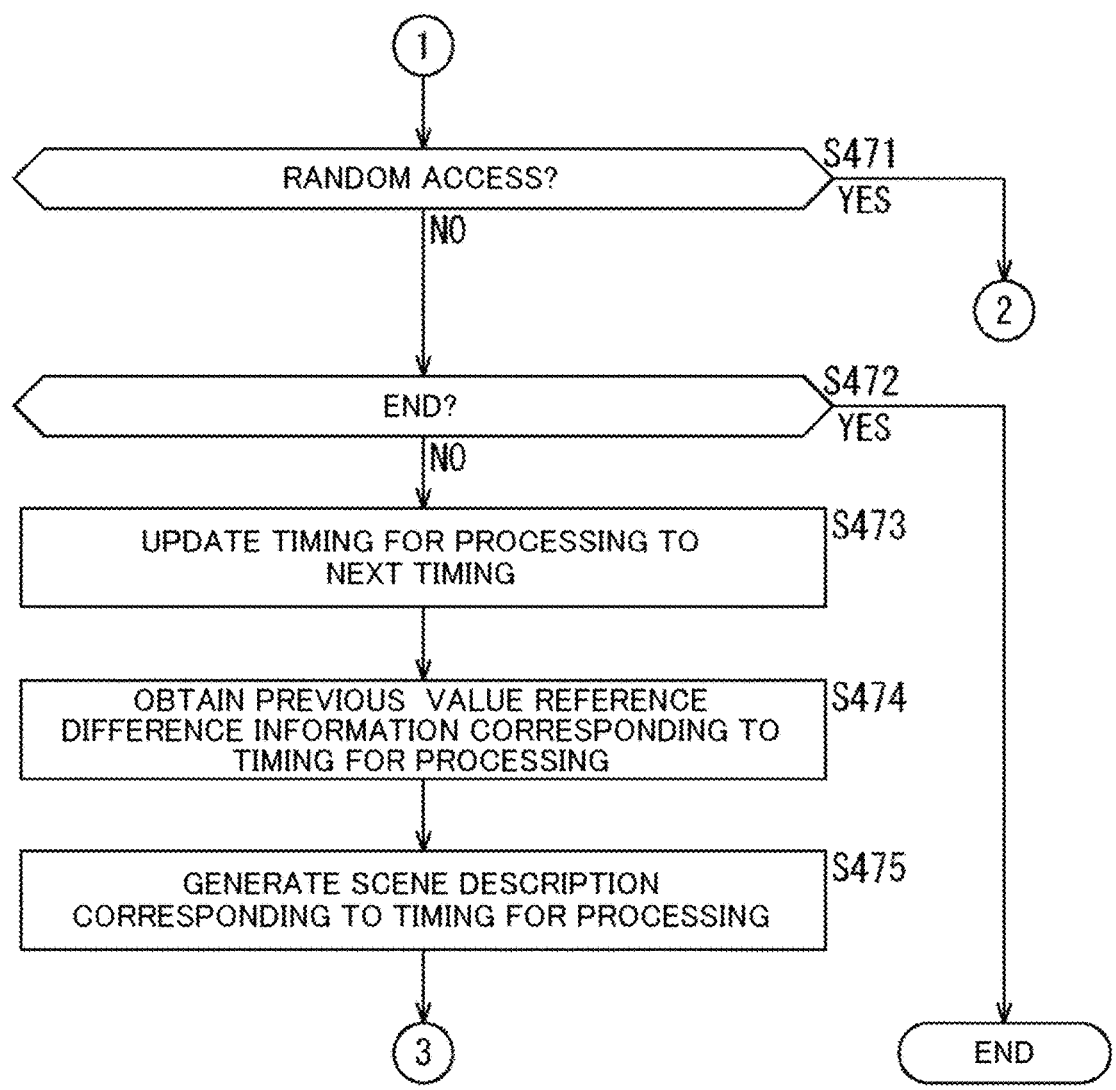
FIG. 39 is a flowchart, continuing from FIG. 38, illustrating an example of the flow of client processing.

In step S471 in FIG. 39, the control unit 401 determines whether to perform random access. The processing moves to step S453 in FIG. 38 when it is determined that random access is to be performed. The processing moves to step S472 if it is determined, in step S471 in FIG. 39, that random access is not to be performed (i.e., that normal playback is to be performed).

In step S472, the control unit 401 determines whether to end the client processing. The processing moves to step S473 if it is determined that the client processing is not to be ended.

In step S473, the control unit 401 switches the timing for processing to the next timing. In other words, the control unit 401 switches the sample to be processed to the next sample.

In step S474, the file obtainment unit 411 obtains, from outside the client device 400, the previous value reference difference information in the sample corresponding to the timing for processing. For example, the file obtainment unit 411 requests a distribution server or the like to supply the previous value reference difference information in the sample corresponding to the timing for processing. The file obtainment unit 411 then obtains the update file containing the previous value reference difference information corresponding to the timing for processing, supplied in response to that request, and supplies the file to the file processing unit 412. The file processing unit 412 obtains, from that update file, the previous value reference difference information in the sample corresponding to the timing for processing.

In step S475, the file processing unit 412 updates the scene description using the previous value reference difference information in the sample corresponding to the timing for processing, obtained through the processing of step S474, and generates a scene description corresponding to the timing for processing.

When the processing of step S475 ends, the processing returns to step S456 in FIG. 38. The client processing ends if it is determined in step S472 in FIG. 39 that the client processing is to be ended.

As described above, by executing each process, the client device 400 can suppress an increase in the processing load on the client device 400 that randomly accesses scene descriptions, as described above in <Method 2>.

Note that when Method 2 is applied in step S454, the file processing unit 412 may apply Method 2-1 described above in <Method 2-1>. In other words, the file processing unit 412, which is the difference information obtainment unit, may obtain the initial value reference difference information or the post-update information stored in a different track than the previous value reference difference information in the update file. Accordingly, by specifying the track, the client device 400 can more easily obtain the samples of the initial value reference difference information or the post-update information independently from the samples of the previous value reference difference information.

Additionally, when Method 2-1 is applied in step S454, the file processing unit 412 may apply Method 2-1-1 described above in <Method 2-1-1>. In other words, the file processing unit 412, which is the difference information obtainment unit, may obtain the initial value reference difference information or the post-update information using link information indicating a link to the track in which the initial value reference difference information or the post-update information is stored, stored as link information for random access in an initial value file storing the initial value of the spatial arrangement information (the scene description). Doing so enables the client device 400 to more easily identify the track in which the appropriate update information is stored.

Additionally, when Method 2 is applied in step S454, the file processing unit 412 may apply Method 2-2 described above in <Method 2-2>. In other words, the file processing unit 412, which is the difference information obtainment unit, may obtain the initial value reference difference information or the post-update information stored in the same sample of the same track as the previous value reference difference information in the update file. By doing so, the client device 400 can obtain the update information (the previous value reference difference information, or the initial value reference difference information or the post-update information) using the same link information both during normal playback and during random access.

Additionally, when Method 2-2 is applied in step S454, the file processing unit 412 may apply Method 2-2-1 described above in <Method 2-2-1>. In other words, the previous value reference difference information, as well as the initial value reference difference information or the post-update information, may be stored in the sample as a list with each piece of information as an element. By doing so, the client device 400 can more easily obtain the previous value reference difference information, as well as the initial value reference difference information or the post-update information.

Additionally, when Method 2-2 is applied in step S454, the file processing unit 412 may apply Method 2-2-2 described above in <Method 2-2-2>. In other words, the file processing unit 412, which is the difference information obtainment unit, may obtain the initial value reference difference information based on the management information (e.g., the SubSampleInformationBox), which is stored in the management region of the update file and which manages the previous value reference difference information, as well as the initial value reference difference information and the post-update information, as sub-samples. By doing so, the client device 400 can more easily obtain the previous value reference difference information, the initial value reference difference information, the post-update information, and the like.

Additionally, when Method 2-2-2 is applied in step S454, the file processing unit 412 may apply Method 2-2-2-1 described above in <Method 2-2-2-1>. In other words, the management information may include identification information (e.g., codec_specific_parameters) identifying the sub-sample in which the previous value reference difference information is stored and the sub-sample in which the initial value reference difference information or the post-update information is stored. By referring to the values of this identification information, the client device 400 can easily (that is, without parsing within the sample) identify whether a sub-sample is a sub-sample in which the previous value reference difference information is stored or a sub-sample in which the initial value reference difference information or the post-update information is stored.

Additionally, when Method 2-2 is applied in step S454, the file processing unit 412 may apply Method 2-2-3 described above in <Method 2-2-3>. In other words, the file processing unit 412, which is the difference information obtainment unit, may obtain the initial value reference difference information or the post-update information based on management information (e.g., the SyncSampleBox), which is stored in a management region of the update file and which manages a sample in which the initial value reference difference information or the post-update information is stored as the sample capable of being randomly accessed. The client device 400 can more easily identify the sample in which the initial value reference difference information or the post-update information is stored based on this management information.

Additionally, when Method 2 is applied in step S454, the file processing unit 412 may apply Method 2-3 described above in <Method 2-3>. In other words, the file processing unit 412, which is the difference information obtainment unit, may obtain the initial value reference difference information or the post-update information stored in a different sample of the same track as the previous value reference difference information in the update file. By doing so, the client device 400 can select the previous value reference difference information, or the initial value reference difference information or the post-update information, by selecting a sample.

Additionally, when Method 2-3 is applied in step S454, the file processing unit 412 may apply Method 2-3-1 described above in <Method 2-3-1>. In other words, update application time information, which is the same as in the sample in which the previous value reference difference information is stored, may be stored in the sample in which the initial value reference difference information or the post-update information is stored. Doing so enables the client device 400 to identify the previous value reference difference information corresponding to the initial value reference difference information or the post-update information easily and without parsing within the sample.

Additionally, when Method 2-3 is applied in step S454, the file processing unit 412 may apply Method 2-3-2 described above in <Method 2-3-2>. In other words, the file processing unit 412, which is the difference information obtainment unit, may obtain the initial value reference difference information or the post-update information based on management information, which is stored in a management region of the update file and which manages the sample in which the initial value reference difference information or the post-update information is stored as the sample which is not used during normal playback.

Doing so enables the client device 400 to skip obtaining the sample in which the initial value reference difference information or the post-update information is stored easily (without parsing within the sample) based on this management information, during normal playback. In other words, when performing random access, the client device 400 can easily (without parsing within the sample) obtain the sample in which the initial value reference difference information or the post-update information is stored based on this management information.

Additionally, when Method 2-3-2 is applied in step S454, the file processing unit 412 may apply Method 2-3-2-1 described above in <Method 2-3-2-1>. In other words, the above-described management information may include identification information (e.g., the sample_has_redundancy_flag) indicating whether the sample is a sample which is used during normal playback. Doing so enables the client device 400 to skip obtaining the sample in which the initial value reference difference information or the post-update information is stored easily (without parsing within the sample) based on this identification information, during normal playback.

Additionally, when Method 2-3 is applied in step S454, the file processing unit 412 may apply Method 2-3-3 described above in <Method 2-3-3>. In other words, the file processing unit 412, which is the difference information obtainment unit, may obtain the initial value reference difference information or the post-update information based on management information (e.g., the SyncSampleBox), which is stored in a management region of the update file and which manages a sample in which the initial value reference difference information or the post-update information is stored as the sample capable of being randomly accessed. By doing so, the client device 400 can more easily identify the sample in which the initial value reference difference information or the post-update information is stored based on this management information.

Additionally, when Method 2 is applied in step S454, the file processing unit 412 may apply Method 2-4 described above in <Method 2-4>. In other words, the file processing unit 412, which is the difference information obtainment unit, may obtain the initial value reference difference information or the post-update information that has replaced previous value reference difference information, which is stored in the update file and for which an update application time is the same as in the initial value reference difference information or the post-update information. Doing so makes it possible to reduce the data amount of the update file compared to the cases of Method 2-2, Method 2-3, and the like.

Additionally, when Method 2-4 is applied in step S454, the file processing unit 412 may apply Method 2-4-1 described above in <Method 2-4-1>. In other words, the file processing unit 412, which is the difference information obtainment unit, may obtain the initial value reference difference information or the post-update information based on management information (e.g., the SyncSampleBox), which is stored in a management region of the update file and which manages a sample in which the initial value reference difference information or the post-update information is stored as the sample capable of being randomly accessed. By doing so, the client device 400 can more easily identify the sample in which the initial value reference difference information or the post-update information is stored based on this management information.

Note that any number of the above-described methods may be applied in combination with each other as long as doing so produces no conflicts. The methods described above may also be applied in combination with other desired methods not described above.

6. Supplementary Notes

<Computer>

The series of processing described above can be executed by hardware, or can be executed by software. In the case where the series of processing is executed by software, a program that configures the software is installed on a computer. Here, the computer includes, for example, a computer built in dedicated hardware and a general-purpose personal computer in which various programs are installed to be able to execute various functions.

Figure 40:
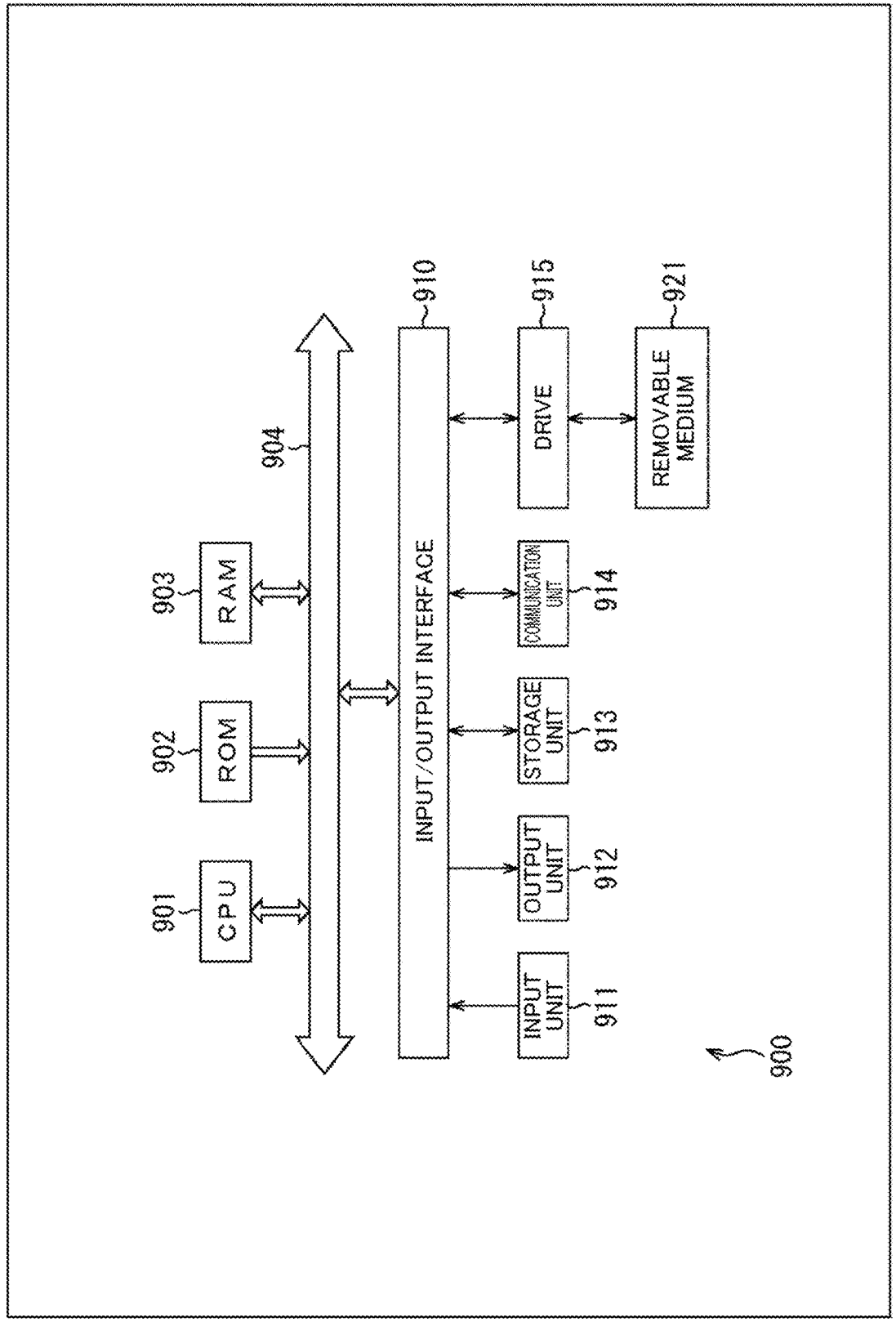
FIG. 40 is a block diagram illustrating an example of the main configuration of a computer.

FIG. 40 is a block diagram illustrating an example of the hardware configuration of a computer that executes the series of processing described above according to a program.

In a computer 900 illustrated in FIG. 40, a Central Processing Unit (CPU) 901, Read Only Memory (ROM) 902, and Random Access Memory (RAM) 903 are connected to each other by a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, and non-volatile memory. The communication unit 914 includes, for example, a network interface. The drive 915 drives a removable medium 921 such as a magnetic disk, an optical disc, a magneto-optical disk, semiconductor memory, or the like.

In the computer that has the above configuration, for example, the CPU 901 performs the above-described series of processes by loading a program stored in the storage unit 913 into the RAM 903 via the input/output interface 910 and the bus 904 and executing the program. Data and the like necessary for the CPU 901 to execute the various kinds of processing is also stored as appropriate in the RAM 903.

The program executed by the computer can be recorded in, for example, the removable medium 921 as a package medium or the like and provided in such a form. In this case, the program may be installed in the storage unit 913 via the input/output interface 910 by inserting the removable medium 921 into the drive 915.

Additionally, the program may also be provided via a wired or wireless transmission medium such as a local area network, the Internet, or digital satellite broadcasting. In this case, the program can be received by the communication unit 914 and installed in the storage unit 913.

In addition, this program can be installed in advance in the ROM 902, the storage unit 913, or the like.

<Applications of Present Technique>

The present technique can be applied in any image coding/decoding methods.

Additionally, the present technique can be applied in any desired configuration. For example, the present technique can be applied in a variety of electronic devices.

Additionally, for example, the present technique can be implemented as a configuration of a part of a device such as a processor (e.g., a video processor) of a system large scale integration (LSI) circuit, a module (e.g., a video module) using a plurality of processors or the like, a unit (e.g., a video unit) using a plurality of modules or the like, or a set (e.g., a video set) with other functions added to the unit.

For example, the present technique can also be applied in a network system constituted by a plurality of devices. For example, the present technique may be implemented as cloud computing shared and processed in common by a plurality of devices over a network. For example, the present technique can be implemented in a cloud service providing a service related to images (moving images) to any terminal such as a computer, an audio visual (AV) device, a portable information processing terminal, an Internet of things (IoT) device, or the like.

Note that, in the present specification, "system" means a set of a plurality of constituent elements (devices, modules (components), or the like), and it does not matter whether or not all the constituent elements are provided in the same housing. Therefore, a plurality of devices contained in separate housings and connected over a network, and one device in which a plurality of modules are contained in one housing, are both "systems".

<Fields and Applications in which Present Technique is Applicable>

A system, a device, a processing unit, or the like in which the present technique is applied can be used in any field, such as, for example, transportation, medical care, crime prevention, agriculture, the livestock industry, mining, beauty, factories, home appliances, weather, nature monitoring, and the like. The application of the present technique can also be implemented as desired.

For example, the present technique can be applied in systems and devices used for providing content for viewing and the like. In addition, for example, the present technique can be applied in systems and devices used for transportation, such as traffic condition monitoring and autonomous driving control. Furthermore, for example, the present technique can be applied in systems and devices used for security. In addition, for example, the present technique can be applied to systems and devices used for automatically controlling machines and the like. Furthermore, for example, the present technique can be applied in systems and devices used for the agriculture and livestock industries. In addition, the present technique can also be applied, for example, in systems and devices for monitoring natural conditions such as volcanoes, forests, oceans, wildlife, and the like. Furthermore, for example, the present technique can be applied in systems and devices used for sports.

<Other>

Note that the term "flag" as used in the present specification refers to information used to identify a plurality of states, and includes not only information used when identifying two states, i.e., true (1) or false (0), but also information capable of identifying three or more states. Accordingly, the value this "flag" can take may be, for example, a binary value of I/O, or three or more values. In other words, the number of bits constituting this "flag" can be set as desired, as one bit or multiple bits. Additionally, the identification information (including flags) is assumed to include not only the identification information in the bitstream, but also the difference information of the identification information relative to given reference information in the bitstream, "flag" and "identification information" in the present specification include not only that information, but also the difference information relative to that reference information.

Additionally, various types of information (metadata and the like) pertaining to encoded data (a bitstream) may be transmitted or recorded in any form as long as the information is associated with the encoded data. Here, the term "associate" means, for example, to make one piece of data usable (linkable) for another piece of data when processing the other piece of data. In other words, data associated with each other may be grouped together as a single piece of data, or may be separate pieces of data. For example, information associated with encoded data (an image) may be transmitted over a different transmission path than the encoded data (the image). Additionally, for example, information associated with encoded data (an image) may be recorded in a different recording medium (or in a different recording area of the same recording medium) than the encoded data (the image). Note that this "association" may be for part of the data instead of the entirety of the data. For example, an image and information corresponding to the image may be associated with a plurality of frames, one frame, or any unit such as a part within the frame.

In the present specification, a term such as "combining", "multiplexing", "adding", "integrating", "including", "storing", "pushing", "entering", or "inserting" means that a plurality of things is collected as one, for example, encoded data and metadata are collected as one piece of data, and means one method of the above-described "associating".

Additionally, the embodiments of the present technique are not limited to the above-described embodiments, and various modifications can be made without departing from the essential spirit of the present technique.

For example, configurations described as one device (or one processing unit) may be divided to be configured as a plurality of devices (or processing units). Conversely, configurations described as a plurality of devices (or processing units) in the foregoing may be collectively configured as one device (or one processing unit). Configurations other than those described above may of course be added to the configuration of each device (or each processing unit). Furthermore, part of the configuration of one device (or one processing unit) may be included in the configuration of another device (or another processing unit) as long as the configuration or operation of the entire system is substantially the same.

Additionally, for example, the program described above may be executed on any device. In this case, the device may have necessary functions (function blocks and the like) and may be capable of obtaining necessary information.

Additionally, for example, each step of a single flowchart may be executed by a single device, or may be executed cooperatively by a plurality of devices. Furthermore, if a single step includes a plurality of processes, the plurality of processes may be executed by a single device or shared by a plurality of devices. In other words, the plurality of kinds of processing included in the single step may be executed as processing for a plurality of steps. Conversely, processing described as a plurality of steps may be collectively executed as a single step.

Additionally, for example, the program executed by the computer may be such that the processing steps describing the program are executed in chronological order according to the order described in the present specification or are executed in parallel or individually at a necessary timing such as in response to a call. That is, as long as no contradiction arises, the processing steps may be executed in an order different from the order described above. Furthermore, the processing steps describing the program may be executed in parallel with the processing of another program or may be executed in combination with the processing of the other program.

Additionally, for example, the multiple techniques related to the present technique can be implemented independently on their own, as long as no contradictions arise. Of course, any number of modes of the present technique may be used in combination. For example, part or all of the present technique described in any of the embodiments may be implemented in combination with part or all of the present technique described in the other embodiments. Furthermore, part or all of any of the above-described modes of the present technique may be implemented in combination with other techniques not described above.

The present technique can also be configured as follows.

(1) An information processing device including:
an update information generation unit that generates, as update information for updating spatial arrangement information for arranging at least one 3D object in a 3D space, initial value reference difference information that is difference information which uses an initial value of the spatial arrangement information as a reference; and
a file generation unit that generates an update file which stores the update information, and stores the initial value reference difference information in the update file as a random access point.

(2) The information processing device according to (1),
wherein the file generation unit stores the initial value reference difference information in a different track than previous value reference difference information in the update file, and
the previous value reference difference information is difference information that takes, as a reference, the spatial arrangement information in which updates up to the update information immediately previous are reflected.

(3) The information processing device according to (2),
wherein the file generation unit generates an initial value file which stores the initial value of the spatial arrangement information, and stores link information indicating a link to the track where the initial value reference difference information is stored as the link information for random access.

(4) The information processing device according to (1),
wherein the file generation unit stores the initial value reference difference information in a same sample of a same track as previous value reference difference information in the update file, and
the previous value reference difference information is difference information that takes, as a reference, the spatial arrangement information in which updates up to the update information immediately previous are reflected.

(5) The information processing device according to (4),
wherein the file generation unit stores the previous value reference difference information and the initial value reference difference information as a list with each piece of information as an element.

(6) The information processing device according to (4) or (5),
wherein the file generation unit stores management information that manages each of the previous value reference difference information and the initial value reference difference information as sub-samples, in a management region of the update file.

(7) The information processing device according to (6),
wherein the management information includes identification information that identifies the sub-sample in which the previous value reference difference information is stored and the sub-sample in which the initial value reference difference information is stored.

(8) The information processing device according to any one of (4) to (7),
wherein the file generation unit stores management information that manages the sample in which the initial value reference difference information is stored as the sample capable of being randomly accessed in a management region of the update file.

(9) The information processing device according to (1),
wherein the file generation unit stores the initial value reference difference information in a different sample of a same track as previous value reference difference information in the update file, and
the previous value reference difference information is difference information that takes, as a reference, the spatial arrangement information in which updates up to the update information immediately previous are reflected.

(10) The information processing device according to (9),
wherein the file generation unit stores update application time information, which is the same as in the sample in which the previous value reference difference information is stored, in the sample in which the initial value reference difference information is stored.

(11) The information processing device according to (9) or (10),
wherein the file generation unit stores management information that manages the sample in which the initial value reference difference information is stored as the sample which is not used during normal playback in a management region of the update file.

(12) The information processing device according to (11),
wherein the management information includes identification information indicating whether it is the sample used during normal playback.

(13) The information processing device according to any one of (9) to (12),
wherein the file generation unit stores management information that manages the sample in which the initial value reference difference information is stored as the sample capable of being randomly accessed in a management region of the update file.

(14) The information processing device according to (1),
wherein the file generation unit replaces the previous value reference difference information, which is stored in the update file and for which an update application time is the same as in the initial value reference difference information, with the initial value reference difference information, and the previous value reference difference information is difference information that takes, as a reference, the spatial arrangement information in which updates up to the update information immediately previous are reflected.

(15) The information processing device according to (14),
wherein the file generation unit stores management information that manages a sample in which the initial value reference difference information is stored as the sample capable of being randomly accessed in a management region of the update file.

(16) An information processing method including:
generating, as update information for updating spatial arrangement information for arranging at least one 3D object in a 3D space, initial value reference difference information that is difference information which uses an initial value of the spatial arrangement information as a reference; and
generating an update file which stores the update information, and stores the initial value reference difference information in the update file as a random access point.

(21) An information processing device including:
a difference information obtainment unit that obtains initial value reference difference information, which is stored as a random access point in an update file storing update information for updating spatial arrangement information for arranging at least one 3D object in a 3D space, and which is difference information that uses an initial value of the spatial arrangement information as a reference; and
a spatial arrangement information generation unit that generates the spatial arrangement information at an update application time of the initial value reference difference information by reflecting the update to the initial value reference difference information in the initial value of the spatial arrangement information.

(22) The information processing device according to (21),
wherein the difference information obtainment unit obtains the initial value reference difference information stored in a different track than previous value reference difference information in the update file, and
the previous value reference difference information is difference information that takes, as a reference, the spatial arrangement information in which updates up to the update information immediately previous are reflected.

(23) The information processing device according to (22),
wherein the difference information obtainment unit obtains the initial value reference difference information using link information indicating a link to the track in which the initial value reference difference information is stored, stored as link information for random access in an initial value file storing the initial value of the spatial arrangement information.

(24) The information processing device according to (21),
wherein the difference information obtainment unit obtains the initial value reference difference information stored in a same sample of a same track as previous value reference difference information in the update file, and the previous value reference difference information is difference information that takes, as a reference, the spatial arrangement information in which updates up to the update information immediately previous are reflected.
(25) The information processing device according to (24),
wherein the previous value reference difference information and the initial value reference difference information are stored in the sample as a list with each piece of information as an element.
(26) The information processing device according to (24) or (25),
wherein the difference information obtainment unit obtains the initial value reference difference information based on management information, which is stored in a management region of the update file and which manages the previous value reference difference information and the initial value reference difference information as sub-samples.
(27) The information processing device according to (26),
wherein the management information includes identification information that identifies the sub-sample in which the previous value reference difference information is stored and the sub-sample in which the initial value reference difference information is stored.
(28) The information processing device according to any one of (24) to (27),
wherein the difference information obtainment unit obtains the initial value reference difference information based on management information, which is stored in a management region of the update file and which manages the sample in which the initial value reference difference information is stored as the sample capable of being randomly accessed.
(29) The information processing device according to (21),
wherein the difference information obtainment unit obtains the initial value reference difference information stored in a different sample of a same track as previous value reference difference information in the update file, and
the previous value reference difference information is difference information that takes, as a reference, the spatial arrangement information in which updates up to the update information immediately previous are reflected.
(30) The information processing device according to (29),
wherein update application time information, which is the same as in the sample in which the previous value reference difference information is stored, is stored in the sample in which the initial value reference difference information is stored.
(31) The information processing device according to (29) or (30),
wherein the difference information obtainment unit obtains the initial value reference difference information based on management information, which is stored in a management region of the update file and which manages the sample in which the initial value reference difference information is stored as the sample which is not used during normal playback.
(32) The information processing device according to (31),
wherein the management information includes identification information indicating whether it is the sample used during normal playback.

(33) The information processing device according to any one of (29) to (32),
wherein the difference information obtainment unit obtains the initial value reference difference information based on management information, which is stored in a management region of the update file and which manages the sample in which the initial value reference difference information is stored as the sample capable of being randomly accessed.
(34) The information processing device according to (21),
wherein the difference information obtainment unit obtains the initial value reference difference information that has replaced previous value reference difference information, which is stored in the update file and for which an update application time is the same as in the initial value reference difference information, and
the previous value reference difference information is difference information that takes, as a reference, the spatial arrangement information in which updates up to the update information immediately previous are reflected.
(35) The information processing device according to (34),
wherein the difference information obtainment unit obtains the initial value reference difference information based on management information, which is stored in a management region of the update file and which manages a sample in which the initial value reference difference information is stored as the sample capable of being randomly accessed.
(36) An information processing method including:
obtaining initial value reference difference information, which is stored as a random access point in an update file storing update information for updating spatial arrangement information for arranging at least one 3D object in a 3D space, and which is difference information that uses an initial value of the spatial arrangement information as a reference; and generating the spatial arrangement information at an update application time of the initial value reference difference information by reflecting the update to the initial value reference difference information in the initial value of the spatial arrangement information.
(41) An information processing device including:
an update information generation unit that generates, as update information for updating spatial arrangement information for arranging at least one 3D object in a 3D space, initial value reference difference information that is difference information which uses an initial value of the spatial arrangement information as a reference, or post-update information in which an update to the initial value reference difference information is reflected in the initial value of the spatial arrangement information; and
a file generation unit that generates an update file which stores the update information, and stores the initial value reference difference information or the post-update information in the update file as a random access point.
(42) The information processing device according to (41),
wherein the file generation unit stores the initial value reference difference information or the post-update information in a different track than previous value reference difference information in the update file, and the previous value reference difference information is difference information that takes, as a reference, the spatial arrangement information in which updates up to the update information immediately previous are reflected.

(43) The information processing device according to (42), wherein the file generation unit generates an initial value file which stores the initial value of the spatial arrangement information, and stores link information indicating a link to the track where the initial value reference difference information or the post-update information is stored as the link information for random access.

(44) The information processing device according to (41), wherein the file generation unit stores the initial value reference difference information or the post-update information in a same sample of a same track as previous value reference difference information in the update file, and the previous value reference difference information is difference information that takes, as a reference, the spatial arrangement information in which updates up to the update information immediately previous are reflected.

(45) The information processing device according to (44), wherein the file generation unit stores the previous value reference difference information, as well as the initial value reference difference information or the post-update information, as a list with each piece of information as an element.

(46) The information processing device according to (44) or (45), wherein the file generation unit stores management information that manages each of the previous value reference difference information, as well as the initial value reference difference information or the post-update information, as sub-samples, in a management region of the update file.

(47) The information processing device according to (46), wherein the management information includes identification information that identifies the sub-sample in which the previous value reference difference information is stored and the sub-sample in which the initial value reference difference information or the post-update information is stored.

(48) The information processing device according to any one of (44) to (47), wherein the file generation unit stores management information that manages the sample in which the initial value reference difference information or the post-update information is stored as the sample capable of being randomly accessed in a management region of the update file.

(49) The information processing device according to (41), wherein the file generation unit stores the initial value reference difference information or the post-update information in a different sample of a same track as previous value reference difference information in the update file, and the previous value reference difference information is difference information that takes, as a reference, the spatial arrangement information in which updates up to the update information immediately previous are reflected.

(50) The information processing device according to (49), wherein the file generation unit stores update application time information, which is the same as in the sample in which the previous value reference difference information is stored, in the sample in which the initial value reference difference information or the post-update information is stored.

(51) The information processing device according to (49) or (50), wherein the file generation unit stores management information that manages the sample in which the initial value reference difference information or the post-update information is stored as the sample which is not used during normal playback in a management region of the update file.

(52) The information processing device according to (51), wherein the management information includes identification information indicating whether it is the sample used during normal playback.

(53) The information processing device according to any one of (49) to (52), wherein the file generation unit stores management information that manages the sample in which the initial value reference difference information or the post-update information is stored as the sample capable of being randomly accessed in a management region of the update file.

(54) The information processing device according to (41), wherein the file generation unit replaces previous value reference difference information, which is stored in the update file and for which an update application time is the same as in the initial value reference difference information, with the initial value reference difference information or the post-update information, and the previous value reference difference information is difference information that takes, as a reference, the spatial arrangement information in which updates up to the update information immediately previous are reflected.

(55) The information processing device according to (54), wherein the file generation unit stores management information that manages a sample in which the initial value reference difference information or the post-update information is stored as the sample capable of being randomly accessed in a management region of the update file.

(56) An information processing method including:
generating, as update information for updating spatial arrangement information for arranging at least one 3D object in a 3D space, initial value reference difference information that is difference information which uses an initial value of the spatial arrangement information as a reference, or post-update information in which an update to the initial value reference difference information is reflected in the initial value of the spatial arrangement information; and generating an update file which stores the update information, and storing the initial value reference difference information or the post-update information in the update file as a random access point.

(61) An information processing device including:
an update information obtainment unit that obtains initial value reference difference information or post-update information, which is stored as a random access point in an update file storing update information for updating spatial arrangement information for arranging at least one 3D object in a 3D space, as the update information, the initial value reference difference information being difference information that uses an initial value of the spatial arrangement information as a reference and the post-update information being information in which an update to the initial value reference difference information is reflected in the initial value of the spatial arrangement information; and
a spatial arrangement information generation unit that generates the spatial arrangement information at an update application time of the initial value reference difference information by reflecting the update to the initial value reference difference information in the initial value of the spatial arrangement information or by applying the post-update information.

(62) The information processing device according to (61), wherein the update information obtainment unit obtains the initial value reference difference information or the post-update information stored in a different track from previous value reference difference information in the update file, and the previous value reference difference information is difference information that takes, as a reference, the spatial arrangement information in which updates up to the update information immediately previous are reflected.

(63) The information processing device according to (62), wherein the update information obtainment unit obtains the initial value reference difference information or the post-update information using link information indicating a link to the track in which the initial value reference difference information or the post-update information is stored, stored as link information for random access in an initial value file storing the initial value of the spatial arrangement information.

(64) The information processing device according to (61), wherein the update information obtainment unit obtains the initial value reference difference information or the post-update information stored in a same sample of a same track as previous value reference difference information in the update file, and the previous value reference difference information is difference information that takes, as a reference, the spatial arrangement information in which updates up to the update information immediately previous are reflected.

(65) The information processing device according to (64), wherein the previous value reference difference information, as well as the initial value reference difference information or the post-update information, are stored in the sample as a list with each piece of information as an element.

(66) The information processing device according to (64) or (65), wherein the update information obtainment unit obtains the initial value reference difference information or the post-update information based on management information, which is stored in a management region of the update file and which manages the previous value reference difference information, as well as the initial value reference difference information or the post-update information, as sub-samples.

(67) The information processing device according to (66), wherein the management information includes identification information that identifies the sub-sample in which the previous value reference difference information is stored and the sub-sample in which the initial value reference difference information or the post-update information is stored.

(68) The information processing device according to any one of (64) to (67), wherein the update information obtainment unit obtains the initial value reference difference information or the post-update information based on management information, which is stored in a management region of the update file and which manages the sample in which the initial value reference difference information or the post-update information is stored as the sample capable of being randomly accessed.

(69) The information processing device according to (61), wherein the update information obtainment unit obtains the initial value reference difference information or the post-update information stored in a different sample of a same track as previous value reference difference information in the update file, and the previous value reference difference information is difference information that takes, as a reference, the spatial arrangement information in which updates up to the update information immediately previous are reflected.

(70) The information processing device according to (69), wherein update application time information, which is the same as in the sample in which the previous value reference difference information is stored, is stored in the sample in which the initial value reference difference information or the post-update information is stored.

(71) The information processing device according to (69) or (70), wherein the update information obtainment unit obtains the initial value reference difference information or the post-update information based on management information, which is stored in a management region of the update file and which manages the sample in which the initial value reference difference information or the post-update information is stored as the sample which is not used during normal playback.

(72) The information processing device according to (71), wherein the management information includes identification information indicating whether it is the sample used during normal playback.

(73) The information processing device according to any one of (69) to (72), wherein the update information obtainment unit obtains the initial value reference difference information or the post-update information based on management information, which is stored in a management region of the update file and which manages the sample in which the initial value reference difference information or the post-update information is stored as the sample capable of being randomly accessed.

(74) The information processing device according to (61), wherein the update information obtainment unit obtains the initial value reference difference information or the post-update information that has replaced previous value reference difference information, which is stored in the update file and for which an update application time is the same as in the initial value reference difference information, and the previous value reference difference information is difference information that takes, as a reference, the spatial arrangement information in which updates up to the update information immediately previous are reflected.

(75) The information processing device according to (74), wherein the update information obtainment unit obtains the initial value reference difference information or the post-update information based on management information, which is stored in a management region of the update file and which manages a sample in which the initial value reference difference information or the post-update information is stored as the sample capable of being randomly accessed.

(76) An information processing method including: obtaining initial value reference difference information or post-update information, which is stored as a random access point in an update file storing update information for updating spatial arrangement information for arranging at least one 3D object in a 3D space, as the update information, the initial value reference difference information being difference information that uses an initial value of the spatial arrangement information as a reference and the post-update information being information in which an update to the initial value reference difference information is reflected in the initial value of the spatial arrangement information; and generating the spatial arrangement information at an update application time of the initial value reference difference information by reflecting the update to the initial value reference difference information in the initial value of the spatial arrangement information or by applying the post-update information.

REFERENCE SIGNS LIST

300 File generation device
301 Control unit
302 File generation processing unit
311 Input unit
312 Preprocessing unit
313 Encoding unit
314 File generation unit
315 Recording unit
316 Output unit
400 Client device
401 Control unit
402 Client processing unit
411 File obtainment unit
412 File processing unit
413 Decoding unit
414 Display information generation unit
415 Display unit
416 Display control unit

The invention claimed is:

1. An information processing device comprising:
an update information generation unit that generates, as update information for updating spatial arrangement information for arranging at least one 3D object in a 3D space, initial value reference difference information that is difference information which uses an initial value of the spatial arrangement information as a reference, or post-update information in which an update to the initial value reference difference information is reflected in the initial value of the spatial arrangement information; and
a file generation unit that generates an update file which stores the update information, and stores the initial value reference difference information or the post-update information in the update file as a random access point.

2. The information processing device according to claim 1,
wherein the file generation unit stores the initial value reference difference information or the post-update information in a different track than previous value reference difference information in the update file, and
the previous value reference difference information is difference information that takes, as a reference, the spatial arrangement information in which updates up to the update information immediately previous are reflected.

3. The information processing device according to claim 2,
wherein the file generation unit generates an initial value file which stores the initial value of the spatial arrangement information, and stores link information indicating a link to the track where the initial value reference difference information or the post-update information is stored as the link information for random access.

4. The information processing device according to claim 1,
wherein the file generation unit stores the initial value reference difference information or the post-update information in a same sample of a same track as previous value reference difference information in the update file, and
the previous value reference difference information is difference information that takes, as a reference, the spatial arrangement information in which updates up to the update information immediately previous are reflected.

5. The information processing device according to claim 4,
wherein the file generation unit stores the previous value reference difference information, as well as the initial value reference difference information or the post-update information, as a list with each piece of information as an element.

6. The information processing device according to claim 4,
wherein the file generation unit stores management information that manages each of the previous value reference difference information, as well as the initial value reference difference information or the post-update information, as sub-samples, in a management region of the update file.

7. The information processing device according to claim 6,
wherein the management information includes identification information that identifies the sub-sample in which the previous value reference difference information is stored and the sub-sample in which the initial value reference difference information or the post-update information is stored.

8. The information processing device according to claim 4,
wherein the file generation unit stores management information that manages the sample in which the initial value reference difference information or the post-update information is stored as the sample capable of being randomly accessed in a management region of the update file.

9. The information processing device according to claim 1,
wherein the file generation unit stores the initial value reference difference information or the post-update information in a different sample of a same track as previous value reference difference information in the update file, and
the previous value reference difference information is difference information that takes, as a reference, the spatial arrangement information in which updates up to the update information immediately previous are reflected.

10. The information processing device according to claim 9,
wherein the file generation unit stores update application time information, which is the same as in the sample in which the previous value reference difference information is stored, in the sample in which the initial value reference difference information or the post-update information is stored.

11. The information processing device according to claim 9,
wherein the file generation unit stores management information that manages the sample in which the initial value reference difference information or the post-update information is stored as the sample which is not used during normal playback in a management region of the update file.

12. The information processing device according to claim 11,
wherein the management information includes identification information indicating whether it is the sample used during normal playback.

13. The information processing device according to claim 9,
wherein the file generation unit stores management information that manages the sample in which the initial value reference difference information or the post-update information is stored as the sample capable of being randomly accessed in a management region of the update file.

14. The information processing device according to claim 1,
wherein the file generation unit replaces previous value reference difference information, which is stored in the update file and for which an update application time is the same as in the initial value reference difference information, with the initial value reference difference information or the post-update information, and
the previous value reference difference information is difference information that takes, as a reference, the spatial arrangement information in which updates up to the update information immediately previous are reflected.

15. The information processing device according to claim 14,
wherein the file generation unit stores management information that manages a sample in which the initial value reference difference information or the post-update information is stored as the sample capable of being randomly accessed in a management region of the update file.

16. An information processing method comprising:
generating, as update information for updating spatial arrangement information for arranging at least one 3D object in a 3D space, initial value reference difference information that is difference information which uses an initial value of the spatial arrangement information as a reference, or post-update information in which an update to the initial value reference difference information is reflected in the initial value of the spatial arrangement information; and
generating an update file which stores the update information, and storing the initial value reference difference information or the post-update information in the update file as a random access point.

17. An information processing device comprising:
an update information obtainment unit that obtains initial value reference difference information or post-update information, which is stored as a random access point in an update file storing update information for updating spatial arrangement information for arranging at least one 3D object in a 3D space, as the update information, the initial value reference difference information being difference information that uses an initial value of the spatial arrangement information as a reference and the post-update information being information in which an update to the initial value reference difference information is reflected in the initial value of the spatial arrangement information; and
a spatial arrangement information generation unit that generates the spatial arrangement information at an update application time of the initial value reference difference information by reflecting the update to the initial value reference difference information in the initial value of the spatial arrangement information or by applying the post-update information.

18. The information processing device according to claim 17,
wherein the update information obtainment unit obtains the initial value reference difference information or the post-update information stored in a same sample of a same track as previous value reference difference information in the update file, and
the previous value reference difference information is difference information that takes, as a reference, the spatial arrangement information in which updates up to the update information immediately previous are reflected.

19. The information processing device according to claim 17,
wherein the update information obtainment unit obtains the initial value reference difference information or the post-update information stored in a different sample of a same track as previous value reference difference information in the update file, and
the previous value reference difference information is difference information that takes, as a reference, the spatial arrangement information in which updates up to the update information immediately previous are reflected.

20. An information processing method comprising:
obtaining initial value reference difference information or post-update information, which is stored as a random access point in an update file storing update information for updating spatial arrangement information for arranging at least one 3D object in a 3D space, as the update information, the initial value reference difference information being difference information that uses an initial value of the spatial arrangement information as a reference and the post-update information being information in which an update to the initial value reference difference information is reflected in the initial value of the spatial arrangement information; and
generating the spatial arrangement information at an update application time of the initial value reference difference information by reflecting the update to the initial value reference difference information in the initial value of the spatial arrangement information or by applying the post-update information.

* * * * *